(12) United States Patent
Welles et al.

(10) Patent No.: US 10,448,784 B2
(45) Date of Patent: *Oct. 22, 2019

(54) CATALYTIC HEATING SYSTEM AND METHOD FOR HEATING A BEVERAGE OR FOOD

(71) Applicants: Clifford G Welles, Pleasanton, CA (US); Noriko Welles, Pleasanton, CA (US)

(72) Inventors: Clifford G Welles, Pleasanton, CA (US); Noriko Welles, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,968

(22) Filed: Aug. 31, 2018

(65) Prior Publication Data

US 2018/0368613 A1    Dec. 27, 2018

Related U.S. Application Data

(63) Continuation-in-part of application No. 15/088,059, filed on Mar. 31, 2016, now abandoned, which is a continuation-in-part of application No. 14/986,526, filed on Dec. 31, 2015, now Pat. No. 10,215,449.
(Continued)

(51) Int. Cl.
| | |
|---|---|
| *A47J 36/28* | (2006.01) |
| *A47J 36/30* | (2006.01) |
| *A47J 36/26* | (2006.01) |
| *A47J 36/24* | (2006.01) |

(Continued)

(52) U.S. Cl.
CPC ............ *A47J 36/28* (2013.01); *A47J 36/2455* (2013.01); *A47J 36/26* (2013.01); *A47J 36/30* (2013.01); *F24V 30/00* (2018.05); *F24C 3/00* (2013.01)

(58) Field of Classification Search
CPC ........ A47J 36/2455; A47J 36/26; A47J 36/28; A47J 36/30; F24V 30/00; F24C 3/00; F24J 1/00
See application file for complete search history.

(56) References Cited

U.S. PATENT DOCUMENTS 10,215,449 B2 *  2/2019  Welles .................... A47J 36/26
2004/0209206 A1  10/2004  Hockaday et al.
(Continued)

*Primary Examiner* — Alfred Basichas
(74) *Attorney, Agent, or Firm* — Jay P. Hendrickson

(57) ABSTRACT

A catalytic heating system for heating a container, comprising: a catalytic combustion chamber; a catalytic reaction media having a toroidal shape, with the catalytic reaction media disposed within the combustion chamber, and with the catalytic reaction media in contact with a bottom plate of the container; a fuel and air mixing injector for injecting an entrained air and fuel gas mixture into the combustion chamber; and a fuel canister for supplying fuel gas to the fuel and air mixing injector. The catalytic heating system also includes a system for heating a heating plate comprising: a catalytic combustion chamber; a catalytic reaction media having a toroidal shape, with the catalytic reaction media disposed within the combustion chamber, and with the catalytic reaction media in contact with the heating plate; a fuel and air mixing injector for injecting an entrained air and fuel gas mixture into the combustion chamber; and a fuel canister for supplying fuel gas to the fuel and air mixing injector.

15 Claims, 41 Drawing Sheets

Related U.S. Application Data which is a continuation of application No. PCT/US2015/038456, filed on Jun. 30, 2015.

(60) Provisional application No. 62/059,510, filed on Oct. 3, 2014.

(51) Int. Cl.
*F24V 30/00* (2018.01)
*F24C 3/00* (2006.01)

(56) References Cited

U.S. PATENT DOCUMENTS

| | | |
|---|---|---|
| 2008/0041859 A1 | 2/2008 | Teglbjarg |
| 2011/0165300 A1 | 7/2011 | Roychoudhury et al. |

* cited by examiner

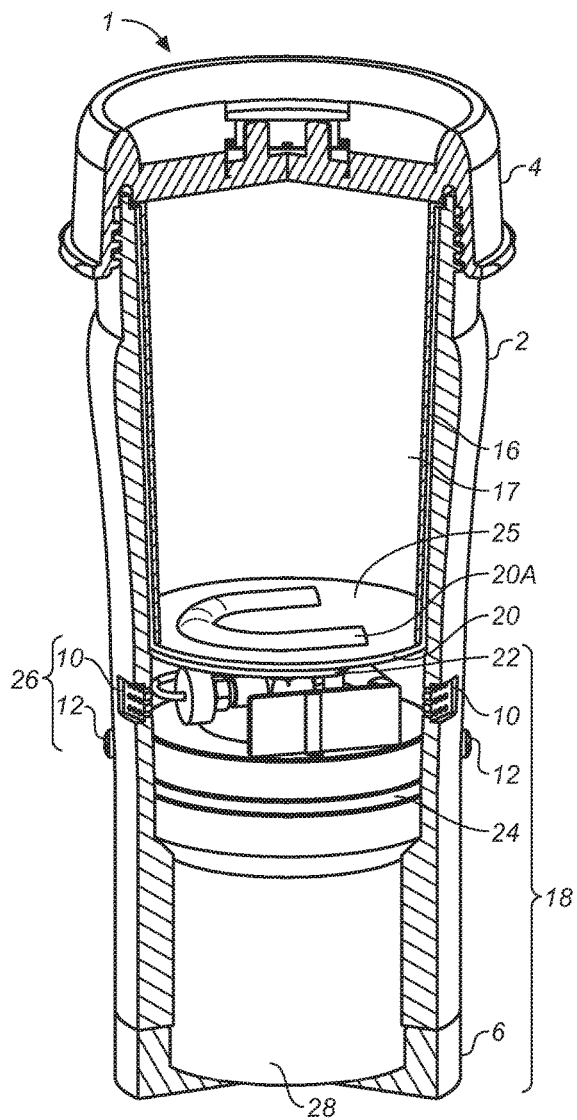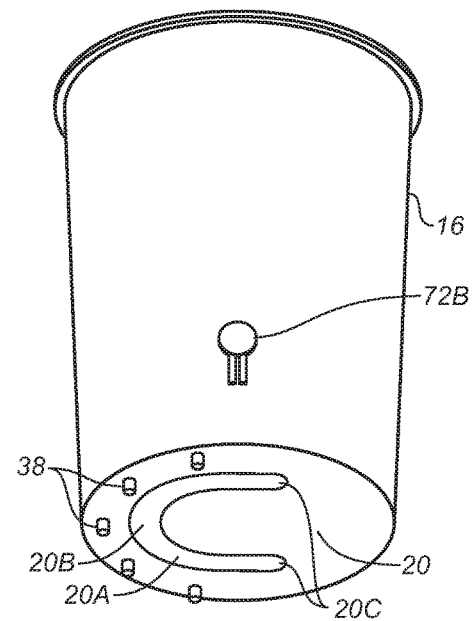
FIG. 2
FIG. 4

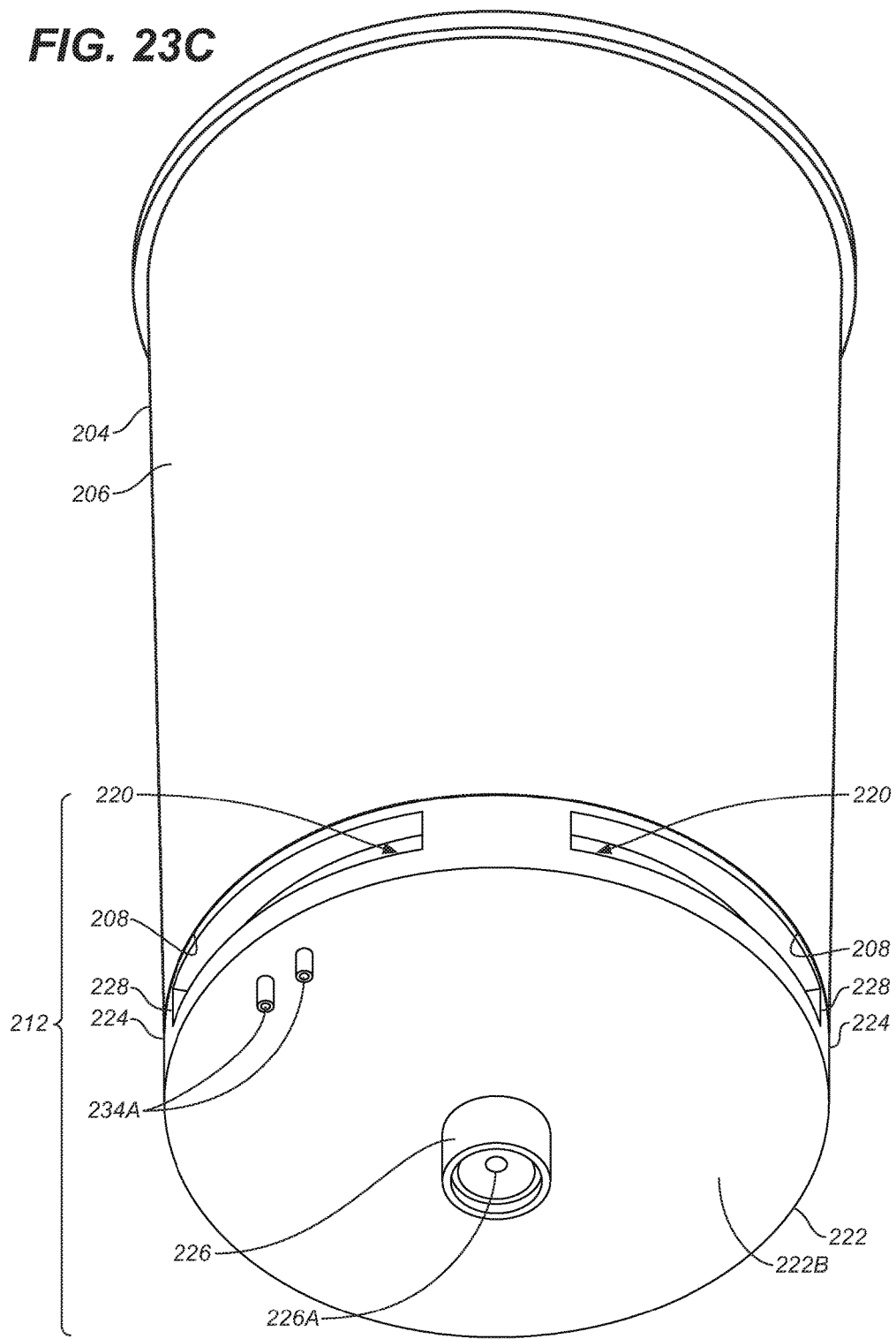

CATALYTIC HEATING SYSTEM AND METHOD FOR HEATING A BEVERAGE OR FOOD

PRIORITY

This application is a continuation-in-part of U.S. Continuation-in-Part application Ser. No. 15/088,059, filed on Mar. 31, 2016, which is a Continuation-in-part Application of U.S. application Ser. No. 14/986,526, filed on Dec. 31, 2015, which is a Continuation Application of International Application No. PCT/US2015/038456, filed on Jun. 30, 2015 which claims the benefit of U.S. Provisional Application No. 60/059,510, filed on Oct. 3, 2014.

TECHNICAL FIELD

This application relates to the use of systems and methods for the generation of heat for use in heating portable containers containing beverages or food, and more specifically to systems and methods for the generation of catalytically produced heat within an enclosed catalytic combustion chamber for heating a container containing a beverage or food.

BACKGROUND ART

Portable heating systems, such as camping stoves and lanterns, are well known in the art of designing and manufacturing such systems. Camping stoves generally utilize an open or partially open flame to heat the stove's contents, with an aerosol canister containing a pressured fuel, typically butane or propane or a combination of those fuels, to supply the fuel needed to maintain the flame. Lanterns, on the other hand, operate similarly to produce light. These devices have several well-known limitations, with the most obvious being the use of an open flame and the fire danger it possess. Other less obvious limitations are related to the chemical characteristics of butane and propane.

The working pressure available from fuel canisters containing butane (either iso-butane or n-butane) or propane or a mixture of such gases is effected by variations in temperature that create conditions that are not ideal for operating heating or lighting systems over a wide range of ambient temperatures and altitudes. Specifically, the useful working pressure for butane at lower ambient temperatures drops off significantly such that the proper operation of a heating or lighting device is impaired. Propane allows for operation at low ambient temperatures but requires a heavier and more expensive fuel canister to safely handle pressures that are normally encountered at higher ambient temperatures. Mixed fuel combinations of butane and propane have been developed to minimize the impact of pressure and temperature variation. But these combinations still suffer from a tendency of the more volatile components of the combined fuels, which have lower boiling points, to be used up sooner than the less volatile fuel components, resulting in unsatisfactory pressure remaining in the fuel canister as it is depleted, especially under cold conditions.

In addition to the limitations in using butane and propane to fuel an open flame device, butane and propane also have other significant limitations related to their potential use as a fuel source for a catalytic combustion process. An important characteristic for any fuel used in catalytic combustion is the light-off temperature, which is a rough indicator of the propensity for the fuel oxidation reaction to proceed. Light-off temperature is often defined as the temperature at which the conversion rate for the reactants reaches 50%, abbreviated as $T_{50}$. A low $T_{50}$ assists in the complete conversion of the fuel to heat without producing intermediate reaction products and pollutants, which may occur when trying to operate the catalytic combustion process at relatively low temperatures. A sufficiently low $T_{50}$ value will also allow for catalytic reactor designs that can use light weight metals such as aluminum without concern for exceeding material temperature limits or causing catalyst deterioration. The fuel gasses commonly, used such as butane and propane, all have relatively high $T_{50}$ values, limiting the possible material design choices and catalytic reactor operating parameters for the heating catalytic combustion chamber. The higher operating temperatures may also introduce unwanted design choices necessary to insure safe operating conditions for the user. Prior art is deficient in describing means for insuring fail-safe operation of catalytic heating in a wide variety of circumstances. Irrespective of fuel type, the prior art does not show how to adapt catalytic heating, to applications, such as, self-heated, temperature regulated portable beverage heating or cooking applications in a manner that assures a high degree of operational safety using techniques that are cost effective. Prior art also does not show how compressed gas fuel used in catalytic heat generation can be safely applied to an indoor application or while inside a transport vehicle, or any small enclosure such as a tent. All of these shortcomings, as well as, others associated with prior art catalytic heat generating devices, limit their applications or area of use.

In view of these and other problems in the prior art, it is a general object of the present invention to provide an improved apparatus and method utilizing a catalytic heat generating device that overcomes the drawbacks relating to the compromise designs of prior art devices as discussed above. Another object of the present invention is to provide a passive technique, which requires no externally provided power, for pre-mixing air and fuel which will provide air to fuel equivalence ratios of one or more when coupled to reactors that have relatively high back pressures.

SUMMARY DISCLOSURE OF THE INVENTION

A catalytic heating system for heating a container for containing a beverage or food is presented with the system comprising: the container for containing the beverage or food, with the container having a container bottom plate; and a catalytic combustion assembly. The catalytic combustion assembly comprises: a catalytic combustion enclosure having: an enclosure platform; an enclosure sidewall having a plurality of exhaust outlets extending through the enclosure sidewall, with a bottom of the enclosure sidewall integral with the enclosure platform and a top of the enclosure sidewall integral with the container bottom plate; thereby defining a catalytic combustion chamber within the catalytic combustion enclosure; and a fuel gas inlet extending through the enclosure platform and having a flow-through access to the catalytic combustion chamber. A catalytic reaction media having a toroidal shape is disposed within the catalytic combustion chamber, with a flat side of the catalytic reaction media in contact with a top side of the enclosure platform and an opposite flat side of the catalytic reaction media in contact with a bottom side of the container bottom plate, and a combustion starting element is also disposed within the catalytic combustion chamber. The catalytic combustion assembly also comprises: a fuel and air mixing injector mounted on a fuel supply platform, with the fuel and air mixing injector fluidly connected to the fuel gas inlet extending through the enclosure platform, and with the fuel and air mixing injector for injecting a fuel gas and entrained air mixture into the catalytic combustion chamber; and a fuel canister releasably connected to the fuel supply platform and fluidly connected to the fuel and air mixing injector, with the fuel canister for supplying fuel gas to the fuel and air mixing injector. And, a shell contains the container and catalytic combustion assembly; thereby forming the catalytic heating system for heating the beverage or food. In operation, the fuel canister supplies fuel gas to the fuel and air mixing injector, which entrains the fuel gas with air and injects a fuel gas and entrained air mixture into the catalytic combustion chamber where the combustion starting element ignites the fuel gas and entrained air mixture. The catalytic reaction media maintains a catalytic combustion process within the catalytic combustion chamber, and the heat energy generated within the catalytic reaction media is directly transferred to the container bottom plate due to the contact of the container bottom plate with the catalytic reaction media.

A catalytic heating system for heating a heating plate for use in heating a pot or pan containing a beverage or food is also presented, with the system comprising a catalytic combustion assembly. The catalytic combustion assembly comprises a catalytic combustion enclosure having: an enclosure platform; an enclosure sidewall having a plurality of exhaust outlets extending through the enclosure sidewall, with a bottom of the enclosure sidewall integral with the enclosure platform and a top of the enclosure sidewall integral with the heating plate; thereby defining a catalytic combustion chamber within the catalytic combustion enclosure; and a fuel gas inlet extending through the enclosure platform and having a flow-through access to the catalytic combustion chamber. A catalytic reaction media having a toroidal shape is disposed within the catalytic combustion chamber, with a flat side of the catalytic reaction media in contact with a top side of the enclosure platform and an opposite flat side of the catalytic reaction media in contact with a bottom side of the heating plate, and a combustion starting element is also disposed within the catalytic combustion chamber. The catalytic combustion assembly also comprises: a fuel and air mixing injector mounted on a fuel supply platform, with the fuel and air mixing injector fluidly connected to the fuel gas inlet extending through the enclosure platform, and with the fuel and air mixing injector for injecting a fuel gas and entrained air mixture into the catalytic combustion chamber; and a fuel canister releasably connected to the fuel supply platform and fluidly connected to the fuel and air mixing injector, with the fuel canister for supplying fuel gas to the fuel and air mixing injector. And, a shell contains the catalytic combustion assembly; thereby forming the catalytic heating system for heating the heating plate for use in heating a pot or pan the beverage or food. In operation, the fuel canister supplies fuel gas to the fuel and air mixing injector, which entrains the fuel gas with air and injects a fuel gas and entrained air mixture into the catalytic combustion chamber where the combustion starting element ignites the fuel gas and entrained air mixture. The catalytic reaction media maintains a catalytic combustion process within the catalytic combustion chamber, and the heat energy generated within the catalytic reaction media is directly transferred to the heating plate due to the contact of the heating plate with the catalytic reaction media.

A method of providing a catalytic combustion process to heat a heating plate is also presented which comprises: providing a flow of a fuel gas; increasing the velocity of the flow of the fuel gas; entraining the flow of the fuel gas with air, thereby providing a flow of fuel gas and entrained air mixture; injecting the flow of fuel gas and entrained air mixture through a fuel gas inlet in flow-through connection with a combustion chamber; dispersing the fuel gas and entrained air mixture within the combustion chamber so as to form a radial flow pattern emanating from the fuel gas inlet; contacting the flow of fuel gas and entrained air mixture having radial flow pattern with a toroidally shaped catalytic reaction media; and passing the flow of fuel gas and entrained air mixture having a radial flow pattern through the toroidally shaped catalytic reaction media, with the catalytic reaction media contacting the heating plate; and igniting the flow of fuel gas and entrained air mixture, thereby generating the catalytic combustion process that heats the heating.

BRIEF DESCRIPTION OF THE DRAWINGS

FIG. 2 is the same perspective illustration as in FIG. 1A, with portions of an outer shell and a container removed, showing the bottom of the container for containing a beverage or food and a catalytic combustion assembly.

FIG. 4 is a bottom perspective view of the container for containing a beverage or food that more specifically illustrates the top chamber plate integral with the bottom of the container.

FIG. 23C is a bottom perspective view of the catalytic combustion enclosure, shown in FIG. 23A and FIG. 23B, with a container bottom plate of the container integral with the catalytic combustion enclosure.

BEST MODE OF CARRYING OUT THE INVENTION

Figures 1A, 1B:
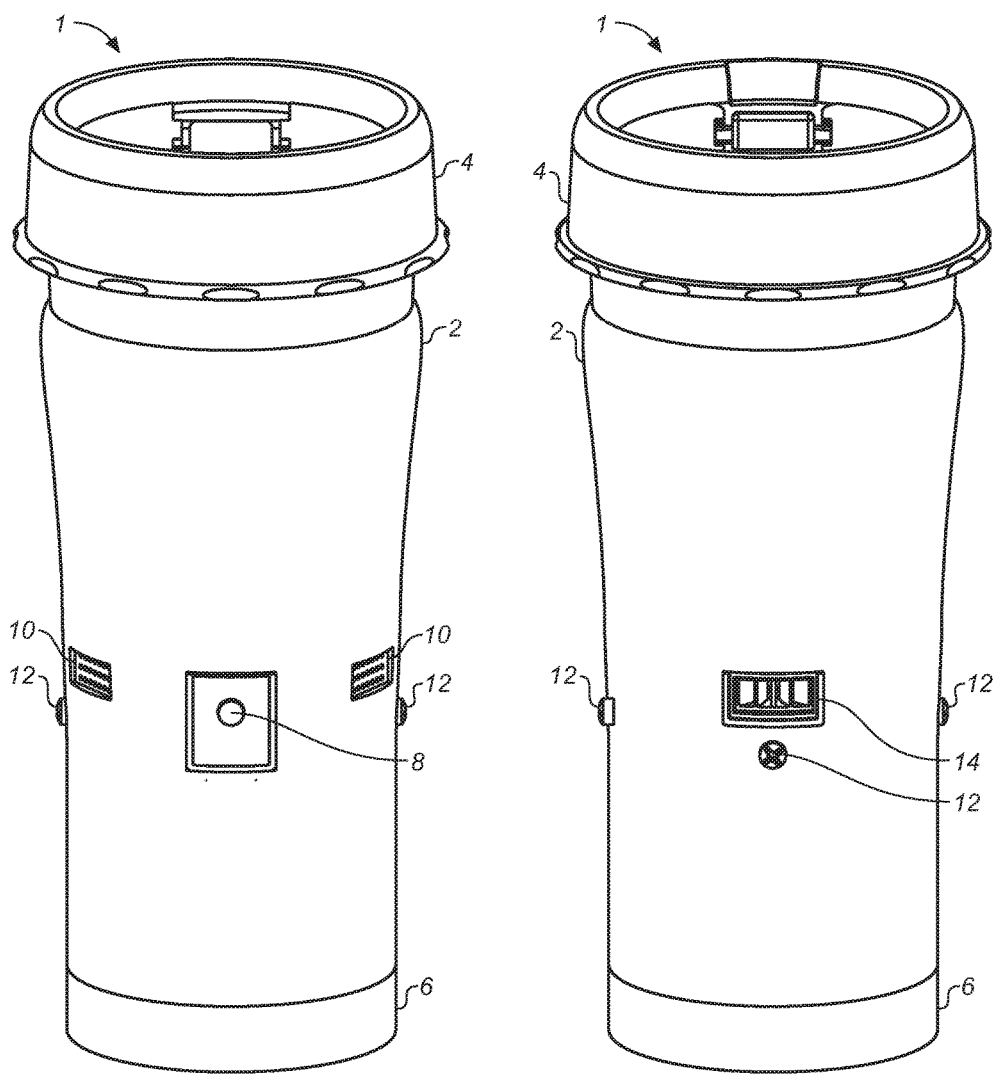
FIG. 1A is a top front perspective illustration of a catalytic heating system for heating a beverage or food.
FIG. 1B is a top back perspective view of the catalytic heating system.

FIG. 1A and FIG. 1B illustrate a top front perspective view and a top back perspective view, respectively, of a catalytic heating system 1 for heating a beverage or food, with the catalytic heating system 1 preferably being portable. More specifically, FIG. 1A illustrates that the catalytic heating system 1 comprises an outer shell 2 having a cylindrical shape, a shell lid 4 removably attached to the outer shell 2, a canister base 6 adjacent to the outer shell 2, an on/off button 8 on an outside surface of the outer shell 2, a pair of air vents 10 for providing air passages into the inside of the outer shell 2, and a plurality of screws 12 for attaching the outer shell 2 to a catalytic combustion assembly 18 disposed within the outer shell 2. The catalytic combustion assembly is described in detail below. And, FIG. 1B shows that the outer shell 2 also contains an exhaust outlet duct 14 for providing an exhaust passage from the inside of the outer shell 2 to atmosphere.

Figure 3:
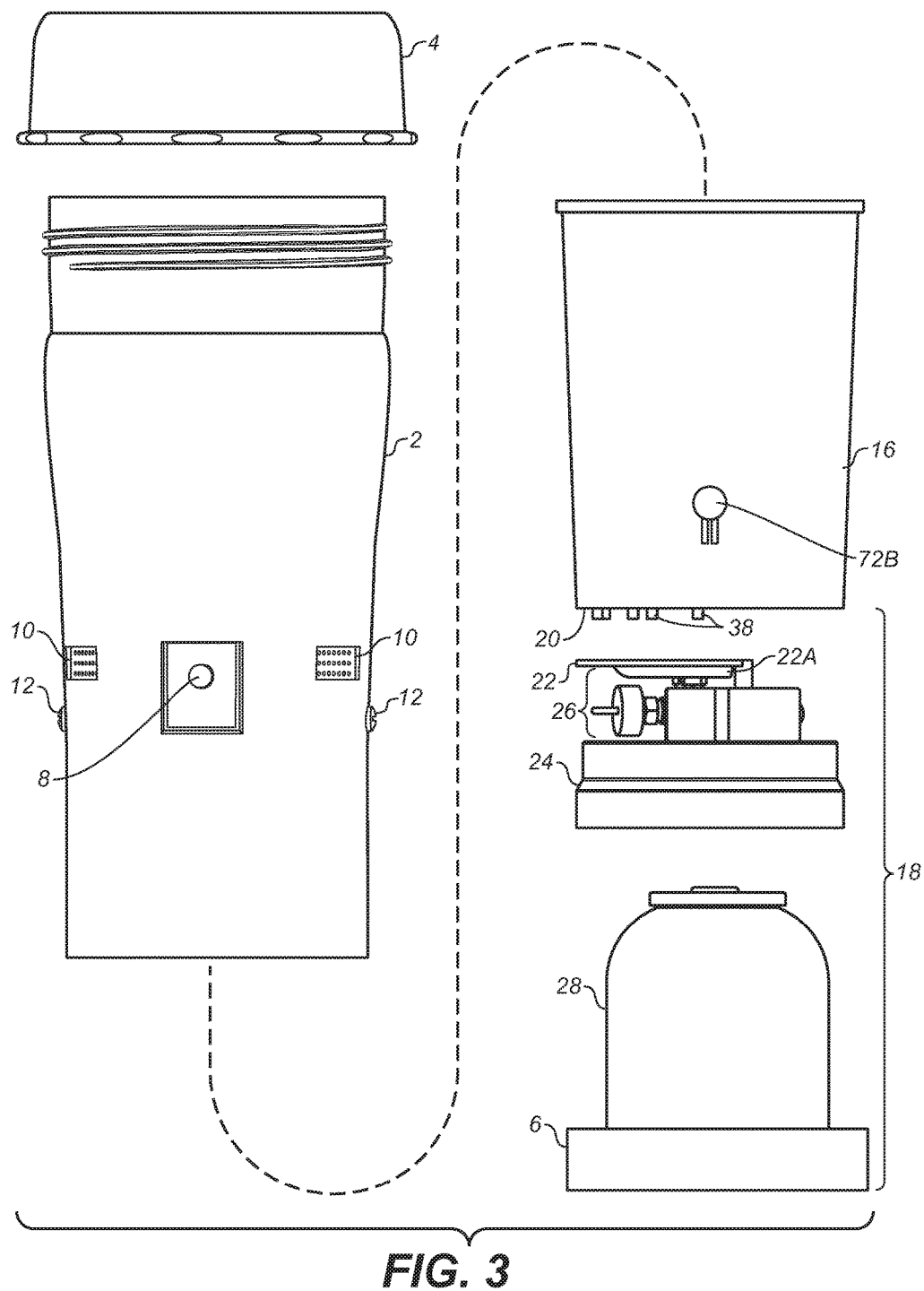
FIG. 3 is an exploded side view of the catalytic heating system, showing the outer shell, the container for containing the beverage or food, and the catalytic combustion assembly comprising a top chamber plate integral with the bottom of the container, a bottom chamber plate, a fuel supply assembly, a fuel supply platform and a fuel canister.

FIG. 2 and FIG. 3 illustrate that the outer shell 2 houses a container 16 for containing a beverage or food and the catalytic combustion assembly 18 for heating the container 16 and its contents. The figures also show that the catalytic combustion assembly 18 comprises: a top chamber plate 20 that can be integral with the bottom of the container 16; a bottom chamber plate 22 coupled to the top chamber plate 20, thereby forming an integrated chamber plate 25; a fuel supply platform 24; a fuel supply assembly 26 having tubular connections to the fuel supply platform 24 and to the bottom chamber plate 22; a fuel canister 28 having the canister base 6 attached to a bottom of the fuel canister 28, with the fuel canister 28 removably attached to the fuel supply platform 24; and dimethyl ether fuel gas 29 as the preferred fuel gas, contained in a state of compression within the fuel canister 28. For present purposes, a reference to a "fuel" or a "fuel gas" means fuel in a gaseous phase, unless indicated otherwise.

The container 16 and catalytic combustion assembly 18 can be secured to the outer shell 2 by bonding an outside top perimeter of the container 16 to an inside top perimeter of the outer shell 2. And, the fuel supply platform 24 can be secured to the outer shell 2 by using the plurality of screws 12 to attach an inside perimeter of the outer shell 2 to an outside perimeter of the fuel supply platform 24. The shell lid 4 can be removably attached to a top end of the outer shell 2 by screwing the shell lid 4, having female threads around its inside perimeter, to the outer shell 2, having male threads around its top outside perimeter. The container 16 can be any container that can conduct heat, such as a cup, mug or sauce pan; preferably the container will have a metallic composition. And, the outer shell 2 can be made of a thermally non-conductive material, preferably a polymeric material; alternatively, the container 16 can have a thermally insulating layer disposed between a sidewall 17 of the container 16 and the outer shell 2.

The components of the catalytic combustion assembly 18 are illustrated in more detail in FIG. 4 through FIG. 8. The container 16 can be sized such that the top chamber plate 20 can be attached to the bottom of the container 16, and in a preferred embodiment, as best shown in FIG. 4, the top chamber plate 20 is integral with the bottom perimeter of the container 16, thereby eliminating a seam that would be formed, if the top chamber plate 20 were not integral with the bottom of the container 16, but instead was attached in some manner to the bottom perimeter of the container 16. FIG. 4 and FIG. 5A through FIG. 5E further illustrate that a bottom surface of the top chamber plate 20 contains an top channel 20A, also shown in FIG. 2, that is integral with the top chamber plate 20 and preferably has a concave half-cylindrical shape that extends partially above the top surface of top chamber plate 20, with the top channel 20A also having a curved center section 20B and a pair of linear sections 20C integral with corresponding ends of the curved center section 20B. A top surface of the bottom chamber plate 22 similarly contains a bottom channel 22A that is integral with the bottom chamber plate 22 and preferably has a concave half-cylindrical shape that extends partially below the bottom surface of bottom chamber plate 22, with the bottom channel 22A having a curved center section 22B and a pair of linear sections 22C integral with corresponding ends of the curved center section 22B. When top and bottom chamber plates, 20 and 22, are aligned in a predetermined manner and coupled together to form the integrated chamber plate 25, top channel and bottom channel, 20A and 22A, form an elongate sidewall enclosure 32, having a preferred cylindrical shape, a curved sidewall center section 32A and a pair of linear sidewall end sections 32B integral with corresponding ends of the curved sidewall center section 32A. The elongate sidewall enclosure 32 encloses and defines an enclosed catalytic combustion chamber 30 that extends through the elongate sidewall enclosure 32, with the chamber 30 having the same curved and linear shape as the elongate sidewall enclosure 32. The elongate sidewall enclosure 32 and the enclosed catalytic combustion chamber 30 are best illustrated in FIG. 5C through FIG. 5E. The side view of FIG. 5C illustrates the top and bottom chamber plates, 20 and 22, after they have been coupled together forming the integrated chamber plate 25; the cross-sectional view of FIG. 5D shows the enclosed catalytic combustion chamber 30 enclosed within the elongate sidewall enclosure 32, with a catalytic reaction media 40 and a combustion starting element 50 (described below) removed; and the top plan view of FIG. 5E, with the top chamber plate 20 removed, further illustrates the enclosed catalytic combustion chamber 30, elongate sidewall enclosure 32 and the curved sidewall section 32A and pair of linear sidewall sections 32B, also with the catalytic reaction media 40 and combustion starting element 50 removed.

Figure 5A:
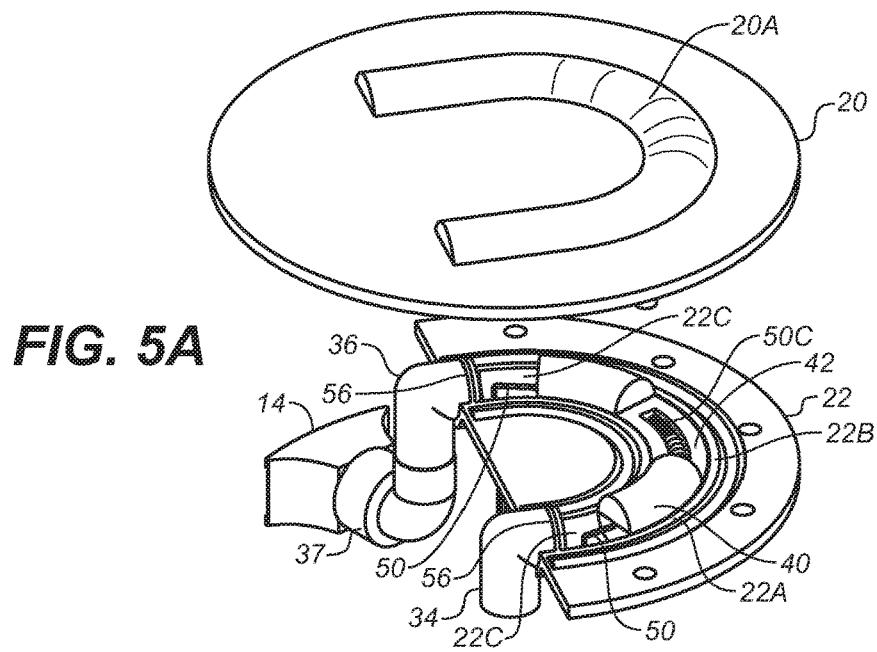
FIG. 5A is an exploded top perspective view of the top chamber plate and the bottom chamber plate, illustrating that a catalytic combustion chamber can be formed when the top and bottom chamber plates are coupled together.
Figure 5B:
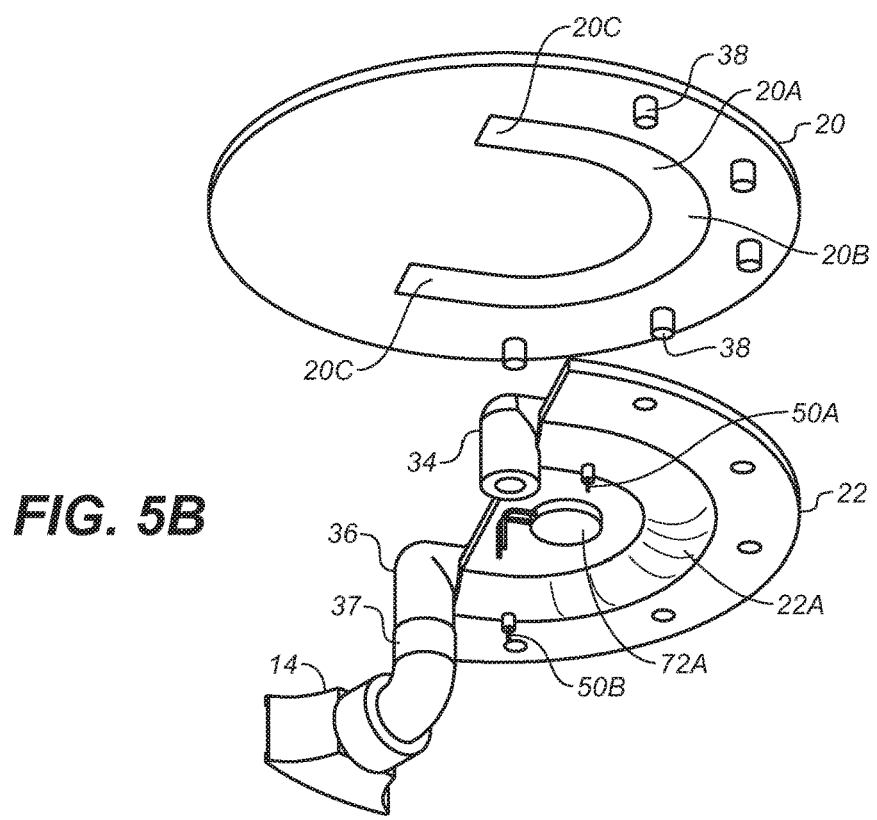
FIG. 5B is an exploded bottom perspective view of the top chamber plate and the bottom chamber plate, also illustrating that the catalytic combustion chamber can be formed when the top and bottom chamber plates are coupled together.
Figure 5C:
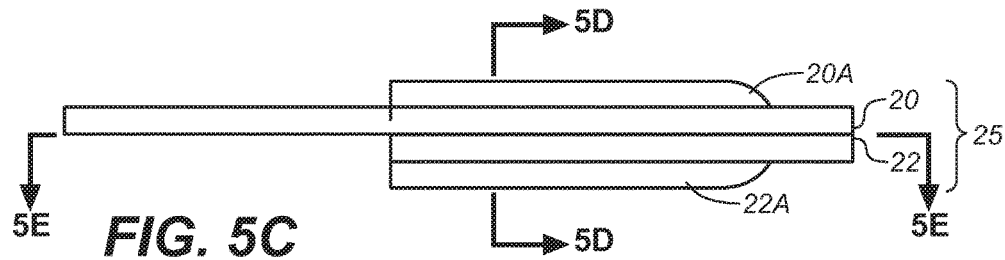
FIG. 5C is a partial side view of the top and bottom chamber plates that have been coupled together, forming the catalytic combustion chamber.
Figure 5D:
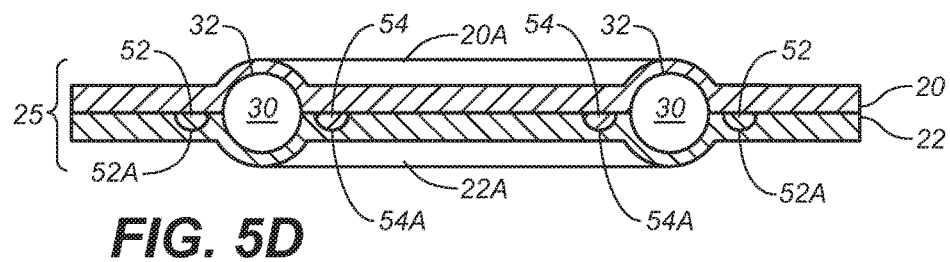
FIG. 5D is a cross-sectional view of FIG. 5C, providing a view in the direction indicated by the arrows 5D-5D in FIG. 5C.
Figure 5E:
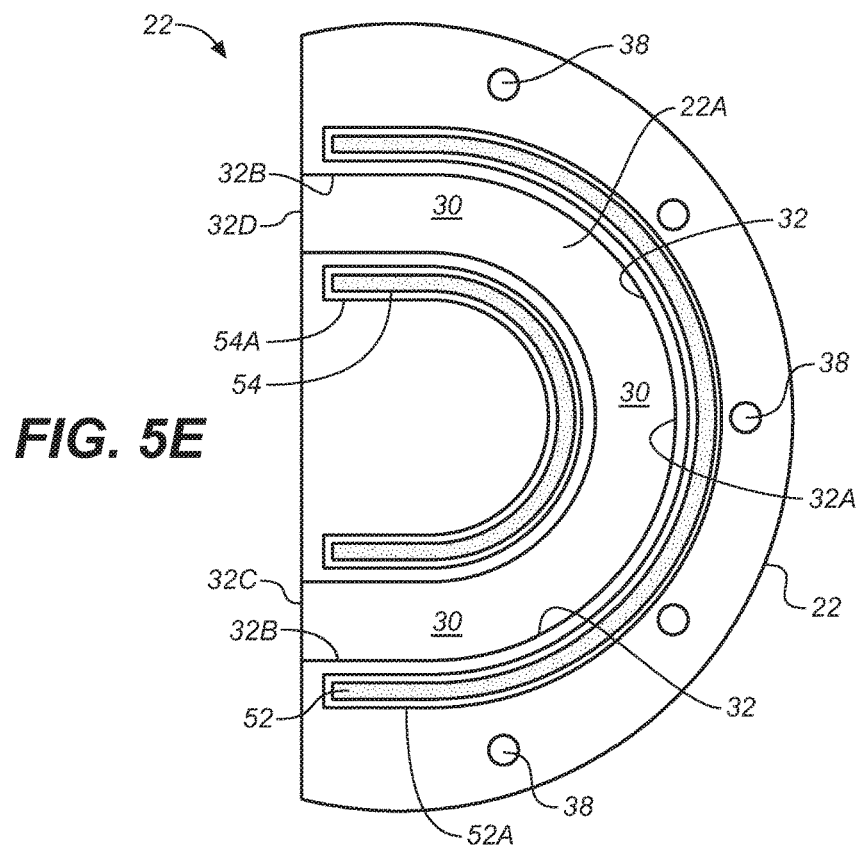
FIG. 5E is a top plan view of FIG. 5C with the top chamber plate removed, providing a view in the direction indicated by the arrows 5E-5E in FIG. 5C.

The elongate sidewall enclosure 32 preferably should have a diameter that is relatively small in order to ensure that the curved portion of the sidewall enclosure 32 can bend in a smooth and continuous fashion within the coupled chamber plates 20 and 22; and in order to more evenly distribute the heat generated from the enclosed catalytic combustion chamber 30 to the top chamber plate 20 that forms the bottom of the container 16 which, in turn, provides for a more even distribution of heat to the beverage or food. At the same time, however, the elongate sidewall enclosure 32 should have a diameter and total length that are large enough to contain a sufficient quantity of catalytic reaction media 40 over the length of the elongate sidewall enclosure 32 to produce a sufficient amount of heat to effectively heat the top chamber plate and the beverage or food within container 16. Given these considerations, the inventors have determined that the elongate sidewall enclosure 32 preferably should have a diameter of about 10 millimeters or less, and more preferably between about 5 and 10 millimeters. The elongate sidewall enclosure 32 also has a flow-through fuel gas inlet 32C within one end of the sidewall enclosure 32 and a flow-through exhaust outlet 32D within the other end of the sidewall enclosure 32, with the sidewall enclosure 32 having no other flow-through openings within the sidewall enclosure 32. And, as shown in FIG. 5A and FIG. 5B a flow-through fuel gas inlet elbow 34 and a flow-through exhaust outlet elbow 36 are sealably disposed within the flow-through fuel gas inlet 32C and the flow-through exhaust outlet 32D, respectively. The flow-through exhaust outlet elbow 36 also has a tubular connection 37 with the exhaust outlet duct 14 within the outer shell 2. The tubular connection 37 effectively extends the enclosed length of the elongate sidewall enclosure 32 from the flow-through exhaust outlet 32D of sidewall enclosure 32 to the exhaust outlet duct 14.

It is preferred that the top and bottom chamber plates, 20 and 22, can be coupled together by utilizing a plurality of binder posts 38, with top portions of the binder posts 38 disposed within corresponding openings the top chamber plate 20, with bottom portions of the binder posts 38 disposed within corresponding openings through the bottom chamber plate 22, and with bottom ends of the binder posts 38, which extend away from the bottom surface of the bottom chamber plate 22, used to couple the top chamber plate 20 to the bottom chamber plate 22 by flattening the ends of the binder posts 38 against the bottom surface of the chamber plate 22. Preferably, the top and bottom chamber plates, 20 and 22, have a metallic composition.

Before the enclosed catalytic combustion chamber 30 is formed by coupling the top and bottom chamber plates, 20 and 22, the catalytic reaction media 40 preferably can be positioned in a curved orientation, as shown in FIG. 5A, within the curved section 22B of bottom channel 22A. Alternatively, the catalytic reaction media 40 can be positioned in a curved and linear orientation within the curved section 22B of bottom channel 22A and within the pair of linear sections 22C of bottom channel 22A. Although the figure shows that a center top half of the catalytic reaction media 40 has been removed, this is only for the purpose of revealing a curved passage 42 that extends lengthwise through the interior of the catalytic reaction media 40. As also shown in FIG. 5A and FIG. 5B, a combustion starting element 50, preferably made from a narrow gage resistance wire alloy, such as Nichrome 60, Nichrome 80 or Kanthal, can be disposed lengthwise through a center portion of the catalytic reaction media 40, with one end 50A of the combustion starting element 50 disposed through an opening within the curved bottom channel 22A and another end 50B of the starting element 50 disposed through another opening through the curved bottom channel 22A, and with a center portion 50C of the combustion starting element 50 disposed through the curved passage 42 within the catalytic reaction media 40. Preferably, as illustrated in FIG. 5A, the center portion 50C of the combustion starting element 50 is coiled, which causes the combustion starting element 50 to attain a higher ignition temperature for a given amount of electrical power than would otherwise exist if the combustion starting element 50 were not coiled. The ends, 50A and 50B, of the combustion starting element 50 are in electronic connection with a programmed microprocessor 60 which, when activated, supplies electrical current from a battery 76, such as a lithium polymer type battery, to the combustion starting element 50. Alternatively, the combustion starting element 50 can be a spark ignition system comprising a pair of wires disposed within a lengthwise opening within the catalytic reaction media 40, with the pair of wires separated by a predetermined distance within the opening. A large transient electric voltage is formed between the wires using techniques well known to those skilled in the art, such as utilizing a piezoelectric crystal that can produce a substantial voltage when squeezed by mechanical means. The resulting large voltage causes the discharge of a spark between the pair of wires that ignites the catalytic reaction media 40. And, as shown in FIG. 5A through FIG. 5E, in order to ensure that the catalytic combustion process is confined to the enclosed catalytic combustion chamber 30, sealing members 52 and 54 can be disposed within corresponding sealing channels 52A and 54A within the top surface of the bottom chamber plate 22, with the sealing channel 52A concentrically positioned outside of bottom channel 22A and sealing channel 54A concentrically positioned inside of bottom channel 22A. In addition, a pair of O-rings 56 can be utilized to further ensure that the catalytic combustion process is confined to the enclosed catalytic combustion chamber 30, with one of the pair O-rings 56 disposed around a portion of flow-through fuel gas inlet elbow 34 and the other O-ring disposed around a portion of the flow-through exhaust outlet elbow 36.

Figure 6A:
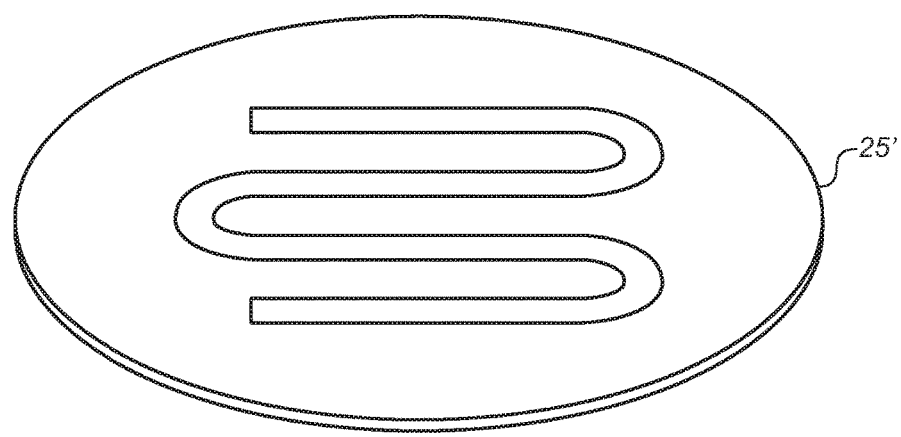
FIG. 6A and FIG. 6B illustrate a catalytic combustion chamber having a serpentine shape and having a coiled shape, respectively.
Figure 6B:
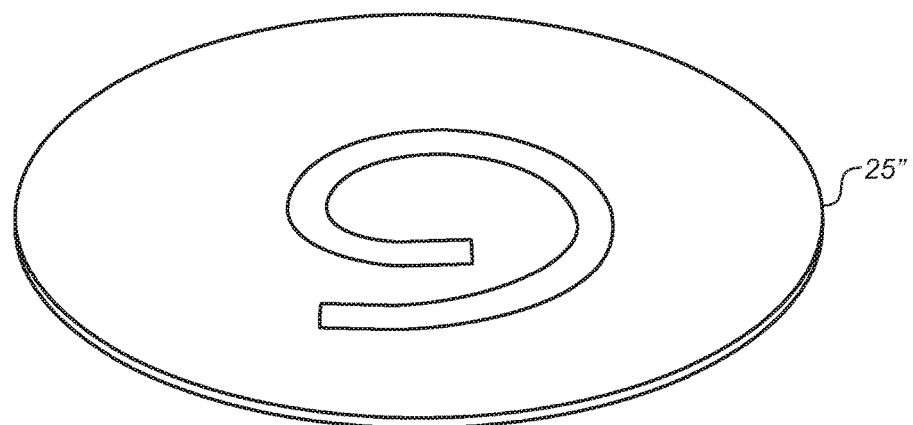

Once the catalytic reaction media 40 and combustion element 50 are positioned within the curved bottom channel 22 A and the top chamber plate 20 is coupled to the bottom chamber plate 22, the catalytic reaction media 40 and the combustion element 50 are captured in a curved orientation within the curved sidewall section 32A of the elongate sidewall enclosure 32, thereby defining the enclosed catalytic combustion chamber 30 as having the same shape as the elongate sidewall enclosure 32. In this regard, a curved elongate shape for the enclosed catalytic combustion chamber 30 is preferred in order to more evenly distribute the heat from the combustion chamber 30 to the top chamber plate 20 and, thereby, provide for a more even distribution of heat to the beverage or food within container 16. And, the most preferred curved elongate shape for the enclosed catalytic combustion chamber 30 is a curvature having a constant radius of curvature (hereinafter referred to as a "circular curvature"), providing a smooth and continuous surface within the combustion chamber 30. Although the enclosed catalytic combustion chamber 30 having a circular curvature is preferred, other curved catalytic combustion chamber shapes could be utilized. For example, a serpentine shape within a chamber plate 25', as illustrated in FIG. 6A, or a coiled shape within a chamber plate 25", as shown in FIG. 6B, have shapes that are similarly smooth and continuous.

While there are several types of catalytic reaction media known in the art, the catalytic reaction media 40 preferably is an open cell metal foam substrate, combined with a wash coat and an active catalyst. It has been discovered that the use of an open cell metal foam substrate constructed from an iron, chromium, aluminum and yttrium alloy, under the trade name Fecralloy® or Kanthal® and manufactured by Porvair, Inc., provides an ideal substrate material for the catalytic reaction media 40. Metal foam substrates tend to have very high surface area to volume ratios and very high porosities. The first property is important to enhance the number of catalyst sites per unit volume, which affects the catalytic space velocity (i.e. quotient of the entering volumetric flow rate of the reactants divided by the reactor volume) in the enclosed catalytic combustion chamber 30 and the second property helps to minimize the pressure drop within the enclosed catalytic combustion chamber 30. The particular type of metal foam fabrication technique is important in determining the properties that make for an optimum catalyst media. Metal foams can be constructed by several techniques such as sintering or investment casting. The heat transport properties of metal foams made by sintering are very different than those made by investment casting and are far less costly. Sintered metal foams, such as the ones manufactured by Porvair Inc., have a unique micro-structure that resembles interconnected open cells in the shape of dodecahedrons. The cells are constructed of a series of interconnected metal struts. A cross-section of each strut would show it to be a hollow shell. The resulting light mass allows the material to reach high temperatures with very little energy input. This in turn helps to minimize the energy required by the starter filament to start the reaction. The metal substrate is traditionally given a wash-coat of some very high surface area material (e.g. gamma alumina) upon which a catalyst is deposited (e.g. Platinum). The Fecralloy® alloy contains aluminum, which under a suitable heat treatment will be driven to the surface where it is converted to alumina when exposed to a high temperature oxidizing atmosphere. The conversion to alumina provides a bonding interface if an alumina wash coat is utilized. However, It has been discovered that two additional properties exist that can be used advantageously when the Fecralloy® alloy is used as the catalytic reaction media 40. The first property is that the self-generating aluminum oxide film can act as its own wash coat, albeit of less surface area than a traditional gamma alumina wash coat. In some catalytic reactor designs this may provide an adequate catalyst site attachment points and consequently sufficient catalyst activity levels. By eliminating the traditional wash-coat step, costs are reduced. The second surprising additional property is that the Fecralloy material, after heat treating to induce a native film of aluminum oxide, appears to have a certain amount of inherent catalytic activity on its own, without adding additional catalysts. This further reduces costs by reducing the amount of additional catalyst required to attain a specific space velocity.

Figure 7A:
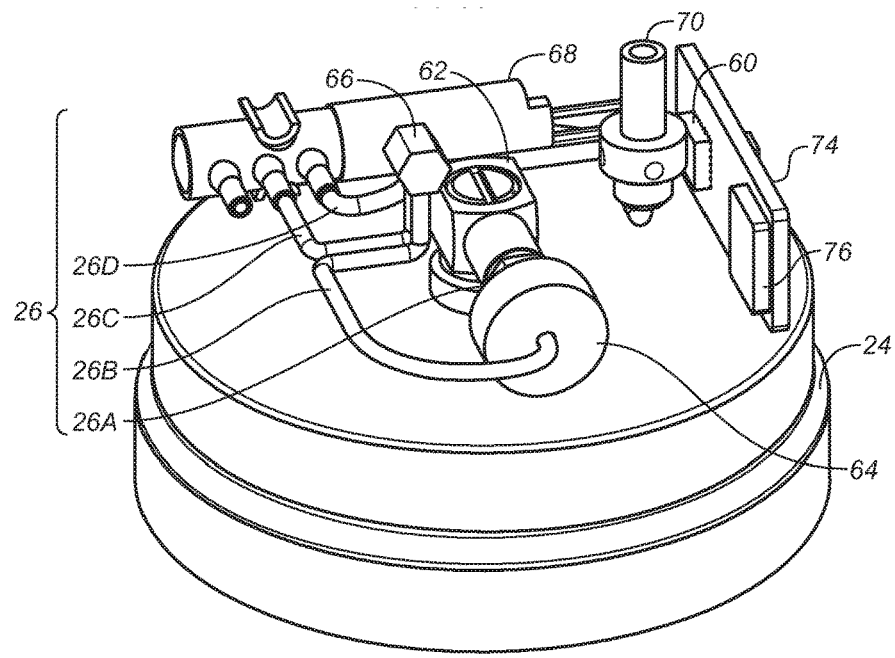
FIG. 7A and FIG. 7B are top perspective and top plan views, respectively, of the fuel supply assembly mounted on the fuel supply platform.
Figure 7B:
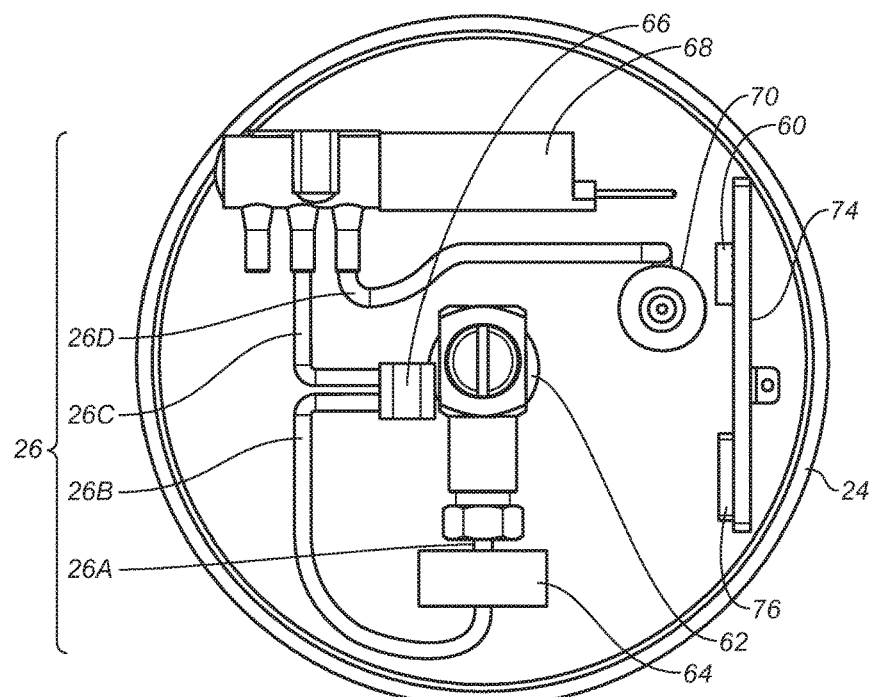

FIG. 7A and FIG. 7B more specifically illustrate the fuel supply assembly 26 that is mounted on a topside of the fuel supply platform 24. The fuel supply assembly 26 comprises the following fuel supply components: a fuel gas compression fitting 62 having a compression fitting and tap for use in fluidly connecting the fuel supply assembly 26 to the fuel canister 28, containing the dimethyl ether fuel gas 29; a liquid/gas separator 64, which could be, but not limited to, a porous oleophobic membrane such as "Supor R" made by Pall Corporation, having a tubular connection through tube 26A with the fuel gas compression fitting 62, with the liquid/gas separator 64 for removing any dimethyl ether fuel gas 29 that is in liquid form; a pressure regulator 66, such as an ultra-miniature regulator from the "PR-MLS" model series by Beswick Engineering, having a tubular connection through tube 26B with the liquid/gas separator 64, with the pressure regulator 66 for maintaining the pressure of the dimethyl ether fuel gas 29 at a predetermined level; a solenoid valve 68, such as the "LHL" series from the Lee Company, having a tubular connection through tube 26C with the pressure regulator 66, with the solenoid valve 68 for opening and closing the flow of dimethyl ether fuel gas 29 through the fuel supply assembly 26; a fuel and air mixing injector 70, such as a venturi injector, having a tubular connection through tube 26D with the solenoid valve 68, with the fuel and air injector 70 for injecting the dimethyl ether fuel gas 29 and entrained air mixture into the enclosed catalytic combustion chamber 30; a temperature sensor 72A attached to the bottom surface of the bottom chamber plate 22 for sensing the temperature within the enclosed catalytic combustion chamber 30; and a temperature sensor 72B attached to the outside surface of the sidewall 17 of container 16 for sensing the temperature of the container 16. And, the fuel supply assembly 26 is connected to the enclosed catalytic combustion chamber 30 by inserting a top end of the fuel and air mixing injector 70 into the flow-through fuel gas inlet elbow 34 in tubular connection with the enclosed catalytic combustion chamber 30.

The fuel supply assembly 26 further comprises the programmed microprocessor 60 that is attached to and in electrical connection to a circuit board 74 that is mounted on the top side of the fuel supply platform 24. A battery 76, such as a lithium polymer type GM502030 from PowerStream Technology, Inc., can also be attached to and in electrical connection to the circuit board 74; or the battery 76 can be attached to any other appropriate location within the catalytic combustion assembly 18 or within the outer shell 2 surrounding the catalytic combustion chamber 18. The battery 76 supplies electrical power to the programmed microprocessor 60 when the on/off button 8 is in the "on" position and disconnects electrical power when the on/off button 8 is in the off position. When activated, the programmed microprocessor 60, with inputs from the temperature sensors 72A and 72B, controls the functionality of the solenoid valve 68 in order to control the fuel gas flow rate and temperature within the enclosed catalytic combustion chamber 30. The activated programmed microprocessor 60 also supplies electrical power to the combustion starting element 50, which the microprocessor 60 coordinates with the supply of fuel gas to the enclosed catalytic combustion chamber 30 by opening and closing the solenoid valve 68.

Figure 8:
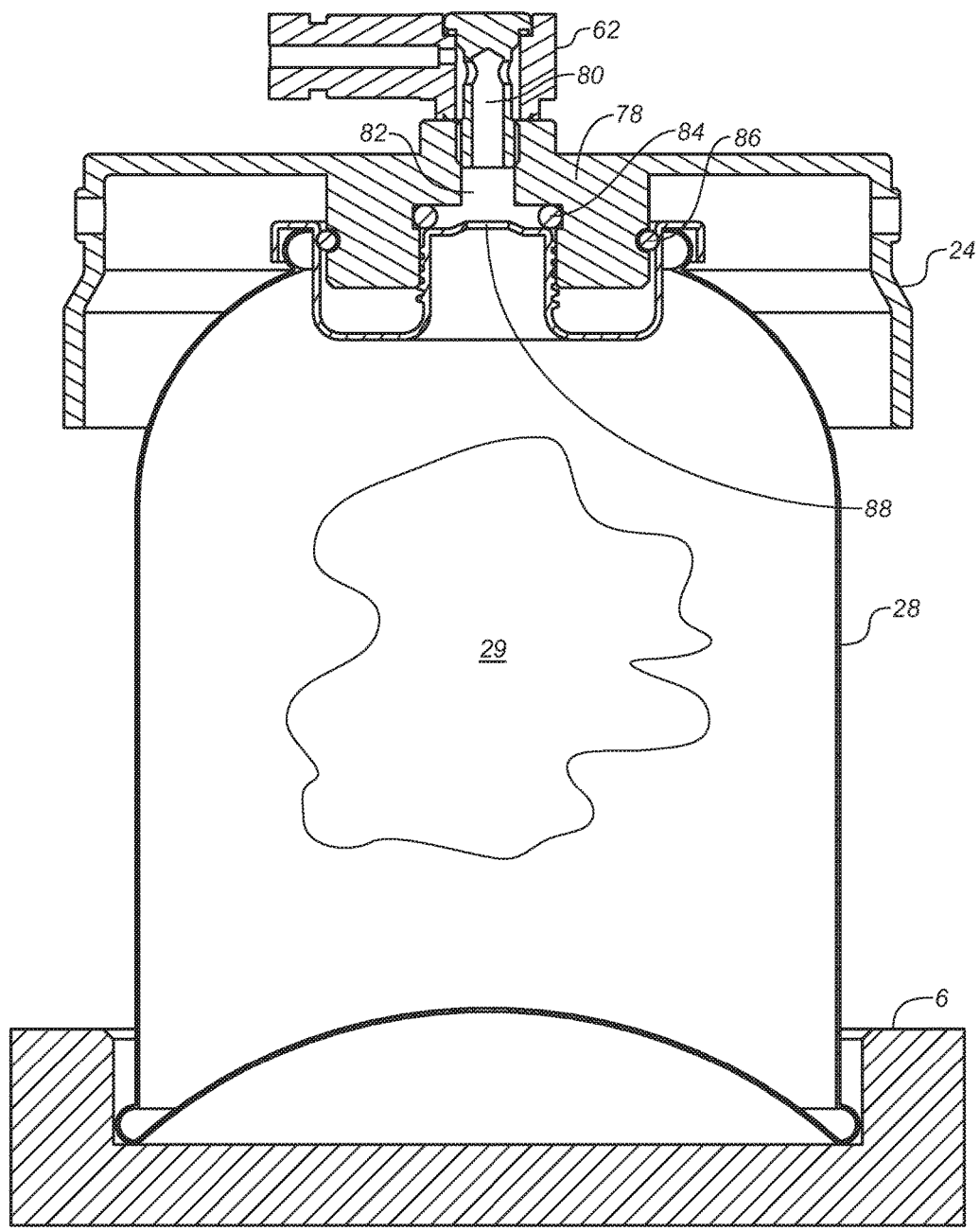
FIG. 8 is a cross-sectional side view of the fuel supply platform and the fuel canister releasably attached to the fuel supply platform.

The cross-sectional side view presented in FIG. 8 illustrates that fuel canister 28 can contain the dimethyl ether fuel gas 29 and that the fuel canister 28 can be releasably connected to the fuel supply platform 24. In order to facilitate the connection, the fuel supply platform 24 comprises a platform receptacle 78, integral with an underside of the fuel supply platform 24, that contains a platform receptacle opening 80 leading to a cylindrically shaped cavity 82, with the cavity 82 having: female threads extending distally from the opening 80; an inner O-ring 84 disposed within the cavity 82 and positioned distally from the female threads; and an outer O-ring 86 disposed around an outside surface of the platform receptacle 78. The fuel canister 28 contains a fuel flow valve 88, integral with the top of the fuel canister 28, and having male threads that can be used to connect the fuel canister 28 to the fuel supply platform 24 by screwing the fuel flow valve 88 into the platform receptacle 78. This action causes: 1) the tap within the fuel gas compression fitting 62 to open the fuel flow valve 88, thereby allowing the dimethyl ether fuel gas 29, which has been compressed within the fuel canister 28, to flow from the fuel canister 28 into the fuel supply assembly 26; and 2) an outside surface of the fuel canister 28 to engage the outer O-Ring 86 and the fuel flow valve 88 to engage the inner O-ring 84, thereby preventing dimethyl ether fuel gas 29 within the fuel canister 28 from escaping to atmosphere.

Figure 9A:
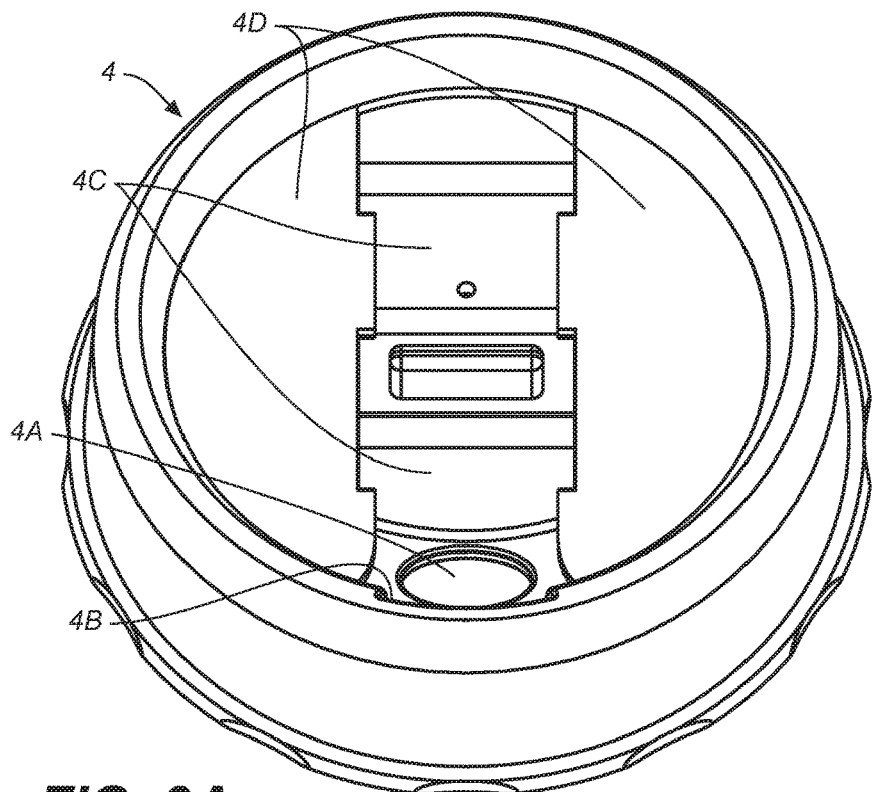
FIGS. 9A and 9B are top and bottom perspective views, respectively, of a shell lid.
Figure 9B:
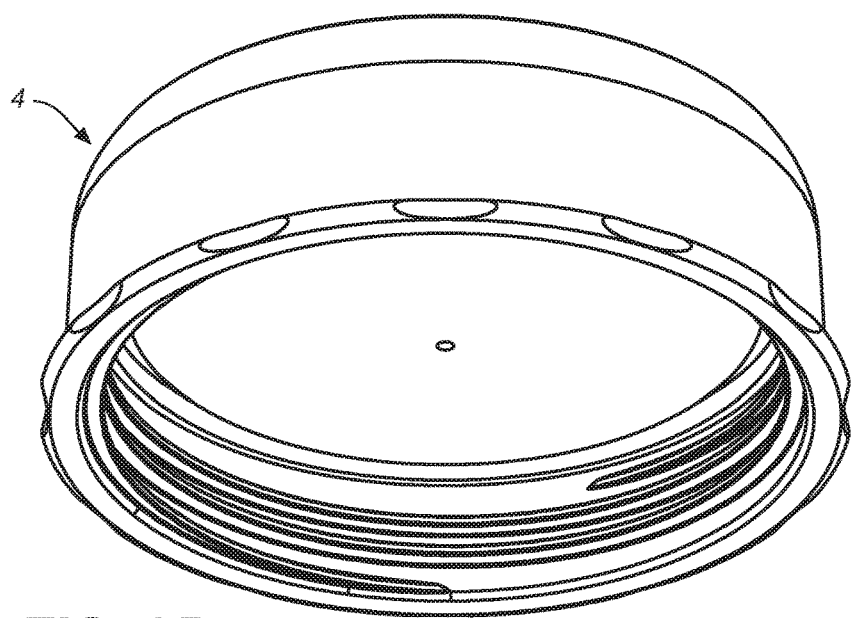

FIGS. 9A and 9B illustrate in more detail that the top of the shell lid 4 contains a flow opening 4A for allowing a beverage contained within the container 16 to flow out of the container 16 and into a flow guide 4B for channeling the flow of a beverage from the container 16. A shell slider valve 4C can be operated within a shell slider valve retainer 4D to open the shell slider valve 4C in order to allow the beverage to flow out of the container 16 or to close the shell slider valve 4C to prevent the beverage from flowing out of the container 16.

Specifically, operation of the catalytic heating system 1 can proceed by providing a flow of the dimethyl ether fuel gas 29 by attaching the fuel canister 28, containing the dimethyl ether fuel gas 29, to the fuel supply platform 24, by screwing the fuel flow valve 88 into the platform receptacle 78, which causes the tap within the fuel gas compression fitting 62 to open the fuel flow valve 88 and causes the dimethyl ether fuel gas 29 within the fuel canister 28 to flow through compression fitting 62 and into the fuel supply assembly 26. The dimethyl ether fuel gas 29 will initially flow through the liquid/gas separator 64, where any fuel gas in liquid form will be removed, and then flow through the pressure regulator 66 that will maintain the fuel gas below a predetermined pressure, and continue flowing until it reaches the solenoid valve 68. With the on/off button 8 in the "off" position, the solenoid valve 68 will be closed, which prevents the dimethyl ether fuel gas 29 from flowing into the fuel and air mixing injector 70. Next, the catalytic heating system 1 can be operated to heat a beverage or food by, if necessary, removing the shell lid 4 by unscrewing it from its engagement with the top of the outer shell 2. A beverage or food can then be placed into the container 16 and the shell lid 4 reattached to the outer shell 2. The catalytic combustion process that is utilized to heat the beverage or food is initiated by depressing the on/off button 8 to the "on" position, which activates the programmed microprocessor 60 by closing the circuit connection between the battery 76 and programmed microprocessor 60. At a predetermined time after activation, the programmed microprocessor 60 causes the solenoid valve 68 to open, causing the dimethyl ether fuel gas 29 to flow into the fuel and air mixing injector 70. As the dimethyl ether fuel gas 29 flows through the fuel and air mixing injector 70, the velocity of the fuel gas flow 29 will increase due to the distal narrowing of the injector 70. Increasing the velocity of the dimethyl ether fuel gas 29 causes the pressure in the fuel and air mixing injector 70 to decrease, thereby entraining the dimethyl ether fuel gas 29 with atmospheric air in order to produce a dimethyl ether fuel gas and entrained air mixture, while maintaining an entrainment ratio of about 15 or more parts air to about one part dimethyl ether fuel gas 29 for the mixture. The dimethyl ether fuel gas and the entrained air mixture is injected by the fuel and air mixing injector 70 into the flow-through fuel gas inlet elbow 34 and then into the elongate sidewall enclosure 32 defining the enclosed catalytic combustion chamber 30, thereby constraining the flow of the mixture though the enclosed catalytic combustion chamber 30 to the curved and linear path best illustrated in FIG. 5E. While the flow of the dimethyl ether fuel gas 29 and entrained air mixture is flowing through the enclosed catalytic combustion chamber 30, additional actions that contribute to the generation of the catalytic combustion process are: contacting the dimethyl ether fuel gas 29 and entrained air mixture with the catalytic reaction media 40 and the combustion starting element 50; activating the programmed microprocessor 60 to cause an electrical current to be supplied to the combustion starting element 50, which causes the combustion starting element 50 to heat up, thereby igniting the flow of dimethyl ether fuel and entrained air mixture and generating the catalytic combustion process within the catalytic reaction media 40 within enclosed catalytic combustion chamber 30. Importantly, this catalytic combustion process within the enclosed catalytic combustion chamber 30 can completely combust all of the dimethyl ether fuel gas 29. The heat generated by the catalytic combustion process causes the top channel 20A and top chamber plate 20 to heat up by conducting heat away from the catalytic combustion chamber, which in turn heats the container 16 and the beverage or food within the container 16. Exhaust generated from the catalytic combustion process passes through the flow-through exhaust outlet elbow 36, through the tubular connection 37 between the outlet elbow 36 and the exhaust outlet duct 14 within the outer shell 2, and out the exhaust outlet duct 14.

In addition to the advantages relating to the size and shape of the elongate sidewall enclosure 32 described above, the catalytic heating system 1 provides another beneficial feature related the combustion of the dimethyl ether fuel gas 29 and entrained air mixture within the enclosed catalytic combustion chamber 30. In particular, catalytic combustion process within the enclosed catalytic combustion chamber 30 is confined to the enclosed catalytic combustion chamber 30 defined by the elongate sidewall enclosure 32, with the only openings within the sidewall enclosure 32 being the flow-through fuel gas inlet 32C at one end of the sidewall enclosure 32 and the flow-through exhaust outlet 32D within the opposite end of the sidewall enclosure 32. This feature provides for a controllable and safe combustion process, including the feature of being able to safely transport all of the exhaust from the catalytic combustion through a single flow-through outlet to the environment outside of the catalytic heating system 1.

An inherent thermodynamically related limitation to the ability to achieve the complete combustion of all of the fuel gas in a catalytic combustion chamber is that the combustion process itself generates an amount of pressure in the chamber, generally referred to as "back pressure", that can prevent complete combustion of the fuel gas. Other factors that can also contribute to an increase in back pressure are related to fluid mechanical limitations involving the geometry of the combustion chamber. In this regard, it is to be reasonably expected that a catalytic combustion process within the enclosed catalytic combustion chamber 30 within catalytic heating system 1 would produce more back pressure than would be expected from the catalytic process itself. This expected increase in back pressure is due to the unique geometry of the enclosed catalytic combustion chamber 30, defined by the partially curved and cylindrically shaped elongate sidewall enclosure 32, and due to the fact that the sidewall enclosure 32 has a single flow-through fuel gas inlet 32C and single flow-through exhaust outlet 32D, with no other flow-through openings within the sidewall enclosure 32. And, in fact, as will be described in more detail below, during the development of the catalytic heating system 1, the inventors determined that neither butane nor propane could be used to overcome the back pressure generated in the enclosed catalytic combustion chamber 30 and achieve the complete combustion of the fuel gas. Achieving complete combustion of the fuel gas in the enclosed catalytic combustion chamber 30 is important because incomplete combustion results in the inefficient utilization of the fuel gas and due to the fact that incomplete combustion can also release toxic substances into the environment and potentially inhaled by a user of the catalytic heating system 1.

From a fluid mechanics standpoint, one way to overcome back pressure and obtain complete combustion of the fuel gas within the enclosed catalytic combustion chamber 30 within the catalytic heating system 1 is to reduce the total amount of work energy required to overcome both the back pressure and the energy needed to carry large quantities of entrained air through the combustion chamber 30 and out the exhaust. A fixed amount of kinetic and potential energy is imparted to the fuel gas stream as it first enters the fuel and air mixing injector 70. The amount of energy the fuel gas stream obtains as it enters mixing injector 70 is dependent upon the fuel gas pressure, the density of the fuel gas, and the geometry (i.e. size and shape) of the mixing injector 70 orifice. With these principals in mind, the inventors of the catalytic heating system 1 carried out experiments to determine if complete combustion in the enclosed catalytic combustion chamber 30 could be attained using either butane or propane, which are the fuel gases used in other portable heating devices for heating beverages or food. In order to achieve a complete combustion of the butane fuel gas, the stoichiometric ratio of butane, about 32 parts of air to one part of fuel, requires the fuel and air mixing injector 70 to produce a butane fuel gas and entrained air mixture having an entrainment ratio also of about 32 or more parts of air to one part of fuel. Similarly, in order to achieve a complete combustion of the propane fuel gas, the stoichiometric ratio of propane, about 25 parts air to one part fuel, dictates that the fuel and air mixing injector 70 produce a propane fuel gas and entrained air mixture having an entrainment ratio also of about 25 parts or more of air to one part of fuel. In their experiments, however, the inventors found that it was not possible to overcome back pressure and achieve complete combustion within the enclosed catalytic combustion chamber 30 using butane or propane as a fuel source. It was believed that this might have been due, at least in part, to the fact that attaining complete combustion using butane or propane as the fuel gas with the catalytic heating system 1 requires that air comprise a substantially greater percentage of the fuel gas and entrained air mixture due to the relatively high stoichiometric air to fuel ratios of these fuels. This in turn requires the fuel and air mixing injector 70 to provide relatively high entrainment ratios. The high entrainment ratios required by butane and propane contributes to a substantial increase in the work energy required to entrain air within the fuel and air mixing injector 70, leaving less energy available to perform the work necessary to flow the fuel and entrained air mixture through the enclosed catalytic combustion chamber 30. This explains, at least in part, the inability to overcome back pressures that can arise within the enclosed catalytic combustion chamber 30 when butane or propane is used as the fuel gas source.

A potential solution to this inability to overcome back pressure and achieve the complete combustion within the catalytic heating system 1 would be to use a different fuel having a lower stoichiometric ratio, allowing for a lower entrainment ratio required to achieve complete combustion in the enclosed catalytic combustion chamber 30. The ideal fuel gas would be one with a stoichiometric air to fuel ratio lower than the stoichiometric air to fuel ratios of butane or propane that would, therefore, give rise to less kinetic energy required to entrain air injected by the fuel and air mixing injector 70 into the enclosed catalytic combustion chamber 30, while still providing the same beneficial properties of butane and propane, such as being readily stored in a liquid state at pressures and temperatures compatible with portable consumer products. In fact, the inventors experimentally determined that dimethyl ether fuel gas 29 unexpectedly produces sufficient kinetic energy of the fuel gas to entrain an adequate amount of air as it exits the fuel and air mixing injector 70 and still have sufficient amount of kinetic energy remaining to overcome back pressure and achieve complete combustion within the enclosed catalytic combustion chamber 30.

In order to achieve a complete combustion of the dimethyl ether fuel gas 29 within the enclosed catalytic combustion chamber 30, the stoichiometric ratio of the dimethyl ether, about 15 parts of air to one part of fuel, requires the fuel and air mixing injector 70 to produce a dimethyl ether fuel gas 29 and entrained air mixture that has an entrainment ratio of about 15 or more parts of air to one part of fuel. In this regard, given identical flow through conditions within the fuel and air mixing injector 70, the inventors determined that, based upon fluid mechanical principles, the exit velocities from the mixing injector 70 for all three gasses should be within about 10% of each other. Thus, the kinetic energy available for driving the flow of fuel gas and entrained air mixture through the enclosed catalytic combustion chamber 30 should be roughly similar for each gas. As a result, the inventors hypothesized that dimethyl ether might have enough kinetic energy available to outperform butane and propane and possibly be able to overcome enough back pressure within enclosed catalytic combustion chamber 30 to achieve the complete combustion of the dimethyl ether. In fact, in experiments carried out by the inventors, they confirmed that their hypothesis was correct in that the experiments demonstrated not only was the utilization of dimethyl ether able to overcome more back pressure than butane and propane but that the complete combustion of the dimethyl ether was surprisingly achieved in the combustion chamber 30 within the catalytic heating system 1. The specific results of the inventors' experiments are summarized in the Table I below:

TABLE I

COMPARISON OF EXCESS AIR WITH FIXED VENTURI INJECTOR DESIGN UNDER IDENTICAL REACTION CHAMBER CONDITIONS

| FUEL GAS | STOICHIOMETRIC AIR-FUEL RATIO | FUEL GAS DENSITY (at STP) | EXCESS AIR |
| --- | --- | --- | --- |
| Dimethyl Ether | 15 to 1 | 2.055 [g/l] | Positive 10% |
| Butane | 32.5 to 1 | 2.593 [g/l] | Negative 30% |
| Propane | 25 to 1 | 1.967 [g/l] | Negative 15% |

Table I

As shown in the table, the inventors measured the quantity of air that was contained in the exhaust from using dimethyl ether, butane, and propane as the fuel gases that were combusted within in the catalytic combustion process within the catalytic heating system 1 as described above. In this regard, the specific dimensions for the cylindrically shaped elongate sidewall enclosure 32, enclosing and defining the enclosed catalytic combustion chamber 30, utilized in the experiments were the following: diameter=6.3 mm; radius of circular curvature=16.5 mm; length of circular curvature=50 mm; length of each linear section=4 mm; and overall length of the elongate enclosure from the fuel gas inlet to the exhaust outlet duct=85 mm. The catalytic combustion process utilizing dimethyl ether generated an exhaust containing about 10% more air than required to maintain a complete combustion of the dimethyl ether in the enclosed catalytic combustion chamber 30, establishing that all of the dimethyl ether was combusted. The results for butane and propane, however, demonstrate that butane and propane generated 30% and 15% less air, respectively, than would have been required to completely combust those fuel gasses, meaning that not all of the butane or propane was completely combusted.

Another unexpected result of using dimethyl ether fuel gas 29 as the fuel source for the catalytic heating system 1 arises from thermodynamic considerations that pertain to light-off temperature, which is often defined as the temperature, often abbreviated as $T_{50}$, at which 50% of the fuel gas has been combusted within the combustion chamber. Since the light-off temperature of dimethyl ether is significantly lower than the light-off temperature of butane and propane, complete combustion of dimethyl ether in a catalytic combustion process occurs at a significantly lower temperature than either butane or propane, which also indicates that the complete combustion of dimethyl ether generates less back pressure that butane or propane. As a result, the combination of a low entrainment ratio and a low light-off temperature can be expected to work together to reduce back pressure within the enclosed catalytic combustion chamber 30.

In addition, the ability to achieve complete combustion of the dimethyl ether fuel gas 29 in the enclosed catalytic combustion chamber 30 gives rise to another unexpected result related to potential flame propagation within the combustion chamber 30. In any catalytic reaction process within a combustion chamber it is important to limit or prevent flame generation inside or outside of the chamber. For example, if a combustible mixture of fuel gas and air were to accumulate in a region outside of the reaction chamber it would be desirable to insure that no flame could be generated as a result of the catalytic reaction occurring within the reaction chamber. Similarly, if the temperature within the reaction chamber were to reach levels at or above the lowest temperature at which the fuel gas will spontaneously ignite without an external source for ignition, generally referred to as the "auto-ignition temperature", flame propagation events could become more likely and should be prevented. In this regard, it has been reported that in order to achieve this result, the chamber geometry should have certain dimensional relationships. In particular, reaction chambers, like the enclosed catalytic combustion chamber 30 that are elongated and cylindrically shaped, surprisingly provide the foundation for limiting or preventing flame propagation events. In this regard, an important parameter related to the shape of the reaction chamber is the critical flame quenching diameter. Cylindrical chambers with diameters below this critical value will not allow flames to propagate, and it is generally known that quenching diameters for most hydrocarbon fuels, including dimethyl ether, are in the range of about 10 millimeters or less for mixtures that have an air to fuel equivalence ration of between about 0.6 and 1.0 (e.g., *Proceedings of the International Conference on Heat Transfer and Fluid Flow*, Prague, Czech Republic, Aug. 11-12, 2014, Paper No. 36: "Quenching Distance and Quenching Diameter Ratio for Flame Propagating in Propane/Air mixtures", by Arthur N. Gutkowski and Teresa Parra-Santos). This critical flame quenching diameter unexpectedly overlaps the preferred diameter of the elongate enclosure 32 enclosing the combustion chamber 30 of between 5 and 10 millimeters. More specifically, by simply specifying that the elongate enclosure 32 preferably has a diameter of about between 5 and 10 millimeters, the catalytic heating system 1 is able to surprisingly achieve the unrelated favorable effects of: 1) an evenly distributed heating pattern for heating the beverage or food and simultaneously fill the enclosed catalytic combustion chamber 30 with a sufficient amount of catalytic reaction media 40 to achieve an adequate heating power to heat the beverage or food; and 2) preventing or limiting flame propagation within the enclosed catalytic combustion chamber 30.

Although dimethyl ether is known to be useful as a fuel source in some contexts, the fuel is not disclosed as a fuel source in a catalytic combustion application as disclosed by the catalytic heating system and 1. And, there are reasons why persons skilled in the art of open flame devices have utilized fuels like butane and propane; rather than dimethyl ether as a potential fuel gas source. One such reason is that dimethyl ether has an energy density of about 68,930 BTU/cubic foot, which is notably less than the energy densities of butane and propane, with butane having an energy density of about 94,000 BTU/cubic foot and propane having an energy density of about 84,250 BTU/cubic foot. Since devices for heating beverages and food have limited amounts of stored fuel gas, it is desirable to use fuel gases like butane and propane with high energy densities so that sufficient heating can be produced with a minimum amount of fuel. Dimethyl ether, with its lower energy density, would most likely not be considered as a suitable alternative. The inventors have surprisingly discovered, however, that due to the combination of dimethyl ether's relatively low light-off temperature, low stoichiometric air to fuel ratio, and a more ideal vapor pressure characteristic, these advantages outweigh the potential disadvantage of the lower energy density of dimethyl ether as a fuel gas utilized in the catalytic heating system and 1.

Another reason that dimethyl ether might not be considered as an acceptable fuel source is that ether compounds are generally known to have the characteristic of forming dangerous peroxide compounds when exposed to air. However, the inventors of the catalytic heating system 1 have determined that dimethyl ether does not exhibit that characteristic.

In addition to having a relatively low entrainment ratio and light-off temperature that combine to achieve complete combustion within the catalytic heating system 1, the utilization of dimethyl ether fuel gas 29 as the fuel source for the catalytic heating system 1 has other unexpected advantages over other fuel gases like butane and propane. One such advantage is that the use of the dimethyl ether fuel gas 29, allows the catalytic heating system 1 to be operated at altitudes above sea level, while still achieving complete combustion. This advantage can be implemented by setting the fuel and air mixing injector 70 to inject less fuel gas into the enclosed catalytic combustion chamber 30, causing the chamber 30 to receive a fuel gas and entrained air mixture having an entrainment ratio somewhat higher than the ratio needed for achieving complete combustion in the chamber 30 at sea level. Although the "lean" fuel gas condition would prevent the consumption of all of the air injected into the chamber 30, complete combustion of the fuel gas would still be achieved. Then, as the catalytic heating system 1 is operated at increasingly higher altitudes above sea level, the fuel and air mixing injector 70 will increasingly deliver a richer mixture of air and fuel gas, until reaching an altitude where the mixture will produce a stoichiometric condition, where all of the air and fuel gas are being utilized in a complete combustion process within the enclosed catalytic combustion chamber 30. Fuel gases, such as butane and propane, that require a higher entrainment ratio at sea level than dimethyl ether will not be able to achieve a stoichiometric condition at an altitude as high as that achievable by dimethyl ether. Thus, the catalytic heating system 1 that utilizes the dimethyl ether fuel gas 29 as its fuel source is surprisingly more useful over a greater range of altitudes above sea level than other fuels having higher entrainment ratios.

The catalytic heating system 1 has still other surprising advantages over other devices that use butane or propane to heat beverages or food. Dimethyl ether has a useful working pressure at lower ambient temperatures than butane, thus, enhancing the usefulness of dimethyl ether in outdoor applications. And, although propane can be used at lower temperatures, it cannot be used in lighter weight and less expensive canisters that comply with Department of Transportation regulation DOT 2Q but must be used in much heavier and more costly canisters. Dimethyl ether, on the other hand, can be used in canisters that comply with the regulation and at a lower cost.

Figure 18:
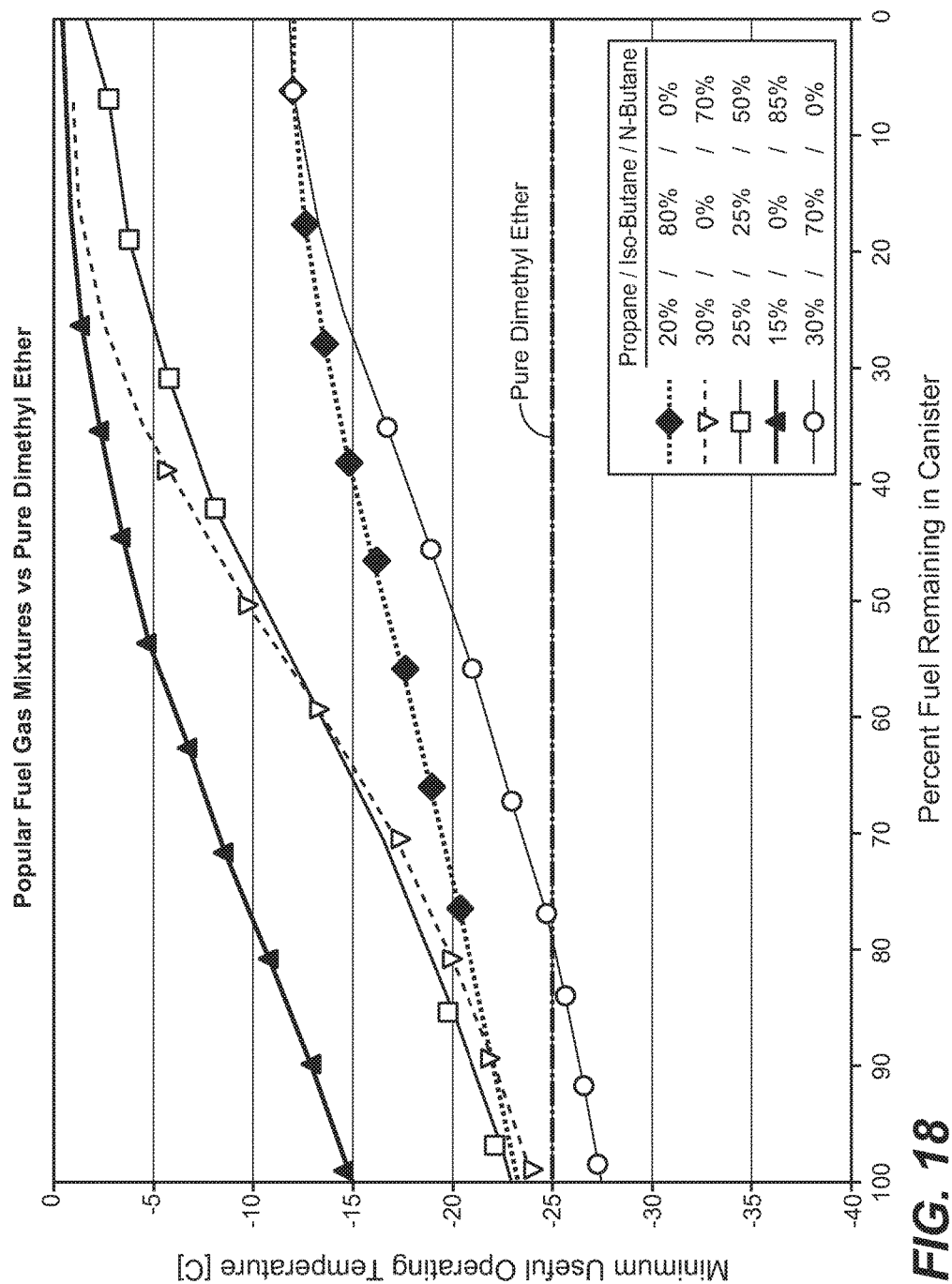
FIG. 18 is a graphical representation of minimum useful ambient operating temperature as a function of percentage of fuel remaining in a fuel canister at sea level.

In this regard, a common approach to improve the useful working pressure at lower ambient temperatures is to combine a mix of high and low boiling point liquefied gases. The graph depicted in FIG. 18 plots minimum useful ambient temperature as a function of percentage of fuel remaining in the canister at sea level, with "minimum useful temperature" being defined as the temperature below which the canister pressure is no longer sufficient to deliver the fuel gas at a suitable rate to the reaction chamber to obtain a targeted amount of heat power. Specifically, the graph illustrates that although mixed fuel gas formulations will provide good low temperature performance when the canister is full, the higher boiling point gas (i.e. propane) will leave the canister at a faster rate, eventually leaving behind mostly low boiling point gases (i.e. butane). Using pure propane or other similar high boiling point liquefied fuel gas would require much heavier and more expensive canisters. Canisters currently used by the aerosol industry would not provide an acceptable solution because propane's equilibrium vapor pressure exceeds both DOT and European safety specifications. The graph also shows, however, that dimethyl ether not only meets these specifications but provides both good low temperature performance and a steady performance as the canisters fuel is depleted.

The catalytic heating system 1 for heating a beverage or food is also substantially safer than flame based systems used for the same purposes. Flame based systems obviously present a potential that the open flame could ignite flammable objects in the environment. For example, if a flame based device tips over inside a camping tent, it will almost certainly start a fire inside the tent if the flame contacts a sleeping bag or clothing. Since the catalytic combustion process that takes place in the catalytic heating system 1 does not generate a flame and burns a much lower temperature than a flame based system, it is much less likely to start a fire under the same conditions.

Another surprising advantage of the catalytic heating system 1 is that the fuel supply assembly 26 and electronic components, comprising the programmed microprocessor 60 and battery 76, are all mounted on the fuel supply platform 24. The advantage of this feature is that when the fuel canister 28 releases the dimethyl ether fuel gas 29 into fuel supply assembly 26, the Joule-Thompson effect, which occurs during expansion of most gases, including dimethyl ether, cools the fuel supply assembly 26 and fuel supply platform 24, which, in turn, cool down the circuit board 74 containing the microprocessor 60 and battery 76. Consequentially, the distance between the fuel supply platform 24 and the bottom chamber plate 22 only needs to be sufficient to make room for the fuel supply assembly 26, without concern that the convective and radiant heat from the bottom chamber plate 22 will cause an overheating of the circuit board 74 and its electronic components. This cooling effect unexpectedly allows for a more compact design for the catalytic heating system 1.

In an another embodiment, a catalytic heating system 100 for heating a beverage or food is described is described in FIG. 10A through FIG. 17B. The primary difference between the catalytic heating system 100 and the catalytic heating system 1 is that in the catalytic heating system 1 the container 16 for containing a beverage or food is integral with the top chamber plate 20 within the catalytic combustion assembly 18, and the container is not intended to be used separately from the catalytic combustion assembly 18. However, in the catalytic heating system 100, a container 120 for containing a beverage or food is not integral with a catalytic combustion assembly 122 and is intended, if desired, to be used separately from the catalytic combustion assembly 122. With respect to the similarities between the figures illustrating catalytic combustion assemblies, 18 and 122, the only difference between the component parts illustrated in FIG. 5A through FIG. 5E and those illustrated in FIG. 14A through FIG. 14E is that the top channel 124A disclosed in FIG. 14A through FIG. 14E does not extend above the top surface of top chamber plate 124, which as a result is slightly thicker than top chamber plate 20A disclosed in FIG. 5A through 5E. With respect to the component parts of FIG. 15A through FIG. 17B, they are identical to FIG. 7A through 9B. And, although the component identification numbers for the corresponding sets of figures are not the same, corresponding components are identical. For example, a fuel supply assembly 130 illustrated in FIG. 15A and FIG. 15B pertaining to the catalytic heating system 100 is identical to fuel supply assembly 130 illustrated in FIG. 7A and FIG. 7B pertaining to catalytic heating system 1.

Figures 10A, 10B:
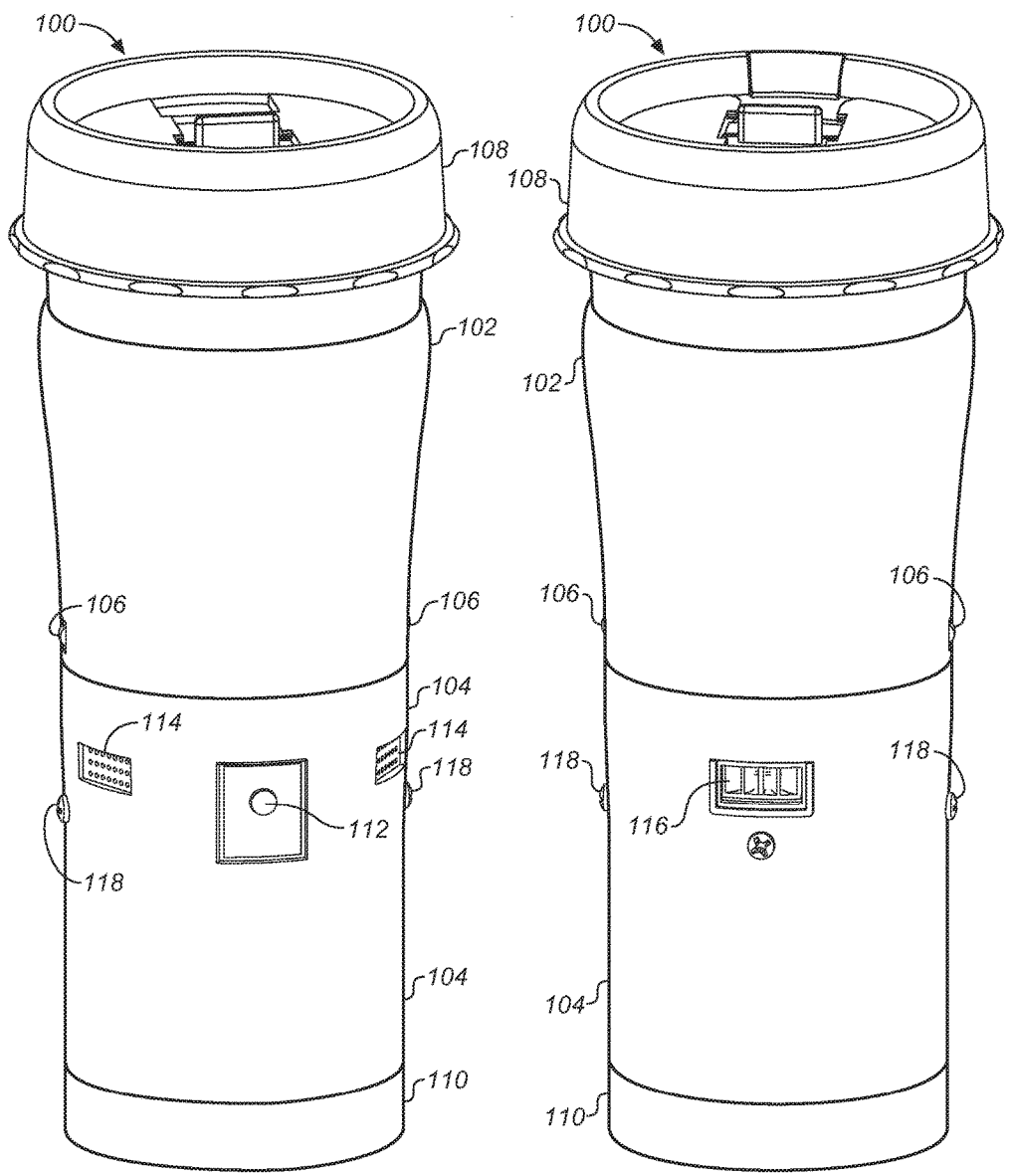
FIG. 10A is a top front perspective illustration of another embodiment of the catalytic heating system for heating a beverage or food.
FIG. 10B is a top back perspective view of the other embodiment of the catalytic heating system.
Figure 10C:
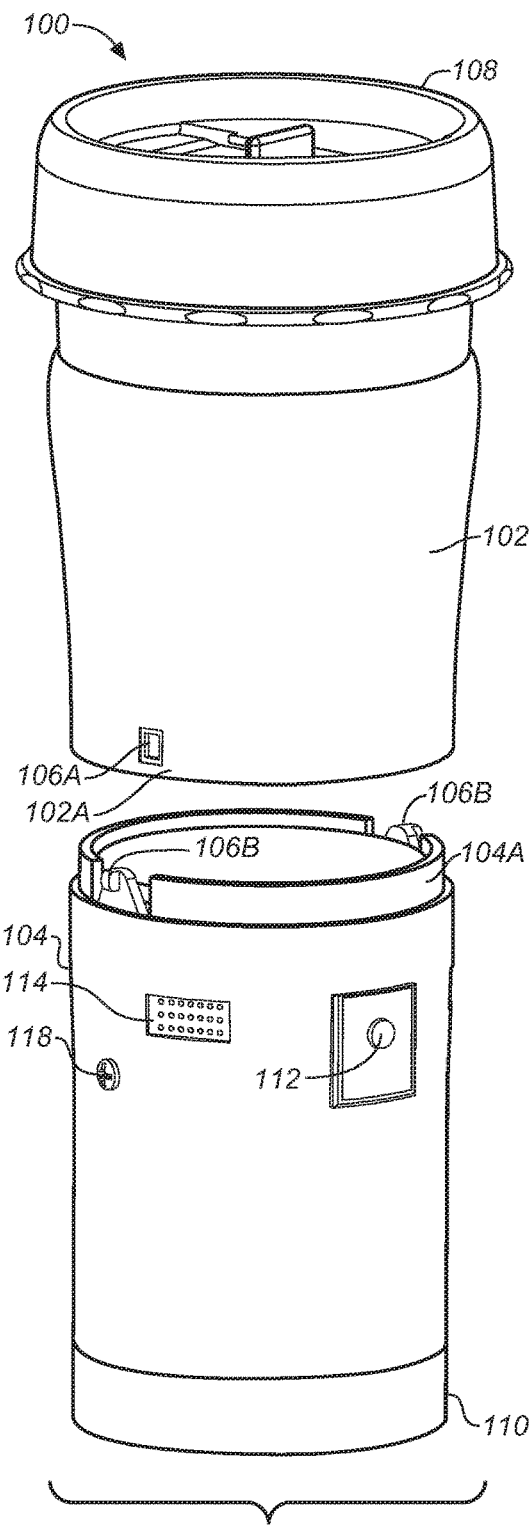
FIG. 10C is a top front perspective view of the other embodiment of the catalytic heating system, illustrating that the system can be separated into an upper shell module and a bottom shell module.

FIGS. 10A and 10B illustrate a top front perspective view and a top back perspective view, respectively, of a catalytic heating system 100 for heating a beverage or food, with the catalytic heating system 100 preferably being portable. More specifically, FIG. 10A illustrates that the catalytic heating system 100 comprises an upper shell module 102 having cylindrical shape and a lower shell module 104 also having a cylindrical shape. The catalytic heating system 100 further comprises a shell lid 108 removably attached to the upper shell module 102, a canister base 110 adjacent to the lower shell module 104, an on/off button 112 on an outside surface of the lower shell module 104, a pair of air vents 114 providing air passages into the inside of the lower shell module 104, a plurality of screws 118 for attaching the lower shell module 104 to the catalytic combustion assembly 122 disposed within the lower shell module 104 as described below, and a snap-fit system 106 for releasably attaching the upper shell module 102 to the lower shell module 104. FIG. 10B illustrates that the lower shell module 104 contains an exhaust outlet duct 116 for providing an exhaust passage from inside of the lower shell module 104 to atmosphere. And, FIG. 10C shows more specifically that the snap-fit system 106 can be utilized to separate upper shell module 102 from the lower shell module 104. Snap-fit system 106 comprises a female portion 106A that is integral with a circumferential bottom portion 102A of the upper shell module 102 and a male portion 106B that is integral with a circumferential band 104A integral with a top end of lower shell module 104. The snap-fit system 106 can be operated to detach the upper shell module 102 from the lower shell module 104 by depressing the male portion 106B, thereby releasing its engagement with the corresponding female portion 106A, and allowing the upper and lower shell modules, 102 and 104, to be separated. Then the separated modules can be reconnected by simply inserting circumferential band 104 of the lower shell module 104 into the circumferential bottom portion 102A of the upper shell module 102 until the female and male portions, 106A and 106B, reengage.

Figures 11, 13:
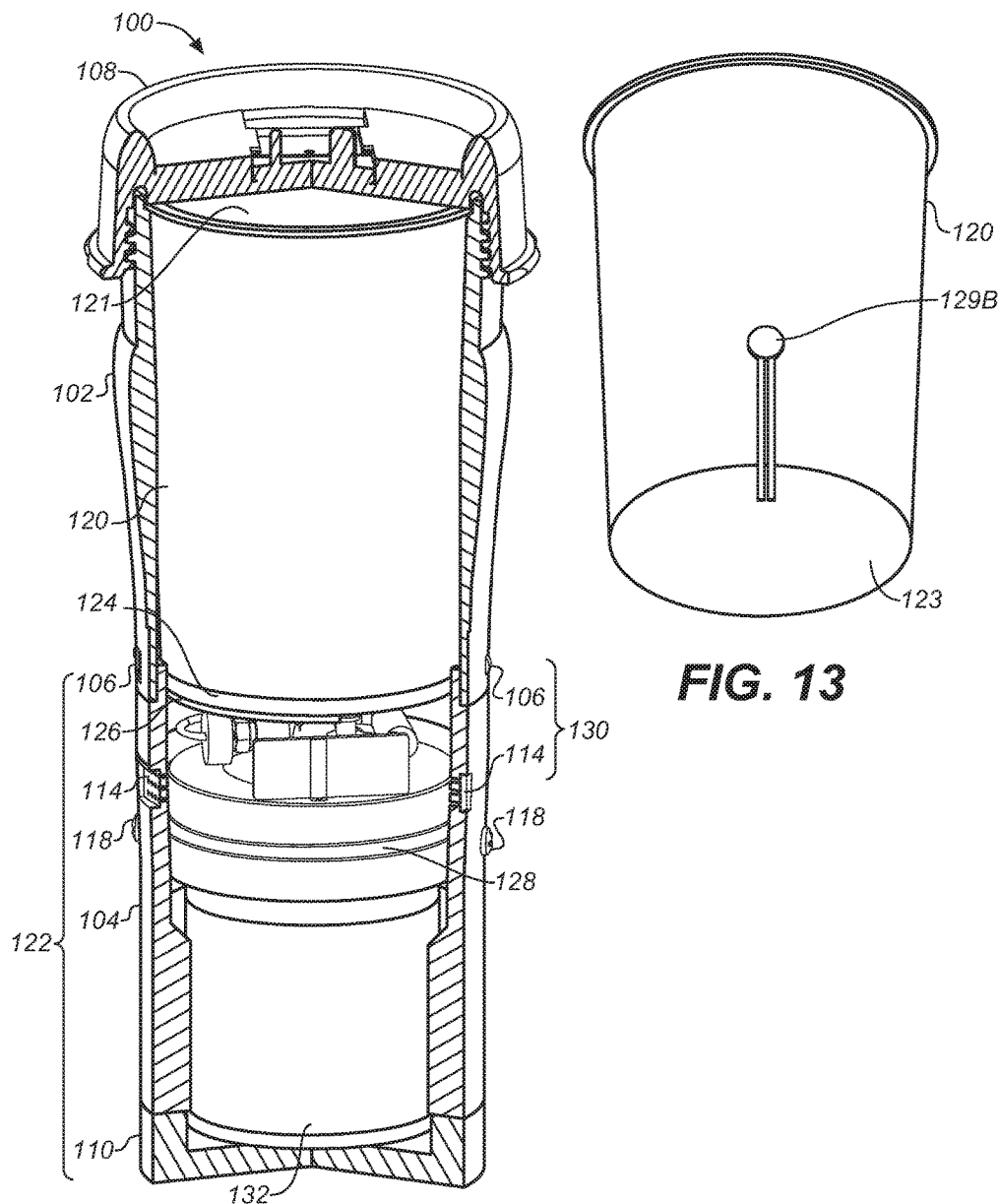
FIG. 11 is the same perspective illustration as in FIG. 10A, with portions of the upper shell module and lower shell module removed, illustrating a container and a catalytic combustion assembly.
FIG. 13 is a bottom perspective view of the container for containing a beverage or food that more specifically illustrates that the bottom of the container is a flat surface, with the top chamber plate not being an integral part of the container.
Figure 12:
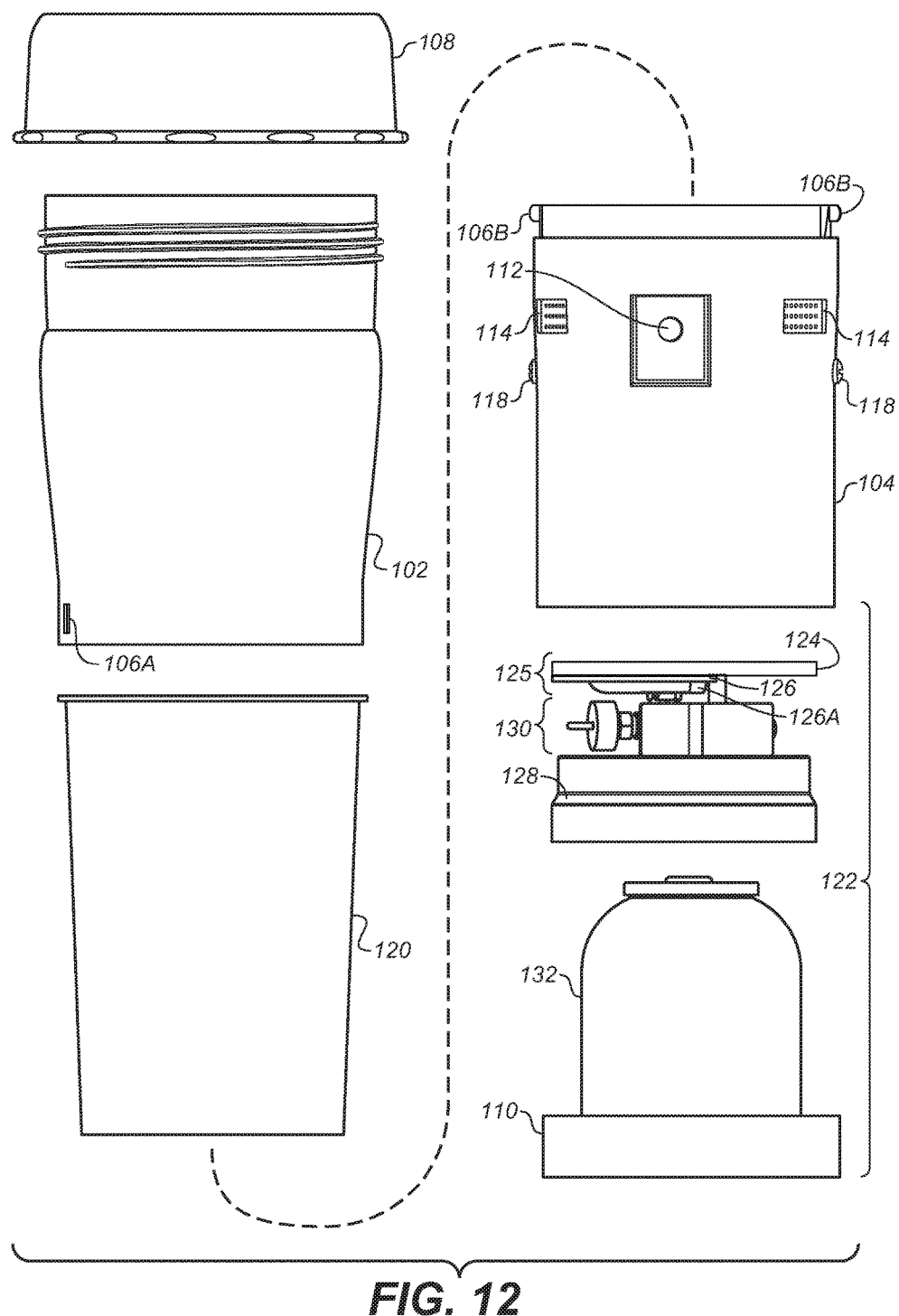
FIG. 12 is an exploded side view of the other embodiment of the catalytic heating system, showing the upper and lower shell modules, the container for containing the beverage or food, and the catalytic combustion assembly comprising a top chamber plate coupled to a bottom chamber plate, a fuel supply assembly, a fuel supply platform and a fuel canister.

FIG. 11 and FIG. 12 illustrate that the upper shell module 102 houses a container 120 for containing a beverage or food and that the lower shell module 104 contains the catalytic combustion assembly 122 for heating the container 120 and its contents. The figures also show that the catalytic combustion assembly 122 comprises: a top chamber plate 124 that is not integral with the bottom of the container 120; a bottom chamber plate 126 coupled to the top chamber plate 124, thereby forming an integrated chamber plate 125; a fuel supply platform 128; a fuel supply assembly 130 having tubular connections to the fuel supply platform 128 and to the bottom chamber plate 126; a fuel canister 132 having the canister base 110 attached to a bottom of the fuel canister 132, with the fuel canister 132 removably attached to the fuel supply platform 128; and dimethyl ether fuel gas 127 as the preferred fuel gas contained in a state of compression within the fuel canister 132. As mentioned above, a reference to a "fuel" or a "fuel gas" means fuel in a gaseous phase, unless indicated otherwise.

The container 120 can be secured to the upper shell module 102 by bonding an outside top perimeter of the container 120 to an inside top perimeter of the upper shell module 102 and by similarly bonding an outside bottom perimeter of the container 120 to an inside bottom perimeter of the upper shell module 102. And, fuel supply platform 128 can be secured to the lower shell module 104 by using the plurality of screws 118 to attach an inside perimeter of the lower shell module 104 to an outside perimeter of the fuel supply platform 128. The shell lid 108 can be removably attached to a top end of the upper shell module 102 by screwing the shell lid 108, having female threads around its inside perimeter, to the upper shell module 102, having male threads around its top outside perimeter. The container 120 can be any container that can conduct heat, such as a cup, mug or sauce pan; preferably the container 120 will have a metallic composition. And, the upper and lower shell modules 102 and 104 can be made of a thermally non-conductive material, preferably a polymeric material; alternatively, the container 120 can have a thermally insulating layer disposed between a sidewall 121 of the container 120 and the upper shell module 102.

The components of the catalytic heating assembly 122 are illustrated in more detail in FIG. 13 through 16. FIG. 13 illustrates that in this embodiment the top chamber plate 124 is not integral with the bottom of the container 120, with the container 120 having a flat container bottom 123 integral with the sidewall 121 of the container 120. FIG. 14A through 14E further illustrate that a bottom surface of the top chamber plate 124 contains a top channel 124A that is integral with the top chamber plate 124 and preferably has a concave half-cylindrical shape, with the top channel 124A also having a curved center section 124B and a pair of linear sections 124C integral with corresponding ends of the curved center section 124B. A top surface of the bottom chamber plate 126 similarly contains a bottom channel 126A, that is integral with the bottom chamber plate 126 and preferably has a concave half-cylindrical shape that extends partially below the bottom surface of bottom chamber plate 22, with the bottom channel 126A having a curved center section 126B and a pair of linear sections 126C integral with corresponding ends of the curved center section 126B. When top and bottom chamber plates, 124 and 126, are aligned in a predetermined manner and coupled together to form the integrated chamber plate 125, top channel and bottom channel, 124A and 126A, form an elongate sidewall enclosure 142, having a preferred cylindrical shape, a curved sidewall center section 142A and a pair of linear sidewall end sections 142B integral with corresponding ends of the curved sidewall center section 142A. The elongate sidewall enclosure 142 encloses and defines an enclosed catalytic combustion chamber 140 that extends through the elongate sidewall enclosure 142, with the chamber 140 having the same curved and linear shape as the elongate sidewall enclosure 142. The elongate sidewall enclosure 142 and the enclosed catalytic combustion chamber 140 are best illustrated in FIG. 14C through FIG. 14E. The side view of FIG. 14C illustrates the top and bottom chamber plates, 124 and 126, after they have been coupled together forming the integrated chamber plate 125; the cross-sectional view of FIG. 14D shows the catalytic combustion chamber 140 enclosed within the elongate sidewall enclosure 142, with a catalytic reaction media 160 and a combustion starting element 164 (described below) removed; and the top plan view of FIG. 14E, with the top chamber plate 124 removed, further illustrates the catalytic combustion chamber 140, elongate sidewall enclosure 142 and the curved sidewall section 142A and pair of linear sidewall sections 142 B, also with the catalytic reaction media 160 and combustion starting element 164 removed.

The elongate sidewall enclosure 142 preferably should have a diameter that is relatively small in order to ensure that the curved portion of the sidewall enclosure 142 can bend in a smooth and continuous fashion within the coupled chamber plates 124 and 126; and in order to more evenly distribute the heat generated from the catalytic combustion chamber 140 to the top chamber plate 124 and to the bottom of the container 120 that is adjacent to the top chamber plate 124, which, in turn, provides for a more even distribution of heat to the beverage or food. At the same time, however, the elongate sidewall enclosure 142 should have a diameter and length that are large enough to contain a sufficient quantity of a catalytic reaction media 160 over the length of the sidewall enclosure 142 to produce a sufficient amount of heat to effectively the top chamber plate 124, bottom of the container 120 and the beverage or food within container 120. Given these considerations, the inventors have determined that the elongate sidewall enclosure 142 preferably should have a diameter of about 10 millimeters or less, and more preferably between about 5 and 10 millimeters. The elongate sidewall enclosure 142 also has a flow-through fuel gas inlet 142C within one end of the sidewall enclosure 142 and a flow-through exhaust outlet 142D within the other end of the sidewall enclosure 142, with the sidewall enclosure 142 having no other flow-through openings within the sidewall enclosure 142. And, a flow-through fuel gas inlet elbow 150 and a flow-through exhaust outlet elbow 152 are sealably disposed within the flow-through fuel gas inlet 142C and the flow-through exhaust outlet 142D, respectively. The flow-through exhaust outlet elbow 152 also has a tubular connection 153 with the exhaust outlet duct 116 within the lower shell module 104. The tubular connection 153 effectively extends the enclosed length of the elongate sidewall enclosure 142 from the flow-through exhaust outlet 142D of sidewall enclosure 142 to the exhaust outlet duct 116.

It is preferred that the top and bottom chamber plates, 124 and 126, are coupled together by utilizing a plurality of binder posts 154, with top portions of the binder posts 154 disposed within corresponding openings through the top chamber plate 124, with bottom portions of the binder posts 154 disposed within corresponding openings through the bottom chamber plate 126, and with bottom ends of the binder posts 154, which extend away from the bottom surface of the bottom chamber plate 126, used to couple the top chamber plate 124 to the bottom chamber plate 126 by flattening the ends of the binder posts 154 against the bottom surface of the chamber plate 126. Preferably, the top and bottom chamber plates, 124 and 126, have a metallic composition.

Figure 14A:
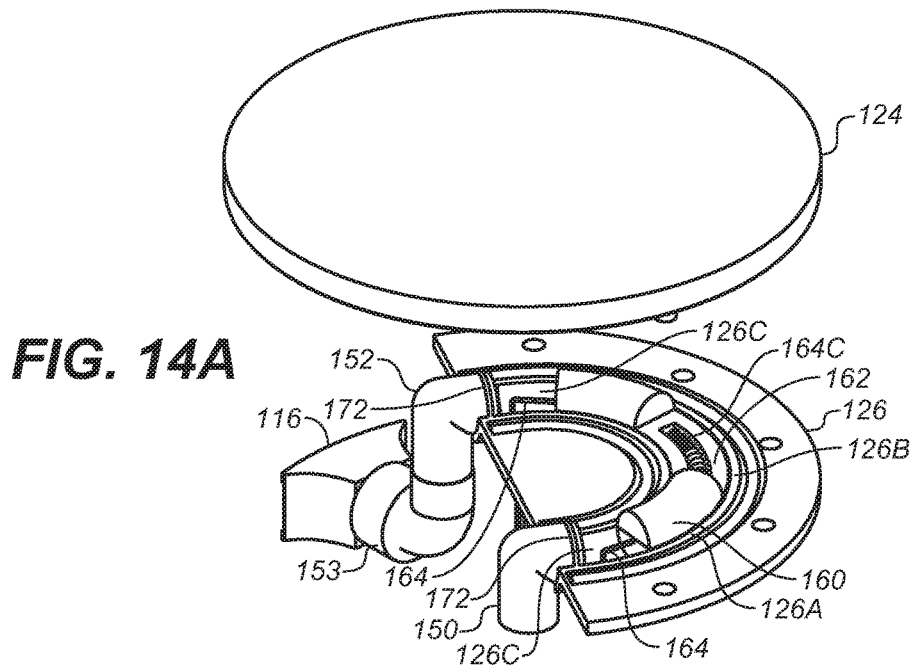
FIG. 14A is an exploded top perspective view of a top chamber plate and a bottom chamber plate, illustrating that a catalytic combustion chamber can be formed when the top and bottom chamber plates are coupled together.
Figure 14B:
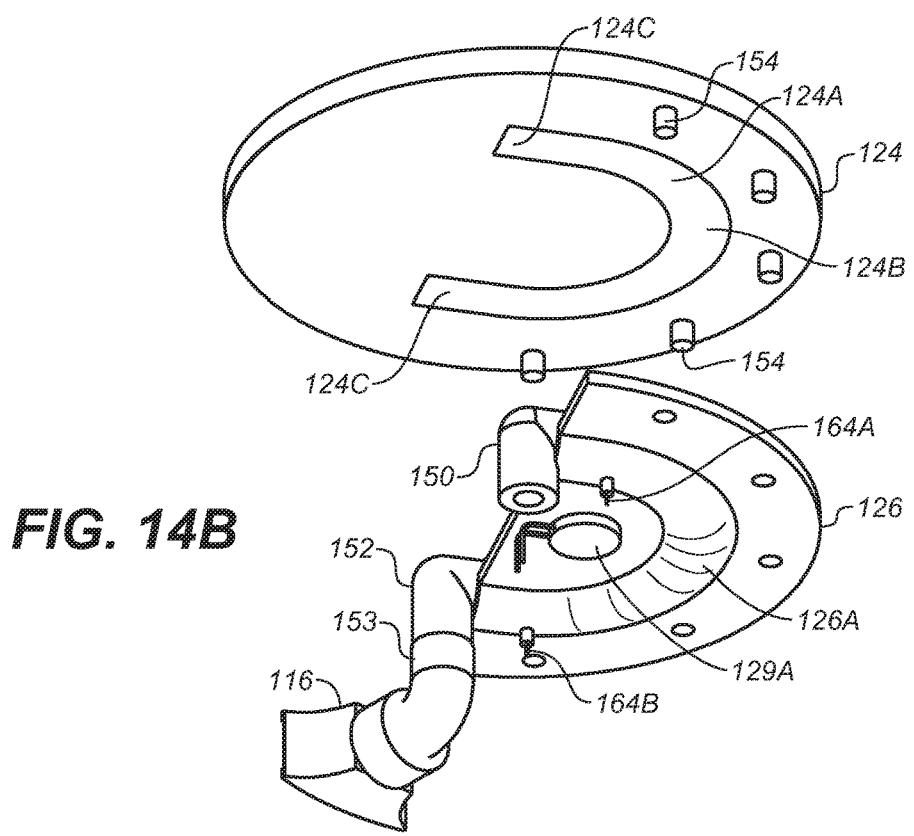
FIG. 14B is an exploded bottom perspective view of the top chamber plate and bottom chamber plate, also illustrating that the catalytic combustion chamber can be formed when the top and bottom chamber plates are coupled together.
Figure 14C:
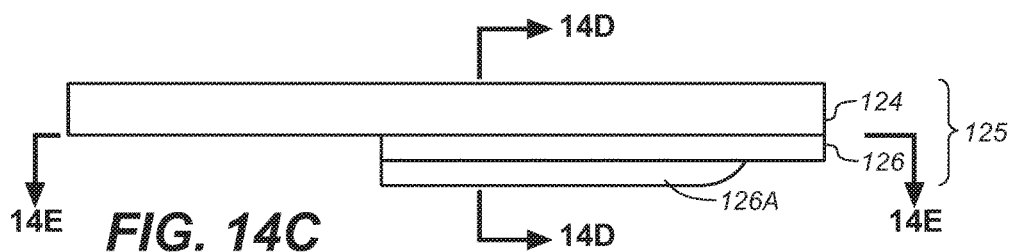
FIG. 14C is a partial side view of the top and bottom chamber plates that have been coupled together, forming the catalytic combustion chamber.
Figure 14D:
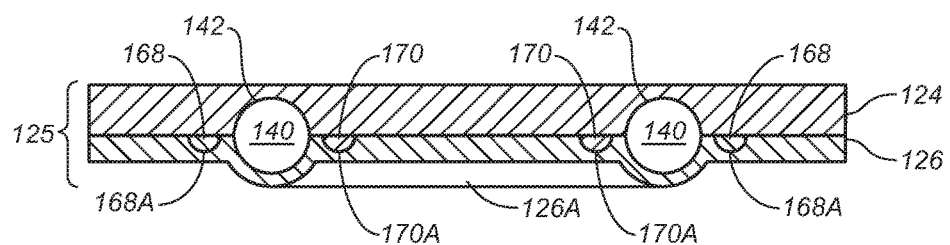
FIG. 14D is a cross-sectional view of FIG. 14C, providing a view in the direction indicated by the arrows 14D-14D in FIG. 14C.
Figure 14E:
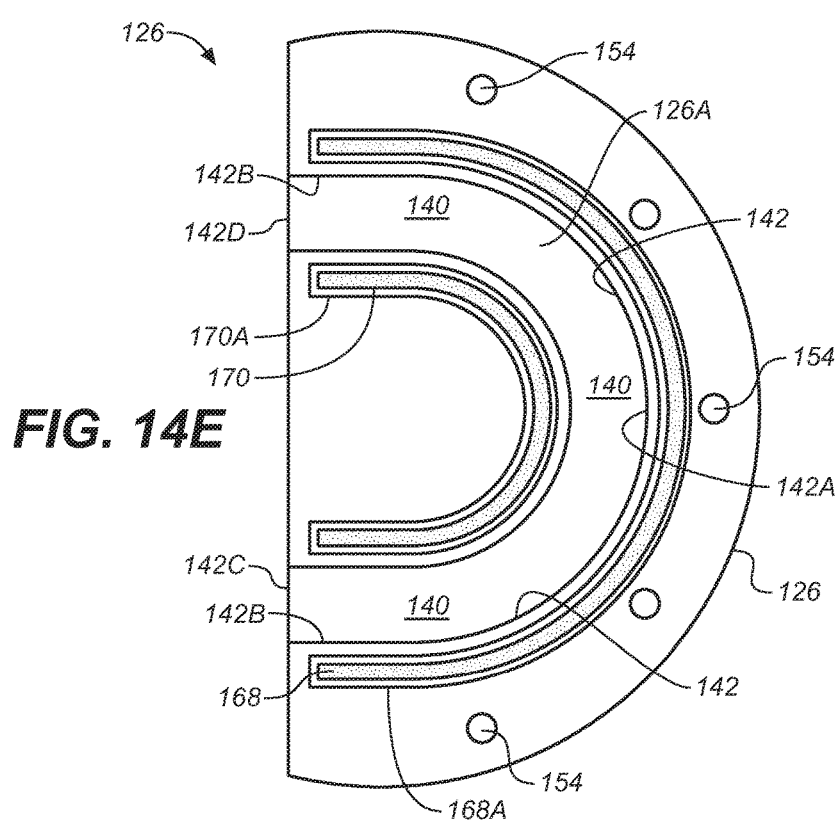
FIG. 14E is a top plan view of FIG. 14C with the top chamber plate removed, providing a view in the direction indicated by the arrows 14E-14E in FIG. 14C.

Before the enclosed catalytic combustion chamber 140 is formed by coupling the top and bottom chamber plates, 124 and 126, the catalytic reaction media 160 preferably can be positioned in a curved orientation, as shown in FIG. 5A, within the curved section 126B of bottom channel 126A. Alternatively, the catalytic reaction media 160 can be positioned in a curved and linear orientation within the curved section 126B of bottom channel 126A and within the pair of linear sections 126C of bottom channel 126A. Although the figure shows that a center top half of the catalytic reaction media 160 has been removed, this is only for the purpose of revealing a curved passage 162 that extends lengthwise through the interior of the catalytic reaction media 160. As also shown in FIGS. 14A and 14B, a combustion starting element 164, preferably made from a narrow gage resistance wire alloy, such as Nichrome 60, Nichrome 80 or Kanthal, can be disposed lengthwise through a center portion of the catalytic reaction media 160, with one end 164A of the combustion starting element 164 disposed through an opening within the bottom channel 126A and another end 164B of the combustion starting element 164 disposed through another opening through the bottom channel 126A, and with a center portion 164C of the combustion starting element 164 disposed through the curved passage 162 within the catalytic reaction media 160. Preferably, as illustrated in FIGS. 14A and 14B, the center portion 164C of the combustion starting element 164 is coiled, which causes the combustion starting element 164 to attain a higher ignition temperature for a given amount of electrical power than would otherwise exist if the combustion starting element 164 were not coiled. The ends, 164A and 164B, of the combustion starting element 164 are in electronic connection with a programmed microprocessor 166 which, when activated, supplies electrical current a battery 138, such as a lithium polymer type battery, to the combustion starting element 164. Alternatively, the combustion starting element 164 can be a spark ignition system comprising a pair of wires disposed within a lengthwise opening within the catalytic reaction media 164, with the pair of wires separated by a predetermined distance within the opening. A large transient electric voltage is formed between the wires using techniques well known to those skilled in the art, such as utilizing a piezoelectric crystal that can produce a substantial voltage when squeezed by mechanical means. The resulting large voltage causes the discharge of a spark between the pair of wires that ignites the catalytic reaction media 164. And, as best illustrated in FIG. 14A through FIG. 14E, in order to ensure that the catalytic combustion process is confined to the catalytic combustion chamber 140, sealing members 168 and 170 are disposed within corresponding sealing channels 168A and 170A within the bottom chamber plate 126, with the sealing channel 168A concentrically positioned outside of bottom channel 126A and sealing channel 170A concentrically positioned inside of bottom channel 126A. In addition, a pair of O-rings 172 is disposed around corresponding portions of flow-through fuel gas inlet elbow 150 and flow-through exhaust outlet elbow 152 in order to further seal the catalytic combustion chamber 140.

Once the catalytic reaction media 160 and combustion element 164 are positioned within the curved bottom channel 126A and the top chamber plate 124 is coupled to the bottom chamber plate 126, the catalytic reaction media 160 and the combustion element 164 are captured in a curved orientation within the curved sidewall section 142A of the elongate sidewall enclosure 142, thereby defining catalytic combustion chamber 140 as having the same shape as the elongate sidewall enclosure 142. In this regard, a curved elongate shape for the catalytic combustion chamber 140 is preferred in order to more evenly distribute the heat from the combustion chamber 140 to the top chamber plate 124 and, thereby, provide for a more even distribution of heat to the beverage or food within container 120. And, the most preferred curved elongate shape for the catalytic combustion chamber 140 is a curvature having a constant radius of curvature (hereinafter referred to as a "circular curvature"), providing a smooth and continuous surface within the combustion chamber 140. Although the catalytic combustion chamber 140 having a circular curvature is preferred, as described in connection with catalytic heating system 1, other curved shapes, such as serpentine or coiled, can be used with catalytic heating system 100.

Figure 15A:
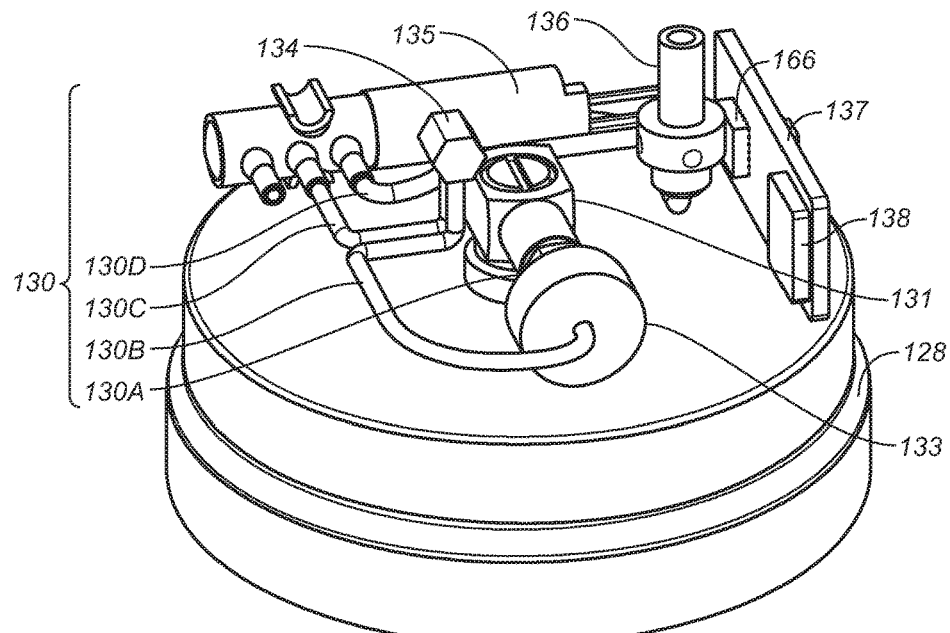
FIG. 15A and FIG. 15B are top perspective and top plan views, respectively, of the fuel supply assembly mounted on the fuel supply platform.
Figure 15B:
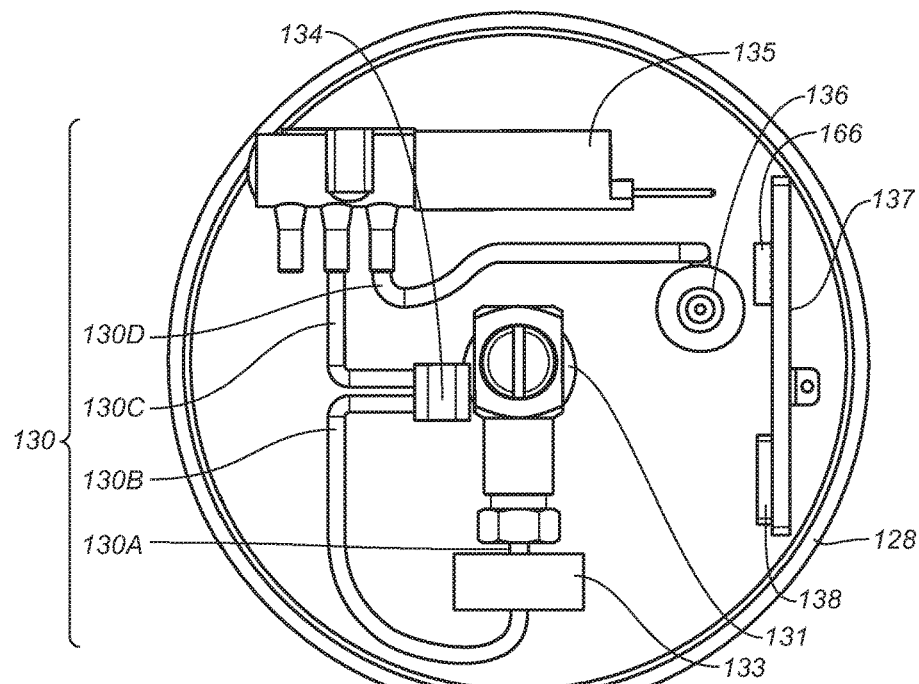

FIGS. 15A and 15B more specifically illustrate the fuel supply assembly 130 that is mounted on a topside of fuel supply platform 128. The fuel supply assembly 130 comprises the following fuel supply components: a fuel inlet valve 131 having a compression fitting and tap for use in fluidly connecting the fuel assembly 130 to the fuel canister 132, containing dimethyl ether fuel gas 127; a liquid/gas separator 133, which could be, but not limited to, a porous oleophobic membrane such as "Supor R" made by Pall Corporation, having a tubular connection through tube 130A with the fuel inlet valve 131, with the liquid/gas separator 133 for removing any dimethyl ether fuel gas 127 that is in liquid form; a pressure regulator 134, such as an ultra-miniature regulator from the "PR-MLS" model series by Beswick Engineering, having a tubular connection through tube 130B with the liquid/gas separator 133, with the pressure regulator 134 for maintaining the pressure of the dimethyl ether fuel gas 127 at a predetermined level; a solenoid valve 135, such as the "LHL" series from the Lee Company, having a tubular connection through tube 130C with the pressure regulator 134, with the solenoid valve 135 for opening and closing the flow of dimethyl ether fuel gas 127 through the fuel supply assembly 130; a fuel and air mixing injector 136, such as a venturi injector, having a tubular connection through tube 130D with the solenoid valve 135, with the fuel and air mixing injector 136 for injecting the dimethyl ether fuel gas 127 and entrained air into the catalytic combustion chamber 140; and a temperature sensor 129A attached to the bottom surface of the bottom chamber plate 126 for sensing the temperature within the catalytic combustion chamber 140; and a temperature sensor 129B attached to the outside surface of the sidewall 121 of container 120 for sensing the temperature of the container 120. And, the fuel supply assembly 130 has a tubular connection to the catalytic combustion chamber 140 by inserting a top end of the fuel and air mixing injector 136 into the flow-through fuel gas inlet elbow 150 of the chamber 140.

The fuel supply assembly 130 further comprises the programmed microprocessor 166 that is attached to and in electrical connection to a circuit board 137 that is mounted on the top side of the fuel supply platform 128. A battery 138, such as a lithium polymer type GM502030 from PowerStream Technology, Inc., can also be attached to and in electrical connection to the circuit board 137, or the battery 138 can be attached to any other appropriate location within the catalytic combustion assembly 122 or within the lower shell module 104 surrounding the catalytic combustion chamber 140. The battery 138 supplies electrical power to the programmed microprocessor 166 when the on/off button 112 is in the "on" position and disconnects electrical power when the on/off button 112 is in the off position. When activated, the programmed microprocessor 166, with inputs from the temperature sensors 129A and 129B, controls the functionality of the solenoid valve 135 in order to control the fuel gas flow rate and temperature within the enclosed catalytic combustion chamber 140. The activated programmed microprocessor 166 also supplies electrical power to the combustion starting element 164, which the microprocessor 166 coordinates with the supply of fuel gas to the enclosed catalytic combustion chamber 140 by opening and closing the solenoid valve 135.

Figure 16:
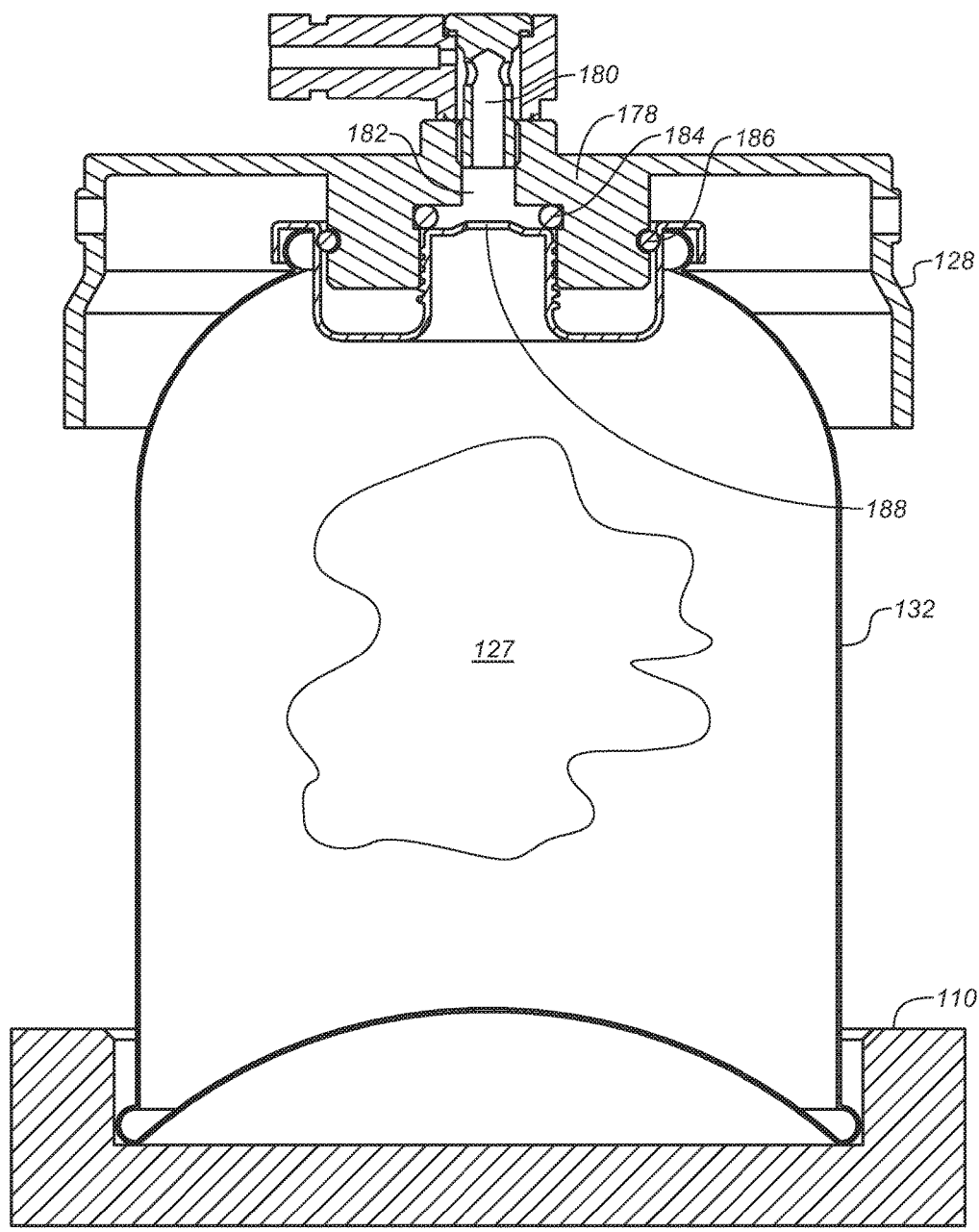
FIG. 16 is a cross-sectional side view of the fuel supply platform and the fuel canister releasably attached to the fuel supply platform.

The cross-sectional side view presented in FIG. 16 illustrates that fuel canister 132 can contain the dimethyl ether fuel gas 127 and that the fuel canister 132 can be releasably connected to the fuel supply platform 128. In order to facilitate the connection, the fuel supply platform 128 also comprises a platform receptacle 178, integral with an underside of the fuel supply platform 128, that contains a platform receptacle opening 180 leading to a cylindrically shaped cavity 182, with the cavity 182 having: female threads extending distally from the opening 180; an inner O-ring 184 disposed within the cavity 182 and positioned distally from the female threads; and an outer O-ring 186 disposed around an outside surface of the platform receptacle 178. The fuel canister 132 contains a fuel flow valve 188, integral with the top of the fuel canister 132, and having male threads that can be used to connect the fuel canister 132 to the fuel supply platform 128 by screwing the fuel flow valve 188 into the platform receptacle 178. This action causes: 1) the tap within fuel gas compression fitting 131 to open the fuel flow valve 188, thereby allowing the dimethyl ether fuel gas 127, which has been compressed within the fuel canister 132, to flow from the canister 132 into the fuel supply assembly 130; and 2) an outside surface of the fuel canister 132 to engage the outer O-Ring 186 and the fuel flow valve 188 to engage the inner O-ring 184, thereby preventing dimethyl ether fuel gas 127 within the fuel container 132 from escaping to atmosphere.

Figure 17A:
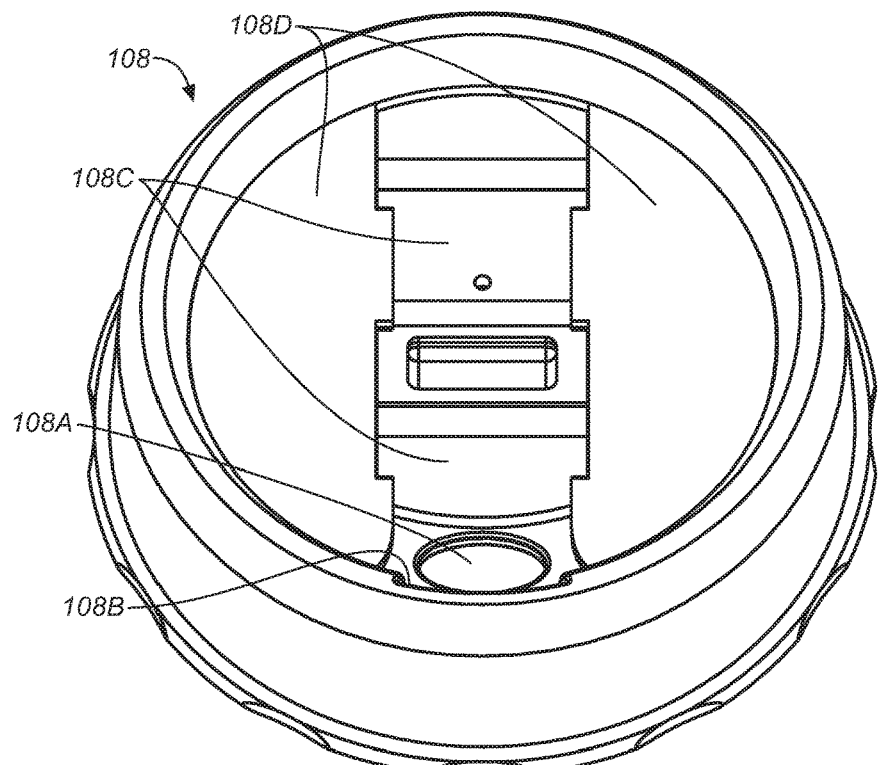
FIGS. 17A and 17B are top and bottom perspective views, respectively, of a shell lid.
Figure 17B:
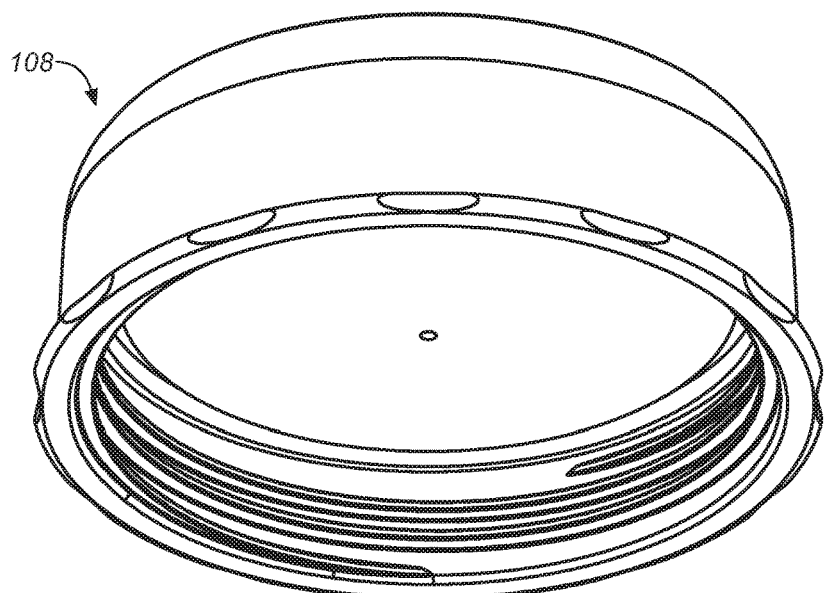

FIGS. 17A and 17B illustrate in more detail that the top of the shell lid 108 contains a flow opening 108A for allowing a beverage contained within the container 120 to flow out of the container 120 and into a flow guide 108B for channeling the flow of a beverage from the container 120. A shell slider valve 108C can be operated within a shell slider valve retainer 108D to open the shell slider valve 108C in order to allow the beverage to flow out of the container 120 or to close the shell slider valve 108C to prevent the beverage from flowing out of the container 120.

The catalytic heating system 100 has general industrial applicability in that it can be utilized to heat a container containing a beverage or food. Specifically, operation of the catalytic heating system 100 can proceed by providing a flow of the dimethyl ether fuel gas 127 by attaching the fuel canister 132, containing the dimethyl ether fuel gas 127 to the fuel supply platform 128, by screwing the fuel flow valve 188 into the platform receptacle 178, which causes the tap within the fuel gas compression fitting 131 to open the fuel flow valve 188 and causes the dimethyl ether fuel gas 127 within the fuel canister 132 to flow through compression fitting 131 and into the fuel supply assembly 130. The dimethyl ether fuel gas 127 will initially flow through the liquid/gas separator 133, where any fuel gas in liquid form will be removed, and then flow through the pressure regulator 134 that will maintain the fuel gas below a predetermined pressure, and continue flowing until it reaches the solenoid valve 135. With the on/off button 112 in the "off" position, the solenoid valve 135 will be closed, which prevents the dimethyl ether fuel gas 127 from flowing into the fuel and air mixing injector 136. Next, the catalytic heating system 100 can be operated to heat a beverage or food by, if necessary, removing the shell lid 108 by unscrewing it from its engagement with the top of the upper shell module 102. A beverage or food can then be placed into the container 120 and the shell lid 108 reattached to the upper shell module 102. The catalytic combustion process that is utilized to heat the beverage or food is initiated by depressing the on/off button 112 to the "on" position, which activates the programmed microprocessor 166 by closing the circuit connection between the battery 138 and programmed microprocessor 166. At a predetermined time after activation, the programmed microprocessor 166 causes the solenoid valve 135 to open, causing the dimethyl ether fuel gas 127 to flow into the fuel and air mixing injector 136. As the dimethyl ether fuel gas 127 flows through the fuel and air mixing injector 136, the velocity of the fuel gas flow 127 will increase due to the distal narrowing of the injector 136. Increasing the velocity of the dimethyl ether fuel gas 127 causes the pressure in the fuel and air mixing injector 136 to decrease, thereby entraining the dimethyl ether fuel gas 127 with atmospheric air in order to produce a dimethyl ether fuel gas and entrained air mixture, while maintaining an entrainment ratio of about 15 or more parts air to about one part dimethyl ether fuel gas 127 for the mixture. The dimethyl ether fuel gas and the entrained air mixture is injected by the fuel and air mixing injector 136 into the flow-through fuel gas inlet elbow 150 and then into the elongate sidewall enclosure 142 defining the catalytic combustion chamber 140, thereby constraining the flow of the mixture though the catalytic combustion chamber 140 to the curved and linear path best illustrated in FIG. 14E. While the flow of the dimethyl ether fuel gas and entrained air mixture is flowing through the catalytic combustion chamber 140, additional actions that contribute to the generation of the catalytic combustion process are: contacting the dimethyl ether fuel gas and entrained air mixture with the catalytic reaction media 160 and the combustion starting element 164; activating the programmed microprocessor 166 to cause an electrical current to be supplied to the combustion starting element 164, which causes the combustion starting element 164 to heat up, thereby igniting the flow of dimethyl ether fuel and entrained air mixture and generating the catalytic combustion process within the catalytic reaction media 160 within catalytic combustion chamber 140. The heat generated by the catalytic combustion process causes the top channel 124A and top chamber plate 124 to heat up by conducting heat away from the catalytic combustion chamber 140, which in turn heats the container 120 and the beverage or food within the container 120. Exhaust generated from the catalytic combustion process passes through the flow-through exhaust outlet elbow 152, through the tubular connection 153 between the outlet elbow 152 and the exhaust outlet duct 116 within the lower shell module 104, and out the exhaust outlet duct 116.

The advantages and unexpected results provided by the catalytic heating system 100 are the same as the advantages, and unexpected results of the catalytic heating system 1 described above. However, the catalytic heating system 100 has the additional advantage of being able to remove the upper shell module 102 and its attached container 120 within the upper shell module 102 from the lower shell module 104, providing the conveniences of using and washing the container 120 separate from the lower shell module 104.

Another embodiment of the catalytic heating system 1 is described herein as catalytic heating system 200 and illustrated in FIG. 19A through FIG. 29. In this regard, the catalytic heating system 200 embodies some of the same components of the catalytic heating system 1 as illustrated in FIG. 1A though FIG. 18. As a result, the components of the catalytic heating system 200 will only be expressly described to the extent those components differ from the components of catalytic heating system 1. And, the component identification numbers for the catalytic heating system 1 will be utilized in the identification of the same components of the catalytic heating system 200.

Figure 19A:
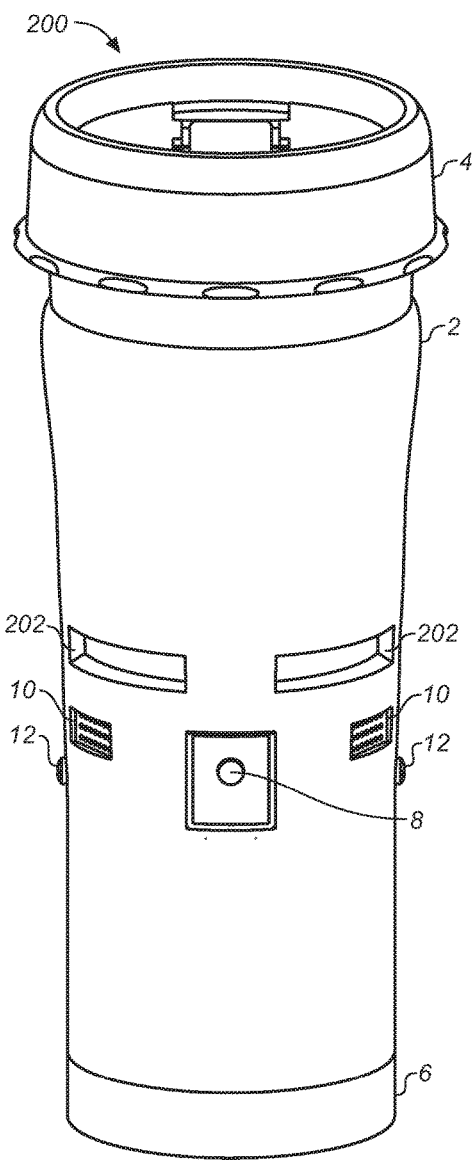
FIG. 19A and FIG. 19B are top front and back perspective illustrations, respectively, of a catalytic heating system for heating a beverage or food.
Figure 19B:
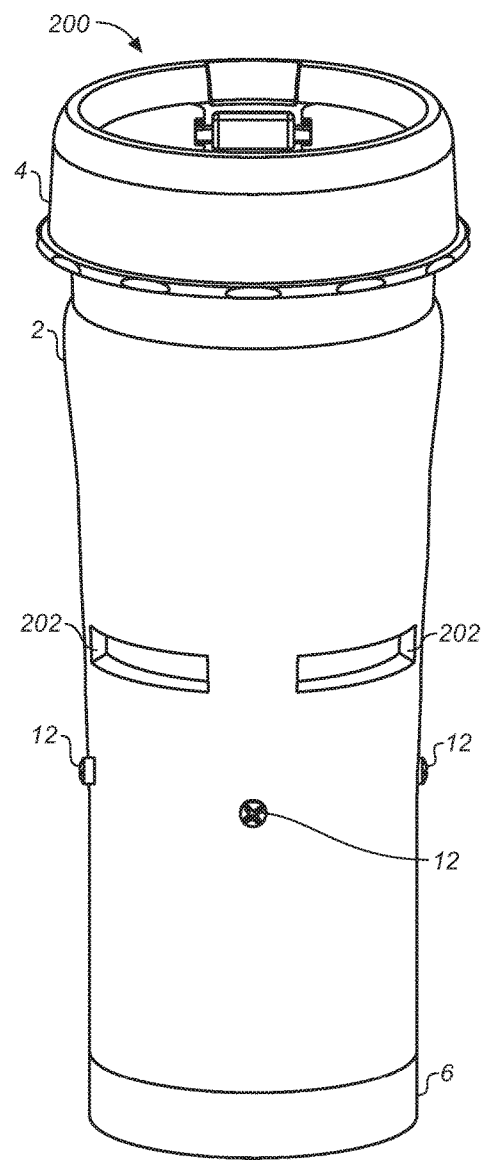

FIG. 19A and FIG. 19B of the catalytic heating system 200, which correspond to FIG. 1A and FIG. 1B of catalytic heating system 1, disclose a plurality of elongate exhaust outlet ducts 202 which replace the exhaust outlet duct 14. The elongate exhaust outlet ducts 202 are positioned around the perimeter of an outer shell 2 and extend though the outer shell 2. Preferably, as shown in the figures, there are four (4) elongate exhaust outlet ducts 202 for venting exhaust gases to atmosphere from a catalytic combustion process described below.

Figure 20:
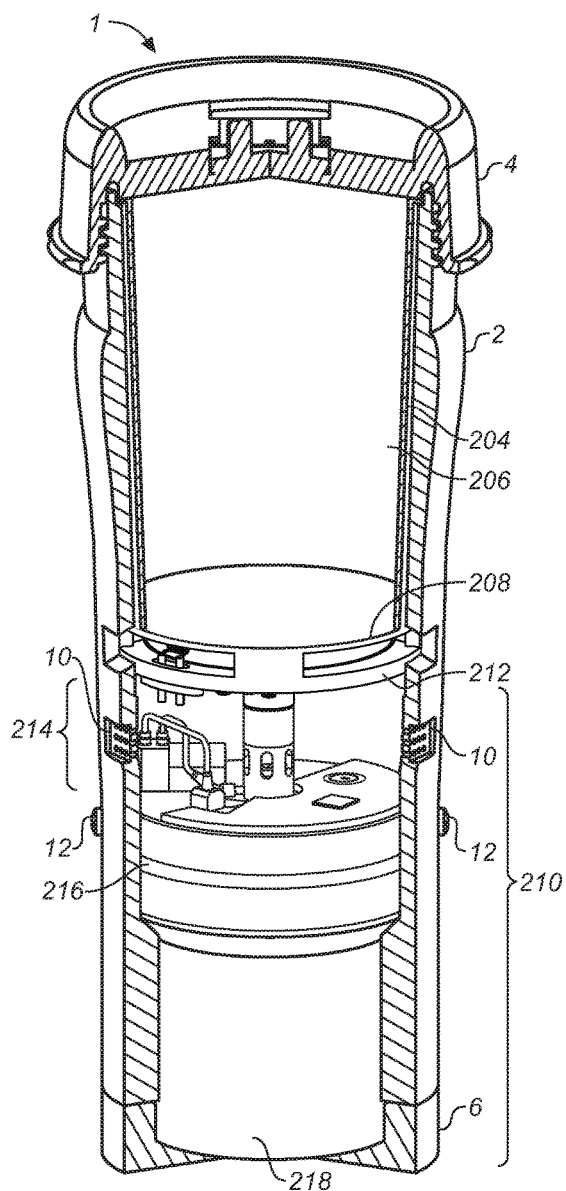
FIG. 20 is the same perspective illustration as in FIG. 19A, with portions of an outer shell removed in order to illustrate a container and a catalytic combustion assembly.
Figure 21:
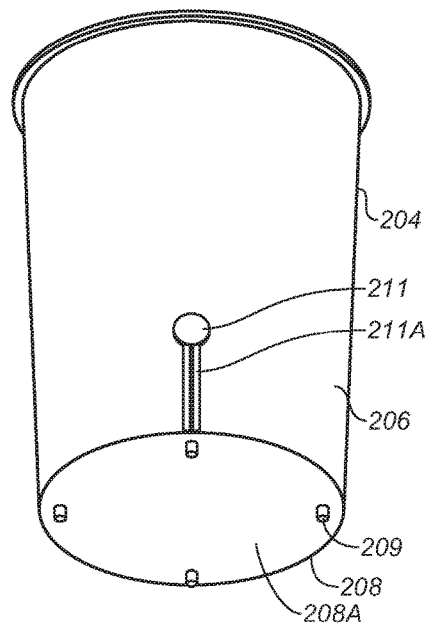
FIG. 21 is a bottom perspective illustration of the container shown in FIG. 20 removed from the outer shell.
Figure 22:
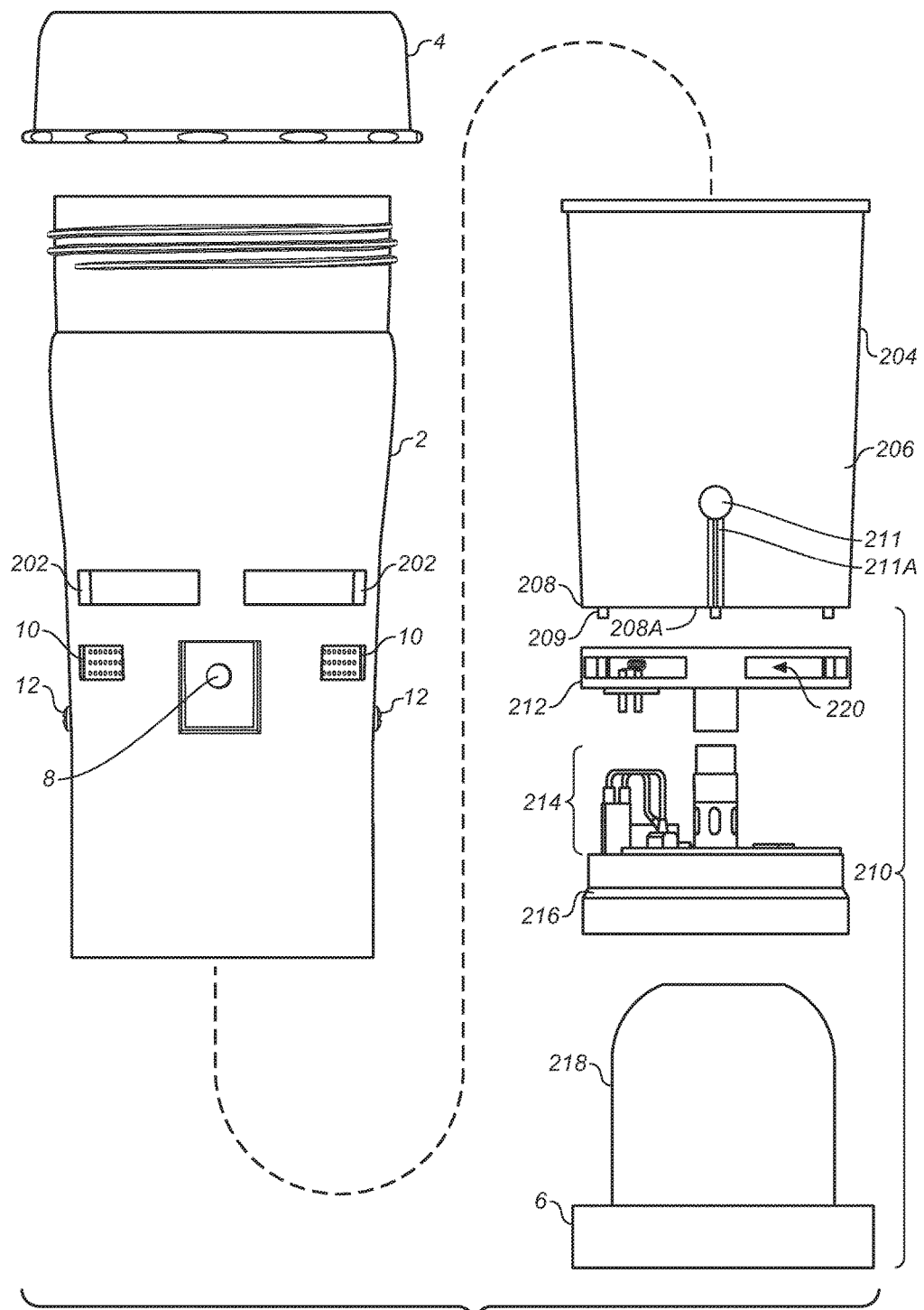
FIG. 22 is an exploded side view of the catalytic heating system, showing the outer shell, the container for containing the beverage or food, and the catalytic combustion assembly as shown in FIG. 20.

FIG. 20 through FIG. 22, which correspond to FIG. 2 through FIG. 4 of catalytic heating system 1, disclose a catalytic combustion assembly 210, which replaces the catalytic combustion assembly 18 of catalytic heating system 1. The catalytic combustion assembly 210 generally comprises: a catalytic combustion enclosure 212 that is integral with a container 204 for containing a beverage or food; a fuel supply assembly 214 having flow-through tubular connections to the catalytic combustion enclosure 212; a fuel supply platform 216 having flow-through tubular connections to the fuel supply platform 216; and a fuel canister 218 having a fuel canister base 6 integral with a bottom end of the fuel canister 218, with the fuel canister 218 removably connected to the fuel supply platform 216.

As best illustrated in FIG. 20, the catalytic combustion assembly 210 is secured within the outer shell 2 by bonding an outside top perimeter of the container 204 to an inside top perimeter of the outer shell 2. And, the fuel supply platform 216 is secured to the outer shell 2 by using a plurality of screws 12 to attach an inside perimeter of the outer shell 2 to an outside perimeter of the fuel supply platform 216. A shell lid 4 can be removably attached to a top end of the outer shell 2 by screwing the shell lid 4, having female threads around its inside perimeter, to the outer shell 2, having male threads around its top outside perimeter. The container 204 can be any container that can conduct heat, preferably having a metallic composition. And, the outer shell 2 can be made of a thermally non-conductive material, preferably a polymeric material.

The container 204, as illustrated in FIG. 20 through FIG. 22, comprises: a container sidewall 206 having a cylindrical shape; and a container bottom plate 208 integral with the container sidewall 206. The container bottom plate 208 has a plurality of securing pins 209, preferably four (4) in number, that are integral with a bottom side 208A of the container bottom plate 208, and with the securing pins 209 disposed around an outside perimeter of the container bottom plate 208. In this regard, as described below in connection with the description of the catalytic combustion enclosure 212, the plurality of securing pins 209 is used to integrate the container bottom plate 208 of container 204 within the catalytic combustion enclosure 212. And, a temperature sensor 211 is integral with an outside surface of the container sidewall 206, with a pair of electrically conductive wires 211A extending from the temperature sensor 211 to a bottom portion of the container sidewall 206, and with an additional pair of electrical connections (not shown) connecting the pair of electrically conductive wires 211A to a battery 264 within a circuit board 260, which is integral with the fuel supply platform 216, as described in more detail below.

Figure 23A:
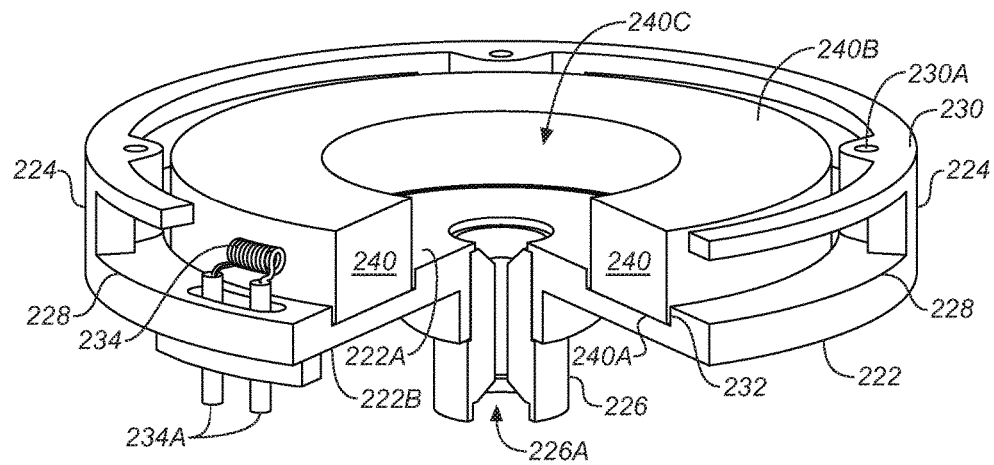
FIG. 23A is a partial top perspective view of a catalytic combustion enclosure within the catalytic combustion assembly as shown in FIG. 20 and FIG. 22.
Figure 23B:
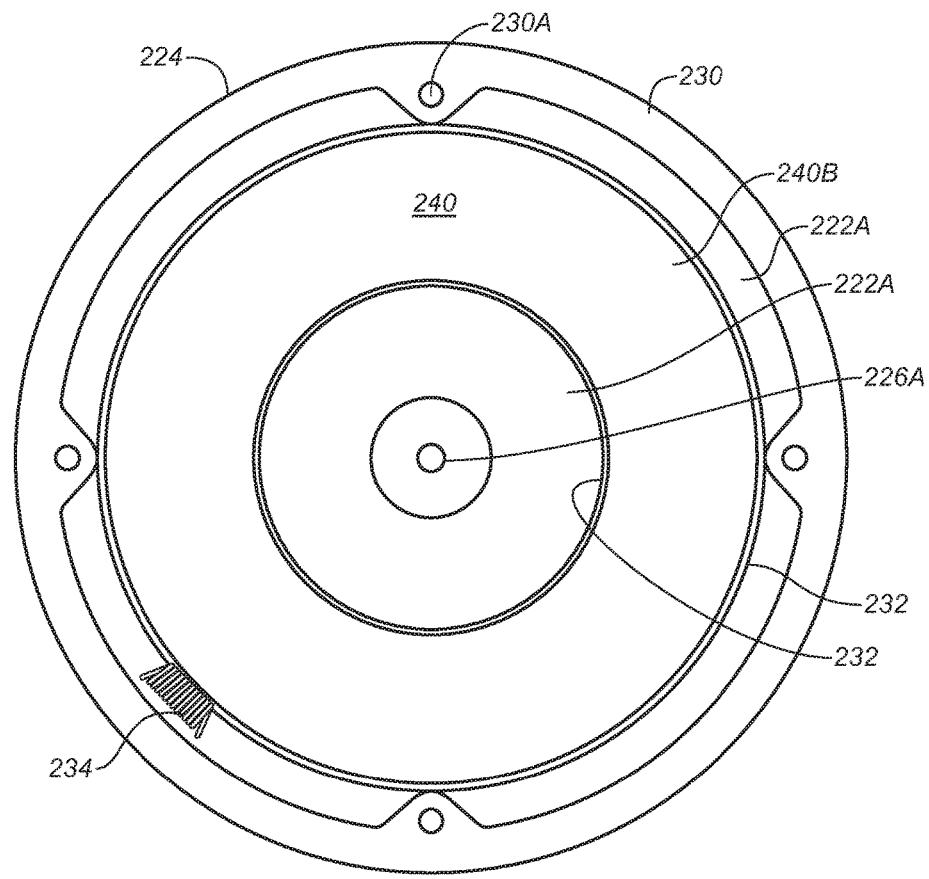
FIG. 23B is a plan view of the catalytic combustion enclosure shown in FIG. 23A.

As illustrated in more detail in FIG. 23A through FIG. 23C, the catalytic combustion enclosure 212 has an enclosure platform 222, having a cylindrical shape, and an enclosure sidewall 224, having a cylindrical ring shape, with the enclosure sidewall 224 integral with the enclosure platform 222. The enclosure platform 222 has a fuel gas inlet receptacle 226 that is integral with a bottom side 222B of the enclosure platform 222, and with the fuel gas inlet receptacle 226 defining a fuel gas inlet port 226A, shown with an "arrow", through the center of the enclosure platform 222. The enclosure sidewall 224 has a plurality of elongate exhaust outlets 228 extending through the enclosure sidewall 224. Preferably, as shown in the figures, there are four (4) elongate exhaust outlets 228 for venting exhaust gases to atmosphere from a catalytic combustion process described below. The enclosure sidewall 224 also has a sidewall top end surface 230 extending around a perimeter of the enclosure sidewall 224, with the sidewall top end surface 230, as illustrated in FIG. 23A and FIG. 23B, having plurality of sidewall receptacle openings 230A, preferably four (4) in number. And, as best illustrated in FIG. 23C, the catalytic combustion enclosure 212 further comprises the container bottom plate 208 of container sidewall 206 of container 204 in that the container bottom plate 208 is attached to the sidewall top end surface 230 of enclosure sidewall 224 by inserting the securing pins 209 into corresponding sidewall receptacle openings 230A. And, as specifically illustrated in FIG. 22 and FIG. 23C with "arrows", the space within the catalytic combustion enclosure 212 defines a catalytic combustion chamber 220.

As also illustrated in FIG. 23A and FIG. 23B, a catalytic reaction media 240 is disposed within the catalytic combustion chamber 220. Preferably, the catalytic reaction media 240 has a toroidal shape, with the catalytic reaction media 240 positioned within the catalytic combustion chamber 220 such that: a flat bottom side 240A of the catalytic reaction media 240 is disposed within an enclosure platform channel 232 integral with a top side 222A of the enclosure platform 222; a top flat side 240B of the catalytic reaction media 240 is in contact with the bottom side 208A of container bottom plate 208; and an opening 240C through the center of the catalytic reaction media 240, shown with an "arrow", concentrically surrounds the fuel gas inlet port 226A within the fuel gas inlet receptacle 226. A combustion starting element 234 is also disposed within the catalytic combustion chamber 220 and positioned adjacent to the catalytic combustion media 240, with the combustion starting element 234 having a pair of insulated electrical connections 234A disposed through air-tight openings through the enclosure platform 222, and with the pair of insulated electrical connections 234A having additional connections (not shown) that connect the combustion starting element 234 to the battery 264 within the circuit board 260, which is integral with the fuel supply platform 216 as described below.

Figure 24A:
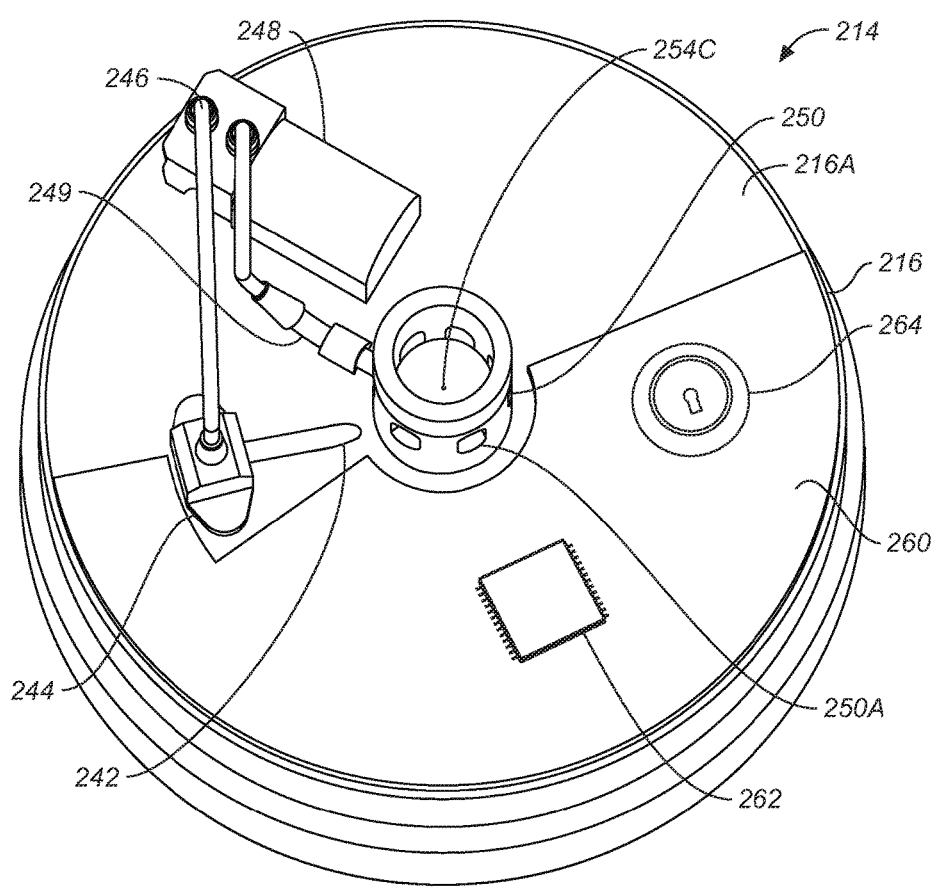
FIG. 24A and FIG. 24B are top perspective and top plan views, respectively, of a fuel supply assembly mounted on a fuel supply platform, with the fuel supply assembly for providing a flow-through connection to the catalytic combustion enclosure shown in FIG. 23A through 23C.
Figure 24B:
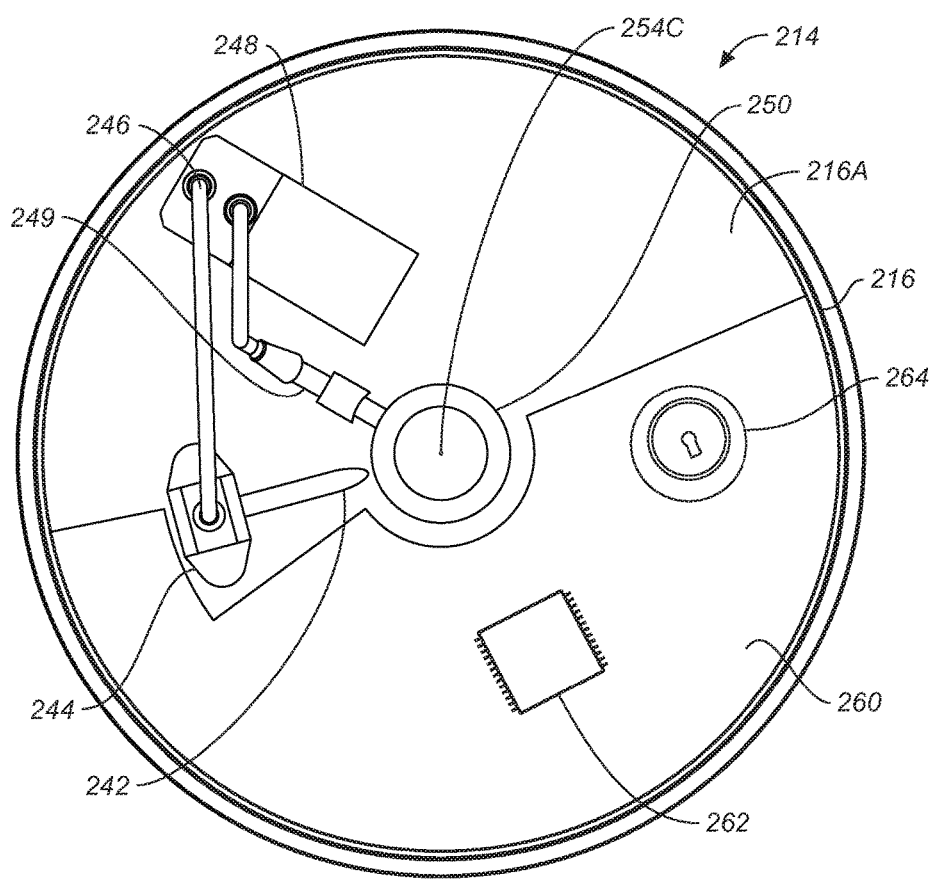

FIG. 24A and FIG. 24B more specifically illustrate the fuel supply assembly 214 that is mounted on a top side of the fuel supply platform 216. The fuel supply assembly 214 comprises the following fuel supply components: a fuel and air mixing injector 250 integral with a top side 216A of the fuel supply platform 216; a fuel gas inlet tube 242 disposed within the fuel supply platform 216 and, as described below, with the fuel gas inlet tube 242 in flow-through tubular connection with the fuel canister 218; a fuel gas junction 244 in flow-through tubular connection with the other end of the fuel gas inlet tube 242; a fuel gas connection tube 246 in flow-through tubular connection between the fuel gas junction 244 and a solenoid valve 248 (e.g. an "LHL" series solenoid valve from the Lee Company) for regulating the supply of fuel gas; and a fuel gas supply tube 249 in flow-through tubular connection between the solenoid valve 248 and the fuel and air mixing injector 250 for injecting a fuel gas and entrained air mixture into the catalytic combustion chamber 220. As shown in more detail in the cross-sectional side view of FIG. 25, the fuel and air mixing injector 250 comprises: an injector tube 252 having a plurality of axially extending air inlet openings 252A, with the injector tube 252 disposed around a fuel supply sleeve 256 integral with the top side 216A of the fuel supply platform 216; an injector housing 254, having a cylindrical shape with a closed top end 254A and an open bottom end 254B, with the closed top end 254A of the injector housing 254 having an injector orifice 254C, and with the injector housing 254 disposed within the injector tube 252; thereby defining an injector chamber 258. And, in this regard, the fuel supply tube 249 within the fuel supply assembly 214 has a flow-through tubular connection to the injector chamber 258 within the fuel and air mixing injector 250 by extending the fuel supply tube 249 through a tubular opening 256A within the fuel supply platform sleeve 256. And, as illustrated in FIG. 24A and FIG. 24B, the fuel supply assembly 214 further comprises the circuit board 260 having a programmed microprocessor 262 and the battery 264, which is in electrical connection to the programmed microprocessor 262. The battery 264 is preferably a lithium polymer type battery, having Part No. GM502030 from PowerStream Technology, Inc. The battery 264 supplies electrical power to the programmed microprocessor 262 when the on/off button 8 is in the "on" position and disconnects electrical power when the on/off button 8 is in the off position. When activated, the programmed microprocessor 262, with inputs from the temperature sensor 211 integral with the container sidewall 206 of container 204, controls the functionality of the solenoid valve 248 in order to control the fuel gas flow rate, which controls the temperature, within the catalytic combustion chamber 220. The activated programmed microprocessor 262 also supplies electrical power to the combustion starting element 234, which the microprocessor 262 coordinates with the supply of fuel gas to the catalytic combustion chamber 220 by opening and closing the solenoid valve 248.

Figure 25:
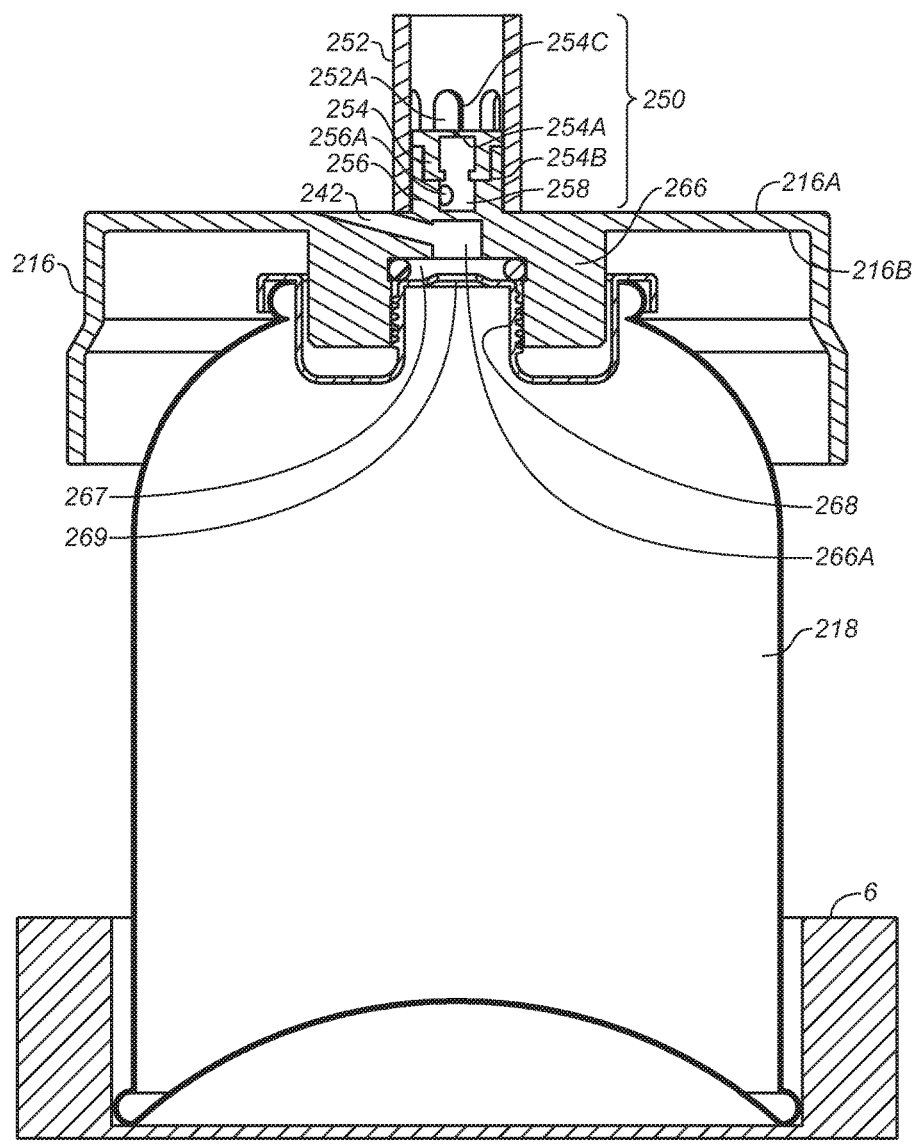
FIG. 25 is a cross-sectional side view of a fuel supply platform and a fuel canister releasably connected to the fuel supply platform shown in FIG. 24A and FIG. 24B.

The cross-sectional side view presented in FIG. 25 further illustrates that fuel canister 218 is releasably connected to the fuel supply platform 216. In order to facilitate the connection, the fuel supply platform 216 comprises: a platform receptacle 266, integral with a bottom side 216B of the fuel supply platform 216, with the platform receptacle 266 having a platform receptacle cavity 266A, and with female screw threads integral with a portion of a cylindrical sidewall of the platform receptacle cavity 266A; an O-ring 267 disposed a within another portion of cylindrical sidewall of the platform receptacle cavity 266A that does not contain female screw threads; and the fuel gas inlet tube 242 within the fuel supply assembly 214 is in flow-through connection with the platform receptacle cavity 266A. The fuel canister 218 contains a fuel canister connection member 268, having a cylindrical shape and an open top end, with a fuel flow valve 269 disposed within and integral with the open top end of the fuel canister connection member 268. The fuel canister connection member 268 has male screw threads disposed around an outside surface of the fuel canister connection member 268, enabling the fuel canister 218 to be connected to the fuel supply platform 216 by screwing the fuel canister connection member 268 into the platform receptacle 266. This action opens the fuel flow valve 269, thereby allowing fuel gas, which has been compressed within the fuel canister 218, to flow from the fuel canister 218 into the fuel supply assembly 214.

Figure 26A:
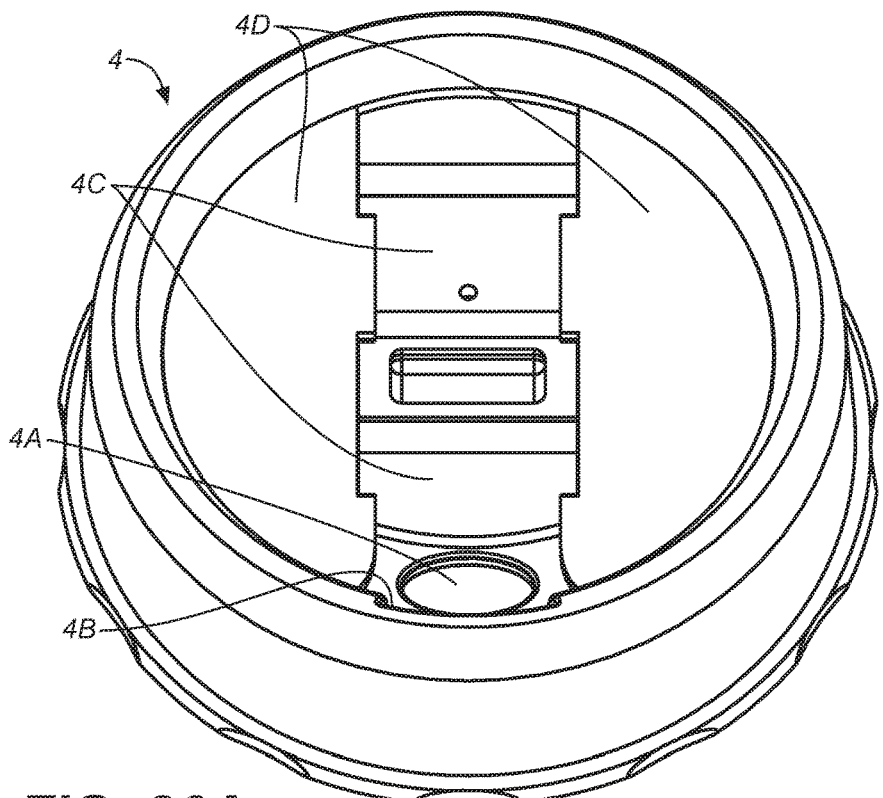
FIGS. 26A and 26B are top and bottom perspective views, respectively, of a shell lid.
Figure 26B:
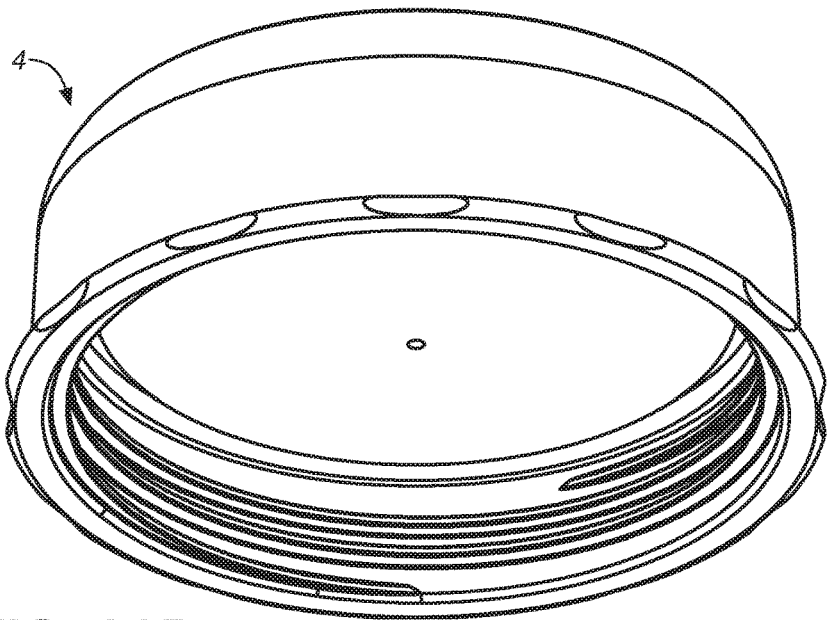

FIGS. 26A and 26B illustrate in more detail that the top of the shell lid 4 contains a flow opening 4A for allowing a beverage contained within the container 204 to flow out of the container 204 and into a flow guide 4B for channeling the flow of a beverage from the container 204. A shell slider valve 4C can be operated within a shell slider valve retainer 4D to open the shell slider valve 4C in order to allow the beverage to flow out of the container 204 or to close the shell slider valve 4C to prevent the beverage from flowing out of the container 204.

Operation of the catalytic heating system 200 proceeds by attaching the fuel canister 218 containing fuel gas to the fuel supply platform 216 by screwing the fuel canister connection member 268 into the platform receptacle 266, which causes a tap to open the fuel flow valve 269, which in turn causes the fuel gas within the fuel canister 218 to flow into the platform receptacle cavity 266A and then into the fuel supply assembly 214. If the on/off button 8 in the "off" position, the solenoid valve 248 will be closed, preventing the fuel gas from flowing into the fuel and air mixing injector 250. In order to heat a beverage or food, the shell lid 4 is removed, if necessary, by unscrewing it from its engagement with the top of the outer shell 2. A beverage or food can then be placed into the container 204 and the shell lid 4 reattached to the outer shell 2. The catalytic combustion process that is utilized to heat the beverage or food is initiated by depressing the on/off button 8 to the "on" position, which activates the programmed microprocessor 262 by closing the circuit connection between the battery 264 and programmed microprocessor 262. At a predetermined time after activation, the programmed microprocessor 262 causes the solenoid valve 248 to open, causing the fuel gas to flow into the fuel and air mixing injector 250. As the fuel gas flows through the fuel and air mixing injector 250, the velocity of the fuel gas flow increases due to the distal narrowing of the injector orifice 254C within the fuel and air mixing injector 250. Increasing the velocity of the fuel gas causes the pressure in the fuel and air mixing injector 250 to decrease, thereby entraining the fuel gas with atmospheric air in order to produce a fuel gas and entrained air mixture. Then, the fuel gas and the entrained air mixture is injected through the fuel gas inlet port 226A within the fuel gas inlet receptacle 226 and into the catalytic combustion chamber 220 within the catalytic combustion enclosure 212. As the flow of fuel gas and entrained air mixture enters the catalytic combustion chamber 220, the fuel gas and entrained air mixture contacts catalytic reaction media 240 and the combustion starting element 234. At the same time, programmed microprocessor 262 causes an electrical current to be supplied to the combustion starting element 234, which causes the combustion starting element 234 to heat up, thereby igniting the flow of fuel gas and entrained air mixture and generating the catalytic combustion process within the catalytic reaction media 240 The heat energy generated by the catalytic combustion process is efficiently transferred to the container bottom plate 208 of container 204 due to the fact that the catalytic reaction media 240 is in contact with the container bottom plate 208. The efficiency of this transfer of heat energy is further enhanced due to the toroidal shape of the catalytic reaction media 240. This is believed to be a result of two synergistic physical effects that occur as the hot combusted gasses move outward from the inner ring surface of the toroidal shaped catalytic reaction media 240 toward the outer ring surface of the catalytic reaction media 240. The first effect is that heat energy transfer from a hot entity to a cooler entity is in general exponentially dependent on the difference in temperature. Thus, as a volume of combusted fuel gas moves radially outward from the inner ring surface of the catalytic reaction media 240, the combusted fuel gas transfers a portion of its heat energy from the catalytic reaction media 240 to the cooler container bottom plate 208 of container 204, with the rate of transfer dependent upon the temperature difference between the two structures. This heat energy transfer, in turn, causes the temperature of a given volume of combusted fuel gas to decrease as the volume of combusted fuel gas moves along a radial path from the inner ring surface to the outer ring surface of the catalytic reaction media 240. In this regard, however, as the volume of the combusted fuel gas cools, its rate of heat energy transfer to the container bottom plate 208 decreases exponentially; thereby reducing the efficiency of the catalytic heating system 200. In this regard, however, it is a surprising and unexpected feature of the catalytic reaction media 240 that its toroidal shaped geometry produces an exponential increase in heat energy transfer to the container bottom plate 208 that offsets the exponential efficiency loss due to the decrease in the temperature of combusted fuel gas as it moves outward. This surprising phenomena is the result of the fact that the toroidal shaped geometry of the catalytic reaction media 240 causes the velocity of the volume of combusted fuel gas to slow down exponentially as a function of the radial distance from the inner ring surface to the outer ring surface of the catalytic reaction media 240. As a result, a volume of combusted fuel gas that is the furthest from the inner ring surface of the catalytic reaction media 240 has more time to transfer heat energy to the container bottom plate 208 before exiting the catalytic reaction media 240, which offsets the heat energy loss as the combusted fuel gas moves outward. Exhaust generated from the catalytic combustion process passes through the plurality of elongate exhaust outlets 228, within the enclosure sidewall 224 of catalytic combustion enclosure 212, and exits the catalytic combustion enclosure 212 by flowing through a corresponding plurality of elongate exhaust outlet ducts 202, within the out shell 2, and then to atmosphere. Initially, the combustion process will continue until the programmed microprocessor 262, having electrical inputs from the temperature sensor 211, detects a container 204 temperature in excess of a predetermined programed upper temperature value, and the combustion process will then cycle off and on between the upper temperature value and a predetermined lower temperature value.

Figure 27A:
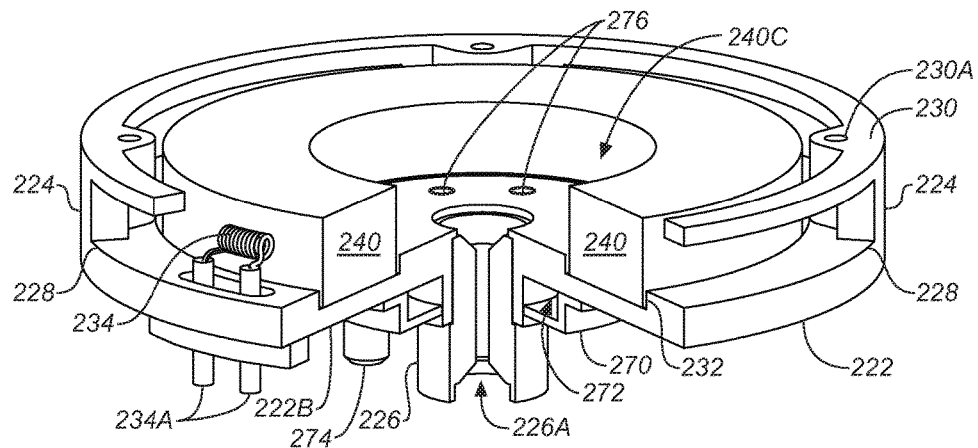
FIG. 27A is a partial top perspective view of another embodiment of the catalytic combustion enclosure illustrated in FIG. 23A and FIG. 23B.
Figure 27B:
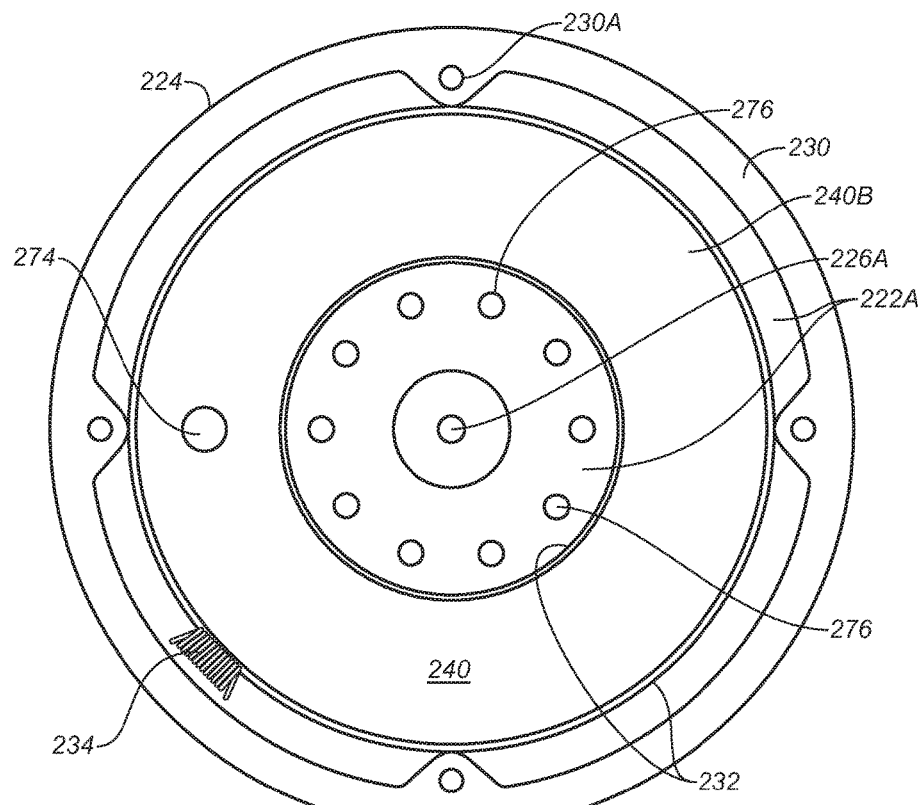
FIG. 27B is a plan view of the catalytic combustion enclosure shown in FIG. 27A.
Figure 28:
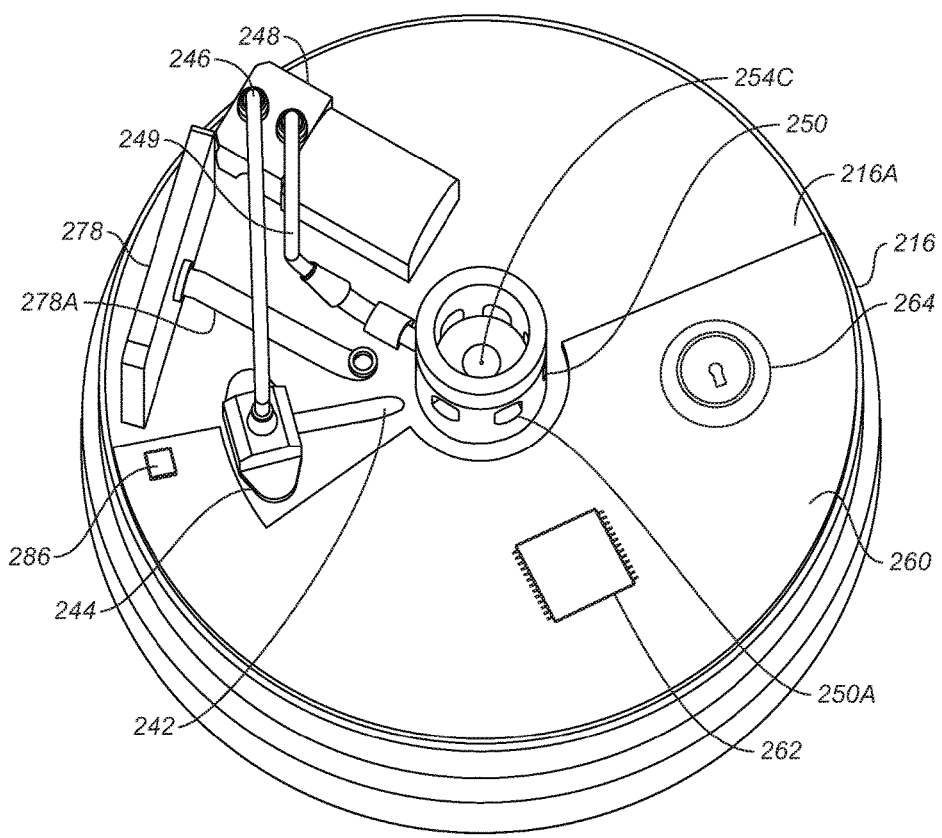
FIG. 28 is top perspective view of a fuel supply assembly mounted on a fuel supply platform, with the fuel supply assembly for providing a flow-through connection to the embodiment of the catalytic combustion enclosure illustrated in FIG. 27A and FIG. 27B.

FIG. 27A, FIG. 27B, and FIG. 28 illustrate an auxiliary air embodiment of the catalytic combustion enclosure 212 and the fuel supply assembly 214 within the catalytic combustion assembly 210 of catalytic heating system 200. In this embodiment, the catalytic combustion enclosure 212 has the same components and component identification numbers as disclosed in connection with FIG. 23A and FIG. 23B, but the embodiment also comprises, as illustrated in FIG. 27A and FIG. 27B, the following additional components: 1) an auxiliary air plenum 270 integral with the bottom side 222B of the enclosure platform 222 of the catalytic combustion enclosure 212, with the auxiliary air plenum 270 surrounding the fuel gas inlet receptacle 226 through the enclosure platform 222, and with the auxiliary air plenum 270 defining an auxiliary air chamber 272 as shown by an "arrow"; 2) an auxiliary air intake port 274 integral with the auxiliary air plenum 270, with auxiliary air intake port 274 providing flow-through access to the auxiliary air chamber 272; 3) a plurality of auxiliary air openings 276, preferably ten (10) in number, surround the fuel gas inlet port 226A disposed within the fuel gas inlet receptacle 226 integral with the enclosure platform 222, with the plurality of auxiliary air openings 276 providing flow-through access from the auxiliary air chamber 272 to the catalytic combustion chamber 220. And, in this embodiment the fuel supply assembly 214 has the same components and component identification numbers as disclosed in connection with FIG. 24A and FIG. 24B, but the embodiment comprises, as illustrated in FIG. 28A and FIG. 28B, the following additional components: a piezo electric microblower 278 mounted on the fuel supply platform 216, with the piezo electric microblower 278 having an auxiliary air tube 278A providing a tubular connection with an auxiliary air intake port 274 integral with the auxiliary air plenum 270, thereby providing a flow-through connection between the piezo electric microblower 278 and the auxiliary air chamber 272 of the auxiliary air plenum 270. The piezo electric microblower 278 has an electrical connection with the circuit board 260 and its connection with the programmed microprocessor 262, which is programmed to activate the piezo electric microblower 278 whenever the solenoid valve 248 is open; thereby providing ambient auxiliary air to the auxiliary air chamber 272 within the auxiliary air plenum 270, with the ambient auxiliary air then passing through the plurality of auxiliary air openings 276 and into the catalytic combustion chamber 220 of the catalytic combustion enclosure 212.

The function of providing ambient auxiliary air to the combustion chamber 220 is to insure, especially at high altitudes, that the air/fuel ratio within the catalytic combustion chamber 220 is sufficiently high to completely react the fuel with oxygen, thus preventing incomplete combustion products, such as carbon monoxide, from being emitted to atmosphere. And, in another embodiment, the piezo electric microblower 278 has an electrical connection with an altimeter 286, which is integral with the circuit board 260 integral with the fuel assembly platform 216, with the piezo electric microblower 278 programmed to receive elevation data from the altimeter 286; whereby the elevation data is utilized by the piezo electric microblower 278 to adjust the amount ambient auxiliary air entering the combustion chamber 220 as function of altitude. In this regard, the toroidal shaped geometry of the catalytic combustion media 240 provides another surprising and an unexpected synergy: in this case between the infusion of auxiliary air through the plurality of auxiliary air openings 276 and the simultaneous injection of a fuel gas and entrained air mixture through the fuel gas inlet port 226A into the catalytic combustion chamber 220 containing the toroidal shaped catalytic reaction media 240. Specifically, the toroidal shaped geometry of the catalytic reaction media 240 causes a very rapid decrease in incremental pressure drop (i.e. pressure drop per unit distance) as the fuel gas and entrained air mixture moves from the inner ring surface to the outer ring surface of the catalytic reaction media 240. And, since the auxiliary air enters the catalytic combustion chamber 220 through the plurality of auxiliary air openings 276 that are positioned between the fuel gas inlet port 226A and the catalytic reaction media 240, the auxiliary air flow entering the catalytic combustion chamber 220 preferentially seeks a radial path through the catalytic combustion chamber 220 toward the lower pressure of the exhaust of the combusted fuel gas and entrained air mixture. In this manner, the infusion of auxiliary air into the catalytic combustion chamber 220 does not significantly increase back or downstream pressure within the catalytic combustion chamber 220. As well known to those in the art, an increase in back pressure can disrupt the optimal air to fuel gas ratio for the fuel and air mixing injector 250, causing incomplete combustion of the fuel gas and entrained air mixture.

Figure 29:
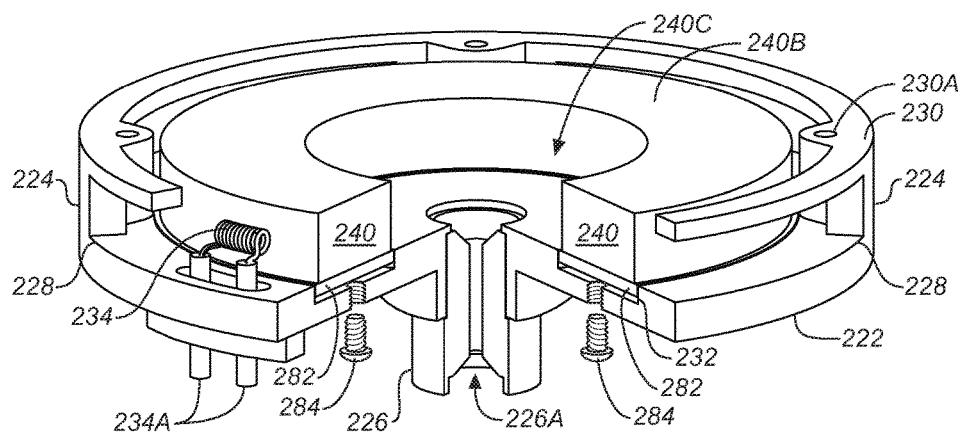
FIG. 29 is a partial top perspective view of another embodiment of the catalytic combustion enclosure illustrated in FIG. 23A and FIG. 23B.

FIG. 29 illustrates a pressure enhancement embodiment of the catalytic combustion enclosure 212 within the catalytic combustion assembly 210 of catalytic heating system 200. In this embodiment the catalytic combustion enclosure 212 has the same components and component identification numbers as disclosed in connection with FIG. 23A and FIG. 23B, but the embodiment comprises, as illustrated in FIG. 29, the following additional component: a pressure ring 282 having a toroidal shape, with the pressure ring 282 disposed within the enclosure platform channel 232 integral with the top side 222A of enclosure platform 222, and with the pressure ring 282 sized such that it can move up and down within the enclosure platform channel 232.

And, in this embodiment, the catalytic reaction media 240 is disposed within the enclosure platform channel 232 and in contact with a top side of the pressure ring 282. The catalytic combustion enclosure 212 also comprises a plurality of pressure adjustment screws 284, preferably four (4) in number, that are disposed within corresponding threaded openings through the enclosure platform 222, with the threaded openings extending into the enclosure platform channel 232. The plurality of pressure adjustment screws 284 are used to elevate the pressure ring 282 within the enclosure platform channel 232, which in turn increases the pressure of the catalytic reaction media 240 in contact with the container bottom plate 208 of container 204, which are integral with the catalytic combustion enclosure 212. This feature enhances the heat transfer from the catalytic reaction media 240 to the container bottom plate 208, thereby heating the contents of container 204 even more efficiently.

Figures 30A, 30B:
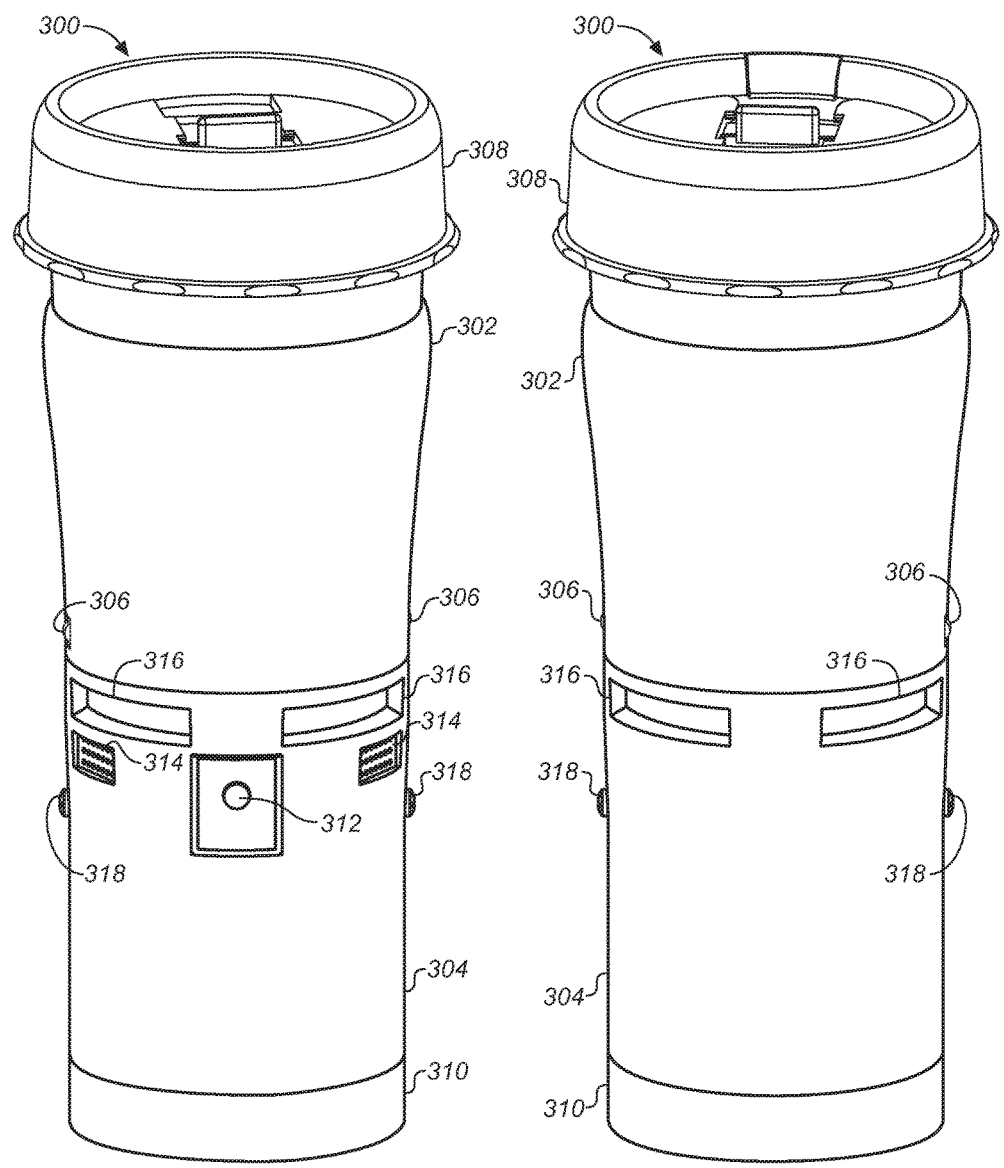
FIG. 30A and FIG. 30B are top front and back perspective illustrations, respectively, of another embodiment of the catalytic heating system for heating a beverage or food.
Figure 30C:
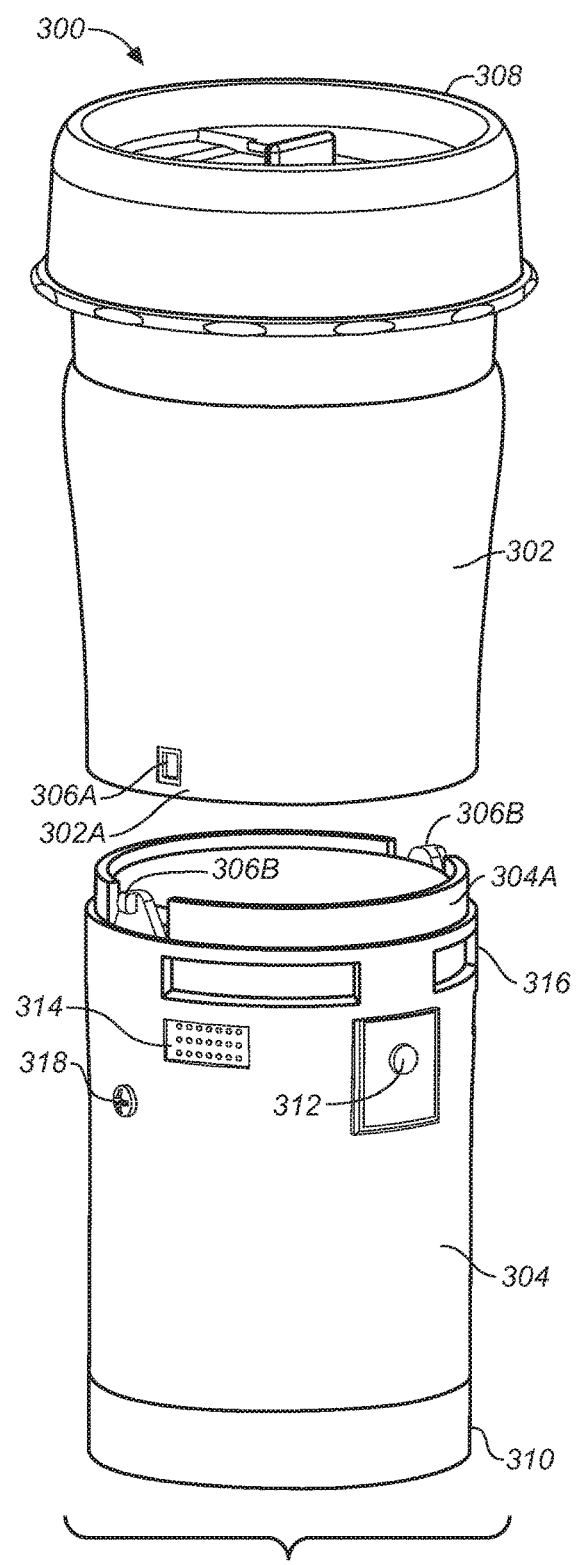
FIG. 30C is another illustration of the catalytic heating system illustrated in FIG. 30A and FIG. 30B, with the catalytic heating system separated into an upper shell module and a lower shell module.

In an another embodiment of catalytic heating system 200, a catalytic heating system 300 for heating a beverage or food is described and illustrated in connection with FIG. 30A through FIG. 40. This embodiment is substantially similar to the catalytic heating system 200 described above, with the primary difference being that the outer shell 2 of catalytic heating system 200 is separated into an upper shell module and a lower shell module. Specifically, and as illustrated in FIG. 30A through 30C, the catalytic heating system 300 comprises an upper shell module 302 and a lower shell module 304, each having a cylindrical shape, with the upper shell module 302 releasably attached to the lower shell module 304. The catalytic heating system 300 further comprises: a shell lid 308 removably attached to the upper shell module 302; a canister base 310 adjacent to the lower shell module 304; an on/off button 312 on an outside surface of the lower shell module 304; a pair of air vents 314 providing air passages into the inside of the lower shell module 304; a plurality of screws 318 for attaching the lower shell module 304 to a catalytic combustion assembly 330 disposed within the lower shell module 304 as described below; and a snap-fit system 306 for releasably attaching the upper shell module 302 to the lower shell module 304. The figures also illustrate that the lower shell module 304 contains a plurality of elongate exhaust outlet ducts 316, preferably four (4) in number, for providing an exhaust passage from inside of the lower shell module 304 to atmosphere. And, FIG. 30C shows more specifically that the snap-fit system 306 can be utilized to separate upper shell module 302 from the lower shell module 304. Snap-fit system 306 comprises: a pair of snap-fit openings 306A that extend through opposite sides of a bottom circumferential portion 302A of the upper shell module 302; and a pair of snap-fit buttons 306B that is integral with a ring member 304A integral with a top end 304A of lower shell module 304, with the pair of snap-fit buttons 306B for engagement with the pair of snap-fit openings 306A. The snap-fit system 306 can be operated to detach the upper shell module 302 from the lower shell module 304 by depressing the snap-fit buttons 306B; thereby releasing engagement with the pair of snap-fit openings 306A, and allowing the upper shell module 302 and lower shell module 304 to be separated. Then the separated modules can be reconnected by simply inserting the ring member 304A of the lower shell module 304 into the bottom portion 302A of the upper shell module 302 until the pair of snap-fit buttons 306B reengage the pair of snap-fit openings 306A.

Figures 31, 32:
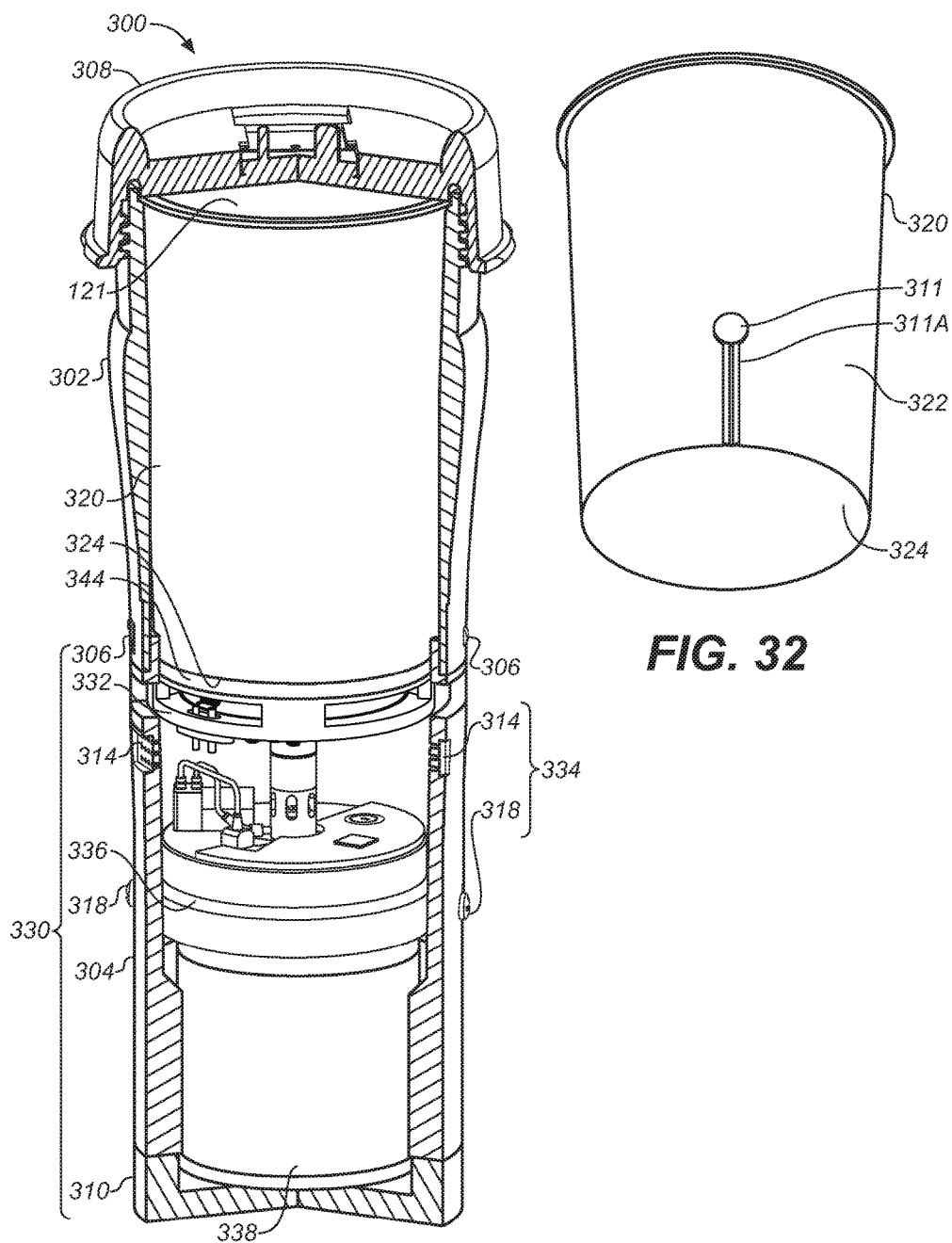
FIG. 31 is the same perspective illustration as in FIG. 30A, with portions of the upper shell module and lower shell removed in order to illustrate a container for containing a beverage or food and a catalytic combustion assembly.
FIG. 32 is a bottom perspective illustration of the container for containing a beverage or food removed from the upper shell module.
Figure 33:
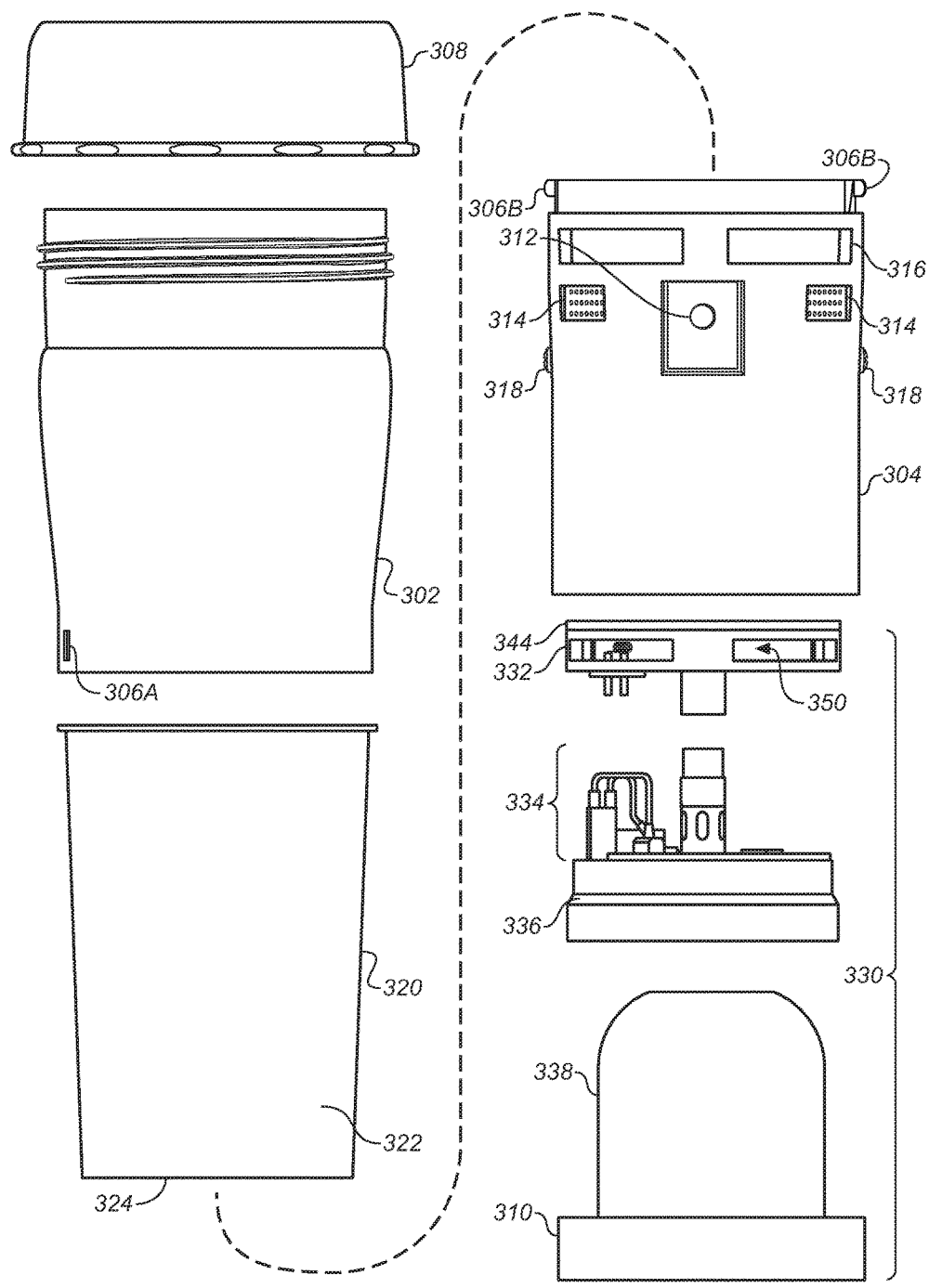
FIG. 33 is an exploded side view of the catalytic heating system shown FIG. 30A and FIG. 30B, showing the upper shell module, the container for containing the beverage or food, the lower shell module, and the catalytic combustion assembly.

FIG. 31 through FIG. 33 illustrate that the upper shell module 302 houses a container 320 for containing a beverage or food; and that the lower shell module 304 contains the catalytic combustion assembly 330. The catalytic combustion assembly 330 more specifically comprises: a catalytic combustion enclosure 332; a fuel supply assembly 334, having a flow-through connection with the catalytic combustion enclosure 332; a fuel supply platform 336, having a flow-through connection with the fuel supply assembly 334; a fuel canister 338, having a flow-through connection to the fuel supply platform 336; and the fuel canister base 310 attached to the bottom of the fuel canister 338, with the fuel canister 338 removably connected to the fuel supply platform 336.

The container 320 comprises: a container sidewall 322 having a cylindrical shape; and a container bottom plate 324 integral with the container sidewall 322. The container side wall 322 is secured to the upper shell module 302 by bonding an outside top perimeter of the container 320 to an inside top perimeter of the upper shell module 302 and by similarly bonding an outside bottom perimeter of the container 320 to an inside bottom perimeter of the upper shell module 302. A temperature sensor 311 is integral with an outside surface of the container sidewall 322, with a pair of electrically conductive wires 311A extending from the temperature sensor 311 to a bottom portion of the container sidewall 332, and with an additional pair of electrical connections (not shown) connecting the pair of electrically conductive wires 311A to a battery 356 within a circuit board 358, which is integral with the fuel supply platform 336, as described in below. And, the catalytic combustion assembly 330 is secured to the lower shell module 304 by using the plurality of screws 318 to attach an inside perimeter of the lower shell module 304 to an outside perimeter of the fuel supply platform 336. The shell lid 308 can be removably attached to a top end of the upper shell module 302 by screwing the shell lid 308, having female threads around its inside perimeter, to the upper shell module 302, having male threads around its top outside perimeter. The container 320 can be any container that can conduct heat, such as a cup, mug or sauce pan; preferably the container 320 will have a metallic composition. And, the upper and lower shell modules 302 and 304 can be made of a thermally non-conductive material, preferably a polymeric material; alternatively, the container 320 can have a thermally insulating layer disposed between a sidewall 321 of the container 320 and the upper shell module 302.

Figure 34A:
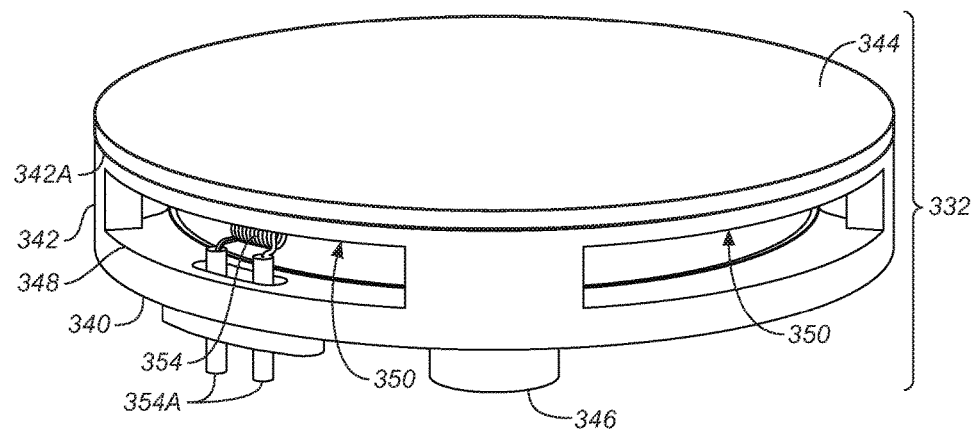
FIG. 34A is a top perspective view of a catalytic combustion enclosure within the catalytic combustion assembly shown in FIG. 31 and FIG. 33, with the catalytic combustion enclosure having a heating plate.
Figure 34B:
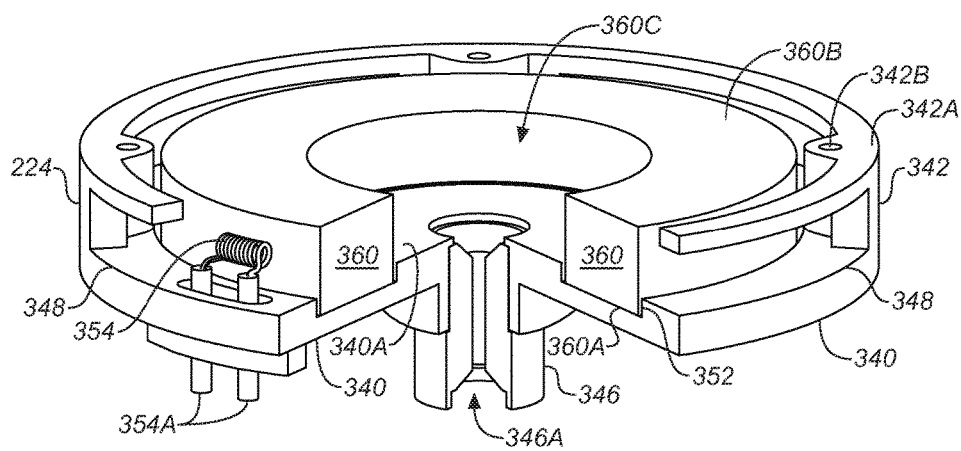
FIG. 34B is a partial top perspective view of the catalytic combustion enclosure shown in FIG. 34A, with the heating plate removed.

FIG. 34A and FIG. 34B further illustrate the catalytic combustion enclosure 332, which comprises: an enclosure platform 340, having a cylindrical shape; an enclosure sidewall 342, having a cylindrical ring shape, with a bottom peripheral end of the enclosure sidewall 342 integral with the enclosure platform 340; a heating plate 344, having a cylindrical shape, with the heating plate 344 integral with a top peripheral end 342A of the sidewall enclosure 342; and with the enclosure platform 340, enclosure sidewall 342, and heating plate 344 defining a catalytic combustion chamber 350 as shown with the "arrows" on FIG. 34A. The catalytic combustion enclosure 332 is further illustrated in FIG. 34B, which has the heating plate 344 removed in order to show additional components of the catalytic combustion enclosure 332. A fuel gas inlet receptacle 346, defining a fuel gas inlet port 346A, shown with an "arrow", extends through the center of enclosure platform 340, and the enclosure sidewall 342 has a plurality of elongate exhaust outlets 348 extending through the enclosure sidewall 342. Preferably, as shown in the figures, there are four (4) elongate exhaust outlets 348 for venting exhaust gases from a catalytic combustion process through corresponding elongate exhaust outlet ducts 316 integral with lower shell module 304, with the exhaust gases exiting elongate exhaust outlet ducts 316 to atmosphere.

As also illustrated in FIG. 34B, a catalytic reaction media 360 is disposed within the catalytic combustion chamber 350. Preferably, the catalytic reaction media 360 has a toroidal shape, with the catalytic reaction media 360 positioned within the catalytic combustion chamber 350 such that: a flat bottom surface 360A of the catalytic reaction media 360 is disposed within an enclosure platform channel 352 integral with a top side 340A of the enclosure platform 340 and an opposite flat top surface 360B of the catalytic reaction media 360 is in contact with the heating plate 344 integral with the catalytic combustion enclosure 332; and an opening 360C, shown with an "arrow" through the center of the catalytic reaction media 360, surrounds the fuel gas inlet port 346A within fuel gas inlet receptacle 346 integral with the enclosure platform 340. A combustion starting element 354 is also disposed within the catalytic combustion chamber 350 and positioned adjacent to the catalytic combustion media 360, with the combustion starting element 354 having a pair of insulated electrical connections 354A disposed through air-tight openings through the enclosure platform 340, and with the pair of insulated electrical connections 354A having additional connections (not shown) that connect the combustion starting element 354 to a battery 356 within a circuit board 358 described below.

Figure 35:
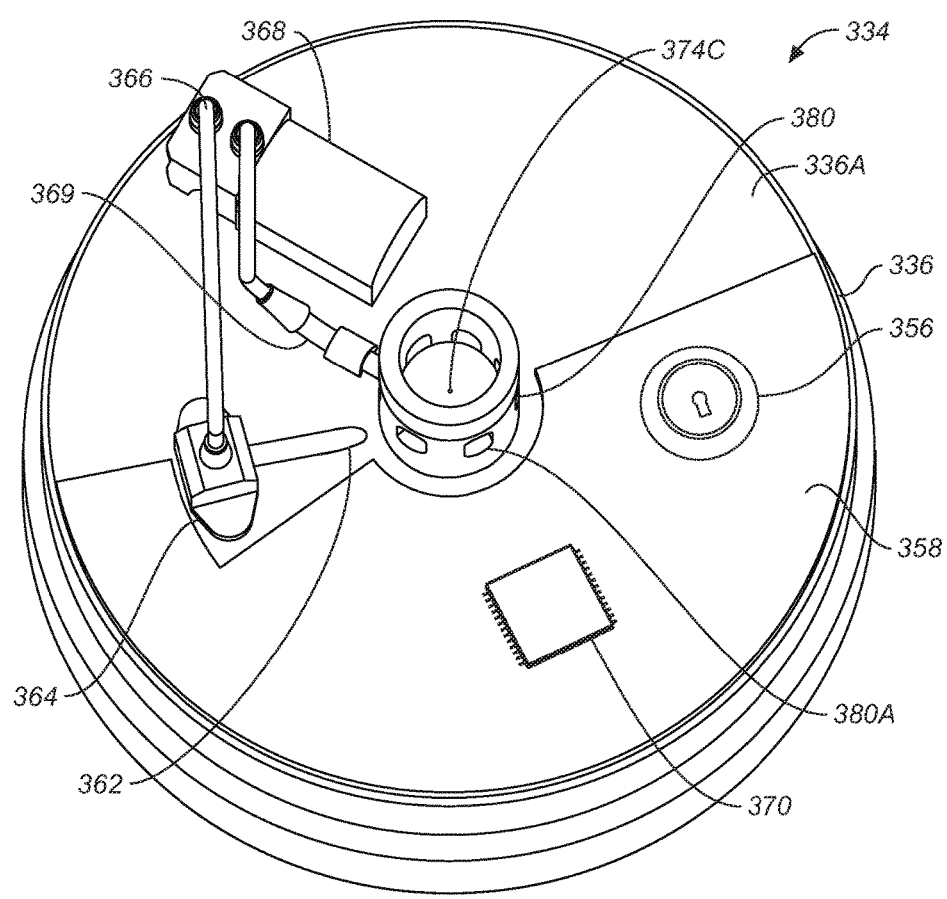
FIG. 35 is a top perspective view of a fuel supply assembly mounted on a fuel supply platform, with the fuel supply assembly for providing a flow-through connection to the catalytic combustion enclosure illustrated in FIG. 34A and FIG. 34B.
Figure 36:
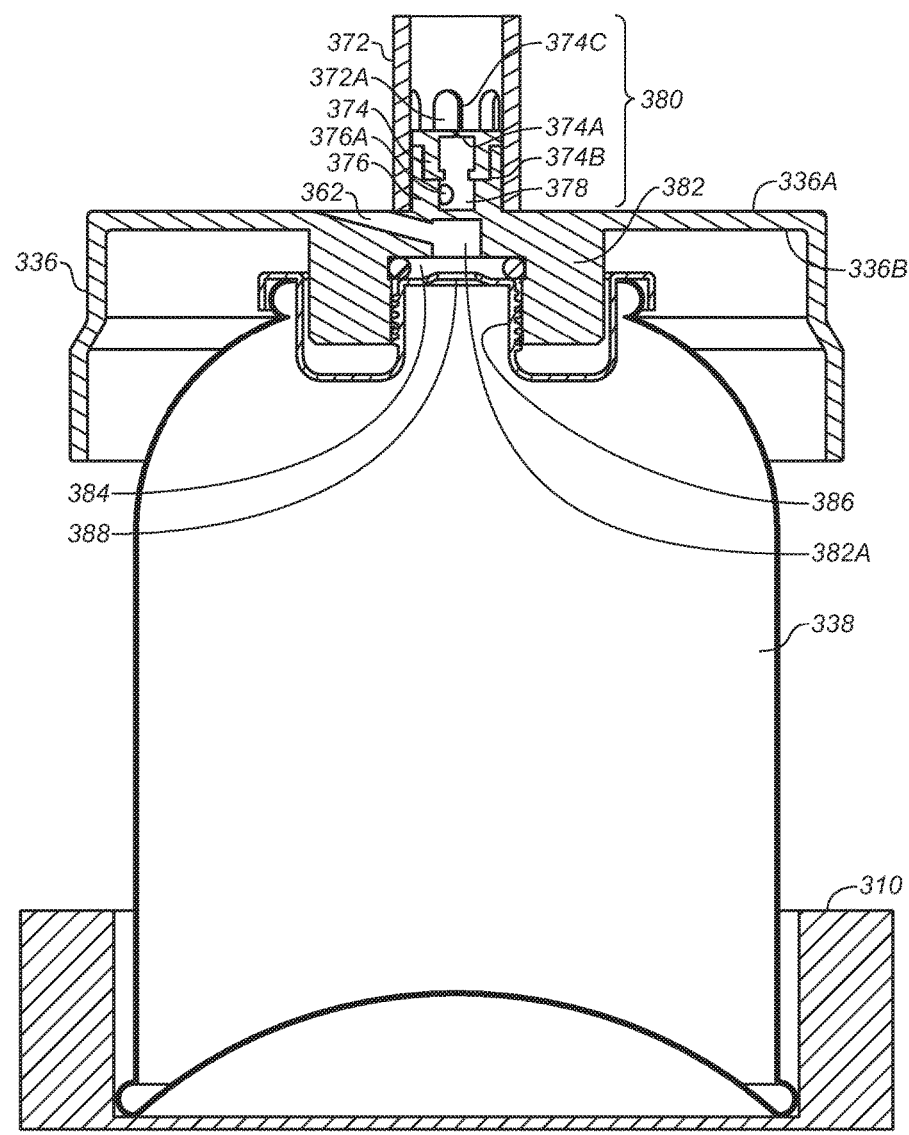
FIG. 36 is a cross-sectional side view of a fuel supply platform and a fuel canister releasably connected to the fuel supply platform.

FIG. 35 and FIG. 36 more specifically illustrate the fuel supply assembly 334 that is mounted on a top side of the fuel supply platform 336. The fuel supply assembly 334 comprises the following fuel supply components: a fuel and air mixing injector 380 integral with a top side 336A of the fuel supply platform 336; a fuel gas inlet tube 362 disposed within the fuel supply platform 336 and, as described below, with the fuel gas inlet tube 362 in flow-through tubular connection with the fuel canister 338; a fuel gas junction 364 in flow-through tubular connection with the other end of the fuel gas inlet tube 362; a fuel gas connection tube 366 in flow-through tubular connection between the fuel gas junction 364 and a solenoid valve 368 (e.g. an "LHL" series solenoid valve from the Lee Company) for regulating the supply of fuel gas; and a fuel gas supply tube 369 in flow-through tubular connection between the solenoid valve 368 and the fuel and air mixing injector 380 for injecting a fuel gas and entrained air mixture into the catalytic combustion chamber 350. As shown in more detail in the cross-sectional side view of FIG. 36, the fuel and air mixing injector 380 comprises: an injector tube 372 having a plurality of axially extending air inlet openings 372A, with the injector tube 372 disposed around a fuel supply platform sleeve 376 integral with the top side 336A of the fuel supply platform 336; an injector housing 374, having a cylindrical shape with a closed top end 374A and an open bottom end 374B, with the closed top end 374A of the injector housing 374 having an injector orifice 374C, and with the injector housing 374 disposed within the injector tube 372; thereby defining an injector chamber 378. And, in this regard, the fuel supply tube 362 within the fuel supply assembly 334 has a flow-through tubular connection to the injector chamber 378 within the fuel and air mixing injector 380 by extending the fuel supply tube 362 through a tubular opening 376A within the fuel supply platform sleeve 376. And, as illustrated in FIG. 35, the fuel supply assembly 334 further comprises a circuit board 358 having a programmed microprocessor 370 and a battery 356, which is in electrical connection to the programmed microprocessor 370. The battery 356 is preferably a lithium polymer type battery, having Part No. GM502030 from PowerStream Technology, Inc. The battery 356 supplies electrical power to the programmed microprocessor 370 when the on/off button 312 is in the "on" position and disconnects electrical power when the on/off button 312 is in the off position. When activated, the programmed microprocessor 370, with inputs from the temperature sensor 311 integral with the container sidewall 206 of container 204, controls the functionality of the solenoid valve 368 in order to control the fuel gas flow rate, which controls the temperature, within the catalytic combustion chamber 350. The activated programmed microprocessor 370 also supplies electrical power to the combustion starting element 354, which the microprocessor 370 coordinates with the supply of fuel gas to the catalytic combustion chamber 350 by opening and closing the solenoid valve 368.

The catalytic combustion enclosure 332 and fuel supply assembly 334 within catalytic heating system 300 can also include the additional structural features of the auxiliary air embodiment of the catalytic combustion enclosure 212, illustrated in FIG. 27A and FIG. 27B, and the fuel supply assembly 214, illustrated in FIG. 28, within the catalytic combustion assembly 210 of catalytic heating system 200.

The cross-sectional side view presented in FIG. 36 also illustrates that fuel canister 338 is releasably connected to the fuel supply platform 336. In order to facilitate the connection, the fuel supply platform 336 comprises: a platform receptacle 382, integral with a bottom side 336B of the fuel supply platform 336, with the platform receptacle 382 having a platform receptacle cavity 382A, and with female screw threads integral with a portion of a cylindrical sidewall of the platform receptacle cavity 382A; an O-ring 384 disposed a within another portion of cylindrical sidewall of the platform receptacle cavity 382A that does not contain female screw threads; and the fuel gas inlet tube 362 within the fuel supply assembly 334 is in flow-through connection with the platform receptacle cavity 382A. The fuel canister 338 contains a fuel canister connection member 386, having a cylindrical shape and an open top end, with a fuel flow valve 388 disposed within and integral with the open top end of the fuel canister connection member 386. The fuel canister connection member 386 has male screw threads disposed around an outside surface of the fuel canister connection member 386, enabling the fuel canister 338 to be connected to the fuel supply platform 336 by screwing the fuel canister connection member 338 into the platform receptacle 382. This action opens the fuel flow valve 388, thereby allowing fuel gas, which has been compressed within the fuel canister 338, to flow from the fuel canister 338 into the fuel supply assembly 334.

Figure 37A:
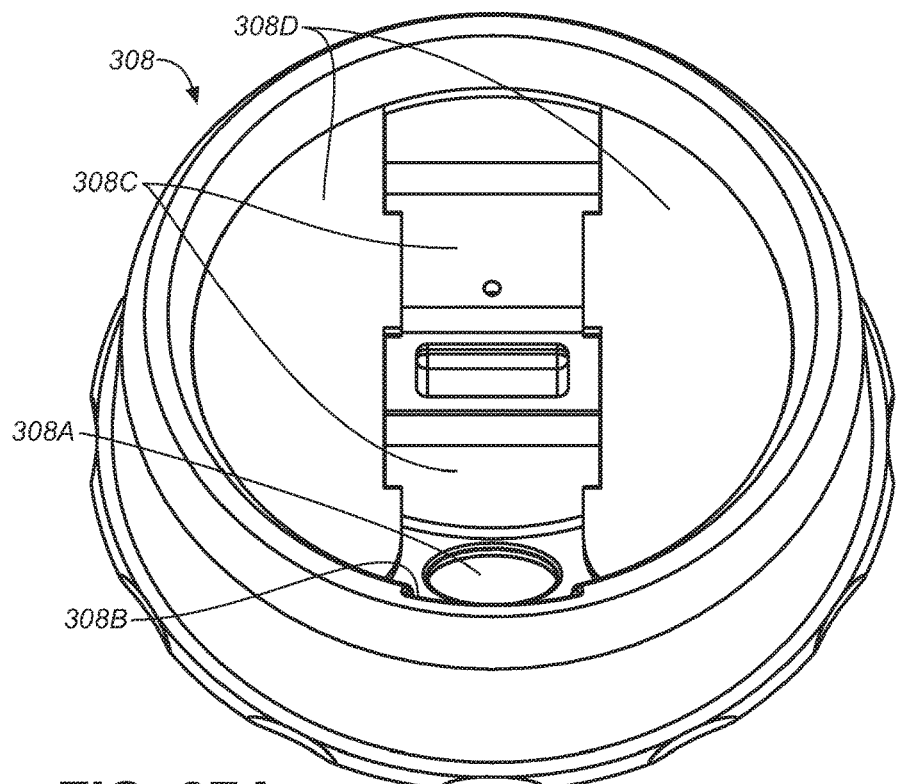
FIGS. 37A and 37B are top and bottom perspective views, respectively, of a shell lid for releasable attachment to the upper shell module shown in FIG. 30A through FIG. 30C.
Figure 37B:
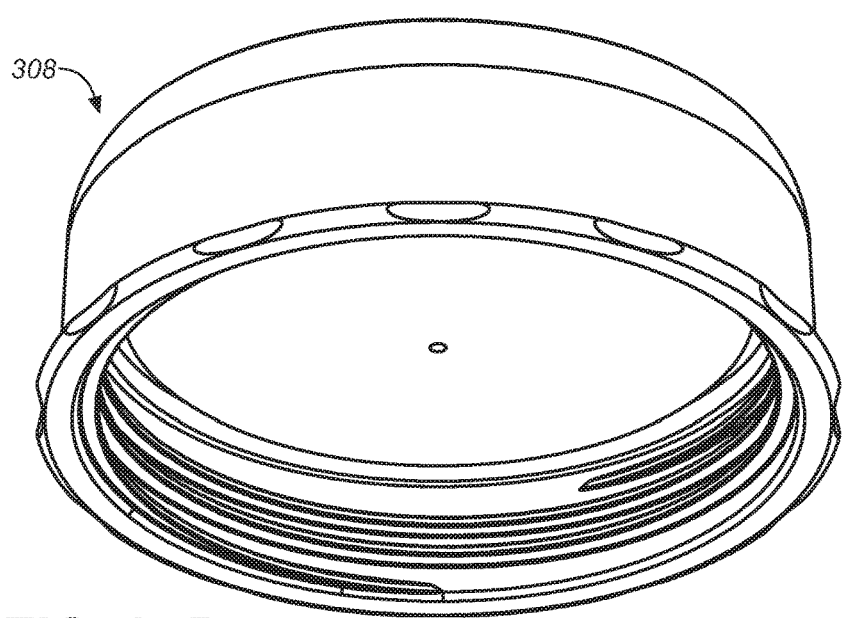

FIGS. 37A and 37B illustrate in more detail that the top of the shell lid 308 contains a flow opening 308A for allowing a beverage contained within the container to flow out of the container 320 and into a flow guide 308B for channeling the flow of a beverage from the container 320. A shell slider valve 308C can be operated within a shell slider valve retainer 308D to open the shell slider valve 308C in order to allow the beverage to flow out of the container 320 or to close the shell slider valve 308C to prevent the beverage from flowing out of the container 320. And, the manner of operation and catalytic combustion efficiencies of the catalytic heating system 300 are the same as described above in connection with the catalytic heating system 200.

Figure 38:
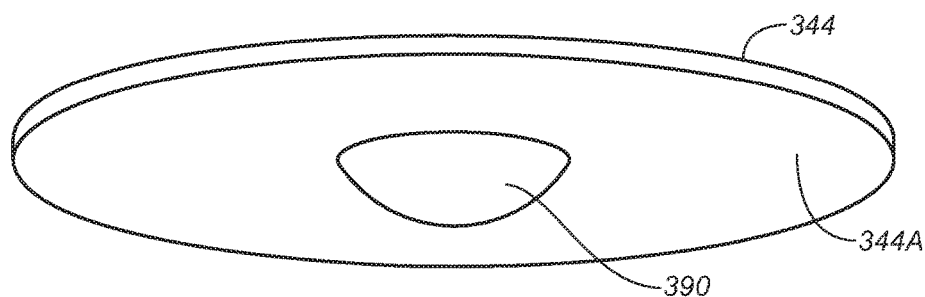
FIG. 38 is an alternate embodiment of the heating plate illustrated in FIG. 34A, illustrating a fuel gas and entrained air flow conditioner integral with the heating plate.
Figure 40:
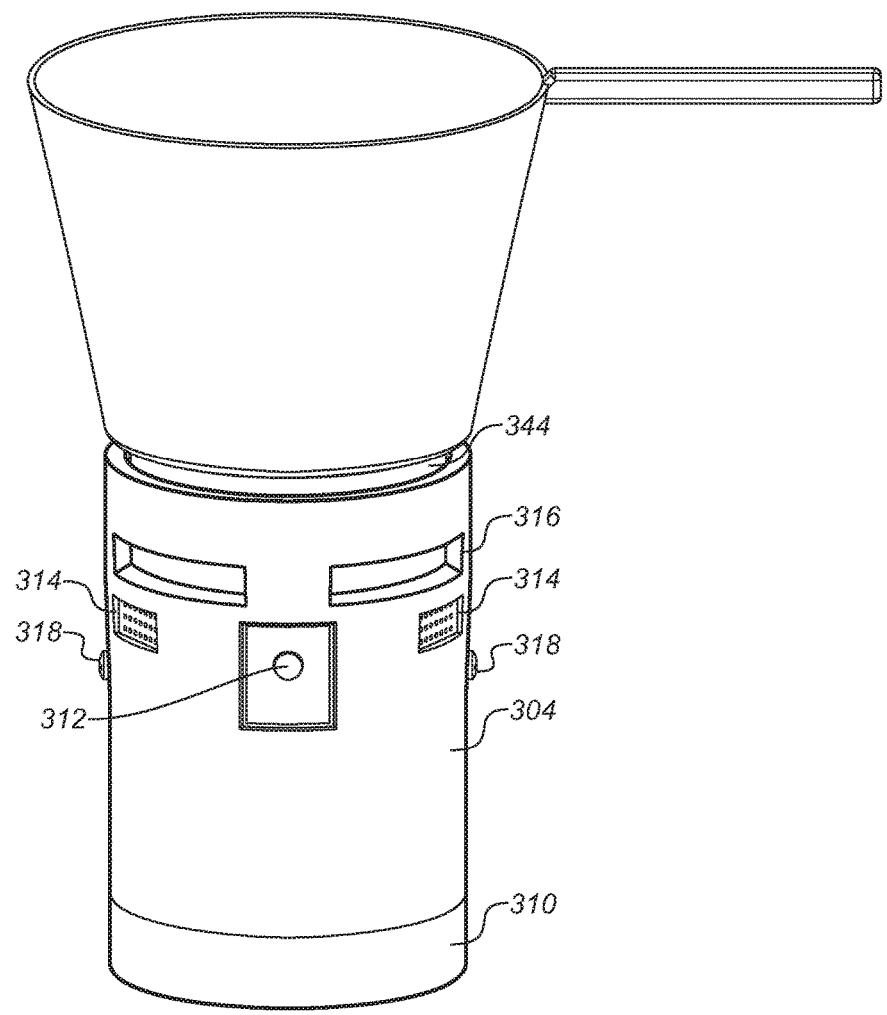
FIG. 40 is another illustration of FIG. 39 with a pan placed on the heating plate shown in FIG. 34A.

FIG. 38 illustrates an additional embodiment of the catalytic combustion enclosure 332 within the catalytic combustion assembly 330 of catalytic heating system 300. In this embodiment, the catalytic combustion enclosure 332 comprises: a fuel gas and entrained air flow conditioner 390, preferably having a spherical dome shape, with the fuel gas and entrained air flow conditioner 390 integral with a center portion of the bottom side 344A of heating plate 344. Preferably, the fuel gas and entrained air flow conditioner 390 is sized such that it does not contact either the catalytic reaction media 360 or the enclosure platform 340. The fuel gas and entrained air flow conditioner 390 functions to convert the vertical flow pattern of the fuel gas and entrained air mixture as it enters the catalytic combustion camber 350 through the fuel gas inlet port 346A of fuel gas inlet receptacle 346 into a uniform radial flow pattern as it enters the toroidal shaped catalytic reaction media 360. This action enhances the catalytic combustion efficiencies of the catalytic combustion system 300. Although this embodiment illustrates that the flow conditioner 390 is integral with the bottom side 344A of heating plate 344 of catalytic heating system 300, the flow conditioner can also be utilized with catalytic heating system 200, with the flow conditioner 390 integral with the bottom side 208A of the container bottom plate 208.

Figure 39:
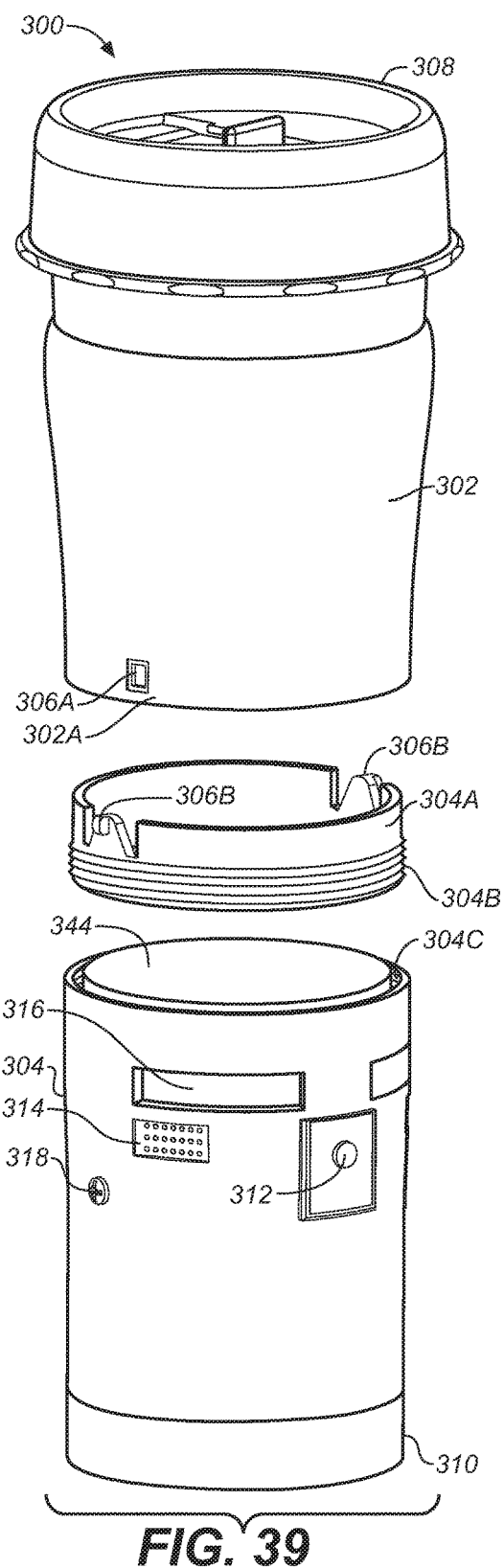
FIG. 39 is top perspective illustration of another embodiment of the catalytic heating system shown in FIG. 30A though FIG. 30C.

It is an important feature of the catalytic heating system 300 that the system also comprises a heating plate embodiment for heating a pot or pan containing a beverage or food. This embodiment comprises the lower shell module 304, containing the catalytic combustion assembly 330 of catalytic heating system 300, with the lower shell module 304 modified by providing a modified the snap-fit system 306 as illustrated in FIG. 39. More specifically, the ring member 304A that is integral with a top end 304A of the lower shell module 304 is modified so that it can be removed from the lower shell module 304 after the lower shell module 304 has been separated from the top shell module 302. The ring member 304A is modified to provide male screw threads 304B that are integral with the outside perimeter of the ring member 304A. And, the lower shell module 304 is modified to provide female screw threads 304C that are integral with the inside perimeter of the top of the lower shell module 304. The modified ring member 304A is removably attached to the modified lower shell module 304 by screwing the modified ring member 304A into the top end of the lower shell module 304; thereby providing a modified lower shell module 304. The heating plate embodiment, as shown in FIG. 39, comprises the modified lower shell module 304, containing the catalytic combustion assembly 330 of catalytic heating system 300, with the modified lower shell module 304 detached from the upper shell module 302 by unscrewing the modified ring member 304A from the modified lower shell module 304. Once the modified ring member 304A is removed from the modified lower shell module 304, the heating plate 344, integral with the catalytic combustion assembly 330, extends a predetermined distance above the modified lower shell module 304, which enables the modified lower shell module 304 to be used to heat differently sized pots and pans that are placed on the heating plate 344.

Figure 41A:
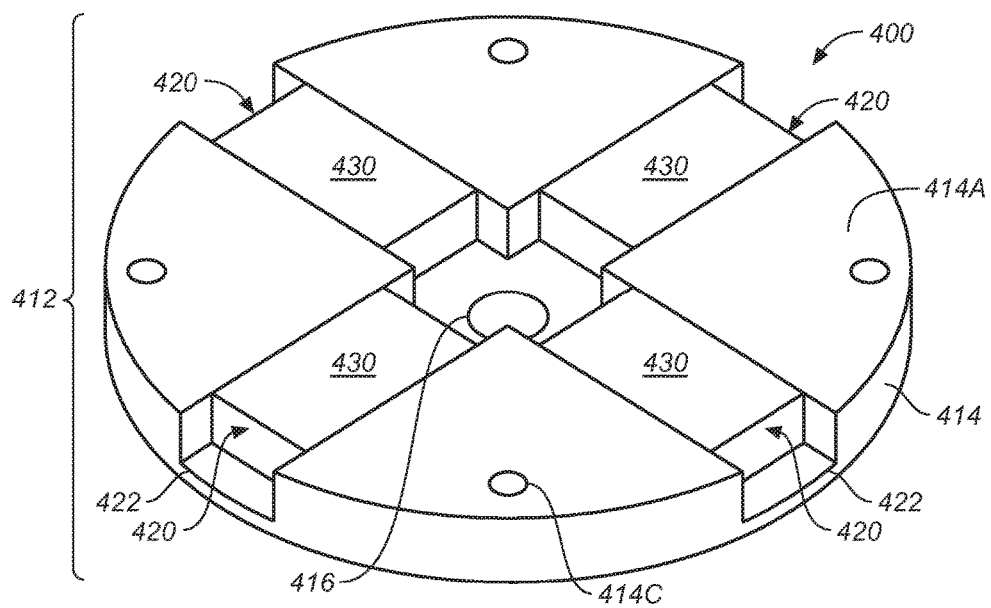
FIG. 41A and FIG. 41B are top and bottom perspective illustrations of another embodiment of the catalytic heating enclosure shown in FIG. 23A and FIG. 23B.
Figure 41B:
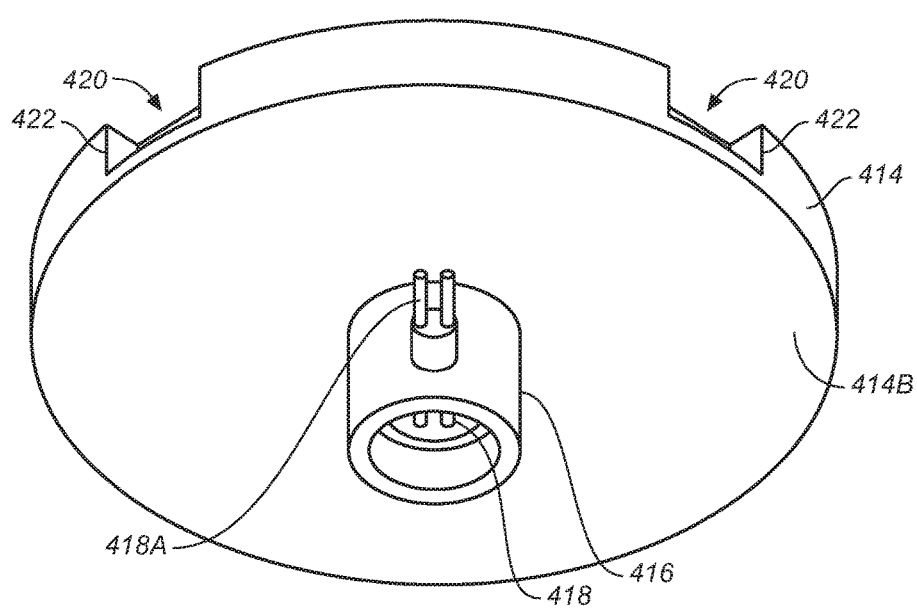

In an another embodiment, a catalytic heating system 400 for heating a beverage or food is illustrated in FIG. 41A and FIG. 41B (need bottom perspective view). This embodiment is substantially similar to the catalytic heating system 200 described above, with the only difference being that the catalytic heating system 400 comprises a catalytic combustion enclosure 412 which is a modification of catalytic combustion enclosure 212. In all other respects the systems are the same, and the component descriptions and related illustrations presented in FIG. 19A through FIG. 26B, above, are equally applicable to catalytic heating system 400 and are incorporated herein by reference. Referring to FIG. 41A, the catalytic combustion enclosure 412 comprises: an enclosure platform 414, which replaces enclosure platform 222 and its integral enclosure platform sidewall 224; and the container bottom plate 208 of container 204, which is attached to a top side of 414A of enclosure platform 414 by inserting the securing pins 209 integral with the container bottom plate 208 into corresponding receptacle openings 414C within the top side 414A of enclosure platform 414. In this regard, FIG. 41A illustrates the enclosure platform 414 without the integral container bottom plate 208 in order to show additional details of the enclosure platform 414. FIG. 41A and FIG. 42B illustrate that the enclosure platform 414 also comprises: a fuel gas inlet 416 integral with a bottom side 414B of the enclosure platform 414, with the fuel has inlet 416 providing flow-through access to the catalytic combustion enclosure 412; a combustion starting element 418 disposed within the fuel gas inlet 416, with the combustion starting element 418 having electrical connections 418A to the battery 264 integral with the circuit board 260 within fuel supply platform 216; a plurality of elongate channels 422, preferably four in number, are integral with the top side 414A of enclosure platform 414, with each elongate channel 422 disposed in a radial orientation within enclosure platform 414, with a proximal open end of each elongate channel 422 adjacent to the fuel gas inlet 416 and a distal open end of each elongate channel 442 integral with and extending through the outside perimeter of platform sidewall 416. And, as illustrated in the figures with "arrows", the attachment of the container bottom plate 208 to the enclosure platform 414 defines a plurality of enclosed elongate combustion chambers 420 corresponding to the plurality of elongate channels 422 within the enclosure platform 414, with each enclosed elongate combustion chamber 420 having a cuboidal shape. And, a plurality of catalytic reaction media 430 is disposed within a corresponding plurality of enclosed elongate combustion chambers 420, with each catalytic reaction media 430 having cuboidal shape and with a top side of each catalytic reaction media 430 in contact with the container bottom plate 208 of container 204.

Although a preferred embodiment and other embodiments have been described, it will be recognized by those skilled in the art that other embodiments and features can be provided without departing from the underlying principles of those embodiments. The scope of the invention is defined by the appended claims.

The invention claimed is:

1. A catalytic heating system for heating a beverage or food, comprising:
    a container for containing the beverage or food, with the container having a container bottom member;
    a catalytic combustion assembly, comprising:
        a catalytic combustion enclosure having an enclosure platform; an enclosure sidewall having a plurality of exhaust outlets extending through the enclosure sidewall, with a bottom of the enclosure sidewall integral with the enclosure platform and a top of the enclosure sidewall integral with the container bottom member, thereby defining a catalytic combustion chamber within the catalytic combustion enclosure; and a fuel gas inlet extending through the enclosure platform and having a flow-through access to the catalytic combustion chamber;
        a catalytic reaction media having a toroidal shape, with the catalytic reaction media disposed within the catalytic combustion chamber, and with a flat side of the catalytic reaction media in contact with a top side of the enclosure platform and an opposite flat side of the catalytic reaction media in contact with a bottom side of the container bottom member;
        a combustion starting element disposed within the catalytic combustion chamber;
        a fuel and air mixing injector mounted on a fuel supply platform, with the fuel and air mixing injector fluidly connected to the fuel gas inlet extending through the enclosure platform, with the fuel and air mixing injector for injecting a fuel gas and entrained air mixture into the catalytic combustion chamber; and
        a fuel canister releasably connected to the fuel supply platform and fluidly connected to the fuel and air mixing injector, with the fuel canister for supplying fuel gas to the fuel and air mixing injector; and
    a shell containing the containing the container and catalytic combustion assembly; thereby forming the catalytic heating system for heating the beverage or food;
    whereby the fuel and air mixing injector within the catalytic combustion assembly entrains the fuel gas with air and injects a fuel gas and entrained air mixture into the catalytic combustion chamber where the combustion starting element ignites the fuel gas and entrained air mixture, with the catalytic reaction media maintaining a catalytic combustion process within the catalytic combustion chamber, and with the heat energy generated within the catalytic reaction media directly transferred to the container bottom member due to the contact of the container bottom member with the catalytic reaction media.

2. The catalytic heating system of claim 1 in which the catalytic reaction media comprises an open cell metal foam substrate, combined with a catalyst support and an active catalyst.

3. The catalytic heating system of claim 1 in which the enclosure platform also comprises: a housing which is integral with a bottom side of the enclosure platform, with the housing defining an auxiliary air chamber within the housing; an auxiliary air inlet extending though the housing and providing flow-through access to the auxiliary air chamber; a plurality of auxiliary air outlets extending through the enclosure platform, with the auxiliary air outlets providing flow-through access from the auxiliary air chamber to the catalytic combustion chamber; and a microblower mounted on the fuel supply platform, with the microblower fluidly connected to the auxiliary air inlet and for providing auxiliary air to the catalytic combustion chamber.

4. The catalytic heating system of claim 3 which also comprises an altimeter in electronic connection with the microblower, with the altimeter for controlling the microblower as a function of the altitude of the catalytic heating system.

5. The catalytic heating system of claim 1 in which the container bottom member has a flow conditioner integral with the bottom side of the container bottom member, with the flow conditioner for providing a uniform radial flow pattern of the fuel gas and entrained air mixture within the catalytic combustion chamber.

6. The catalytic heating system of claim 5 in which the flow conditioner has a dome shape.

7. A catalytic heating system for heating a beverage or food, comprising:
    an upper shell;
    a container for containing the beverage or food, with the container having a container bottom member, and with the container disposed within the upper shell;
    a catalytic combustion assembly, comprising:
        a catalytic combustion enclosure comprising: an enclosure platform; an enclosure sidewall having a plurality of exhaust outlets extending through the enclosure sidewall, with a bottom of the enclosure sidewall integral with the enclosure platform and a top of the enclosure sidewall integral with a heating plate, thereby defining a catalytic combustion chamber within the catalytic combustion enclosure; and fuel gas inlet extending through the enclosure platform and having a flow-through access to the catalytic combustion chamber;
        a catalytic reaction media having a toroidal shape, with the catalytic reaction media disposed within the catalytic combustion chamber, and with a flat side of the catalytic reaction media in contact with a top side of the enclosure platform and an opposite flat side of the catalytic reaction media in contact with a bottom side of the heating plate;
        a combustion starting element disposed within the catalytic combustion chamber;
        a fuel and air mixing injector mounted on a fuel supply platform, with the fuel and air mixing injector fluidly connected to the fuel gas inlet extending through the enclosure platform, with the fuel and air mixing injector for injecting a fuel gas and entrained air mixture into the catalytic combustion chamber; and
        a fuel canister releasably connected to the fuel supply platform and fluidly connected to the fuel and air mixing injector, with the fuel canister for supplying fuel gas to the fuel and air mixing injector;
    a lower shell containing the catalytic combustion assembly, with the lower shell releasably attached to the upper shell, and with a top side of the heating plate of the catalytic combustion enclosure in contact with the container bottom member, thereby forming the catalytic heating assembly for heating a beverage or food; and
    whereby the fuel and air mixing injector within the catalytic combustion assembly entrains the fuel gas with air and injects a fuel gas and entrained air mixture into the catalytic combustion chamber where the combustion starting element ignites the fuel gas and entrained air mixture, with the catalytic reaction media maintaining a catalytic combustion process within the catalytic combustion chamber, and with the heat energy generated within the catalytic reaction media directly transferred to the heating plate due the contact of the heating plate with the catalytic reaction media, and with the heat energy within the heating plate transferred directly the container bottom member due to the contact of the container bottom member with the heating plate.

8. The catalytic heating system of claim 7 in which the catalytic reaction media comprises an open cell metal foam substrate, combined with a catalyst support and an active catalyst.

9. The catalytic heating system of claim 7 in which the enclosure platform comprises: a housing which is integral with a bottom side of the enclosure platform, with the housing defining an auxiliary air chamber within the housing; an auxiliary air inlet extending though the housing and providing flow-through access to the auxiliary air chamber; a plurality of auxiliary air outlets extending through the enclosure platform, with the auxiliary air outlets providing flow-through access from the auxiliary air chamber to the catalytic combustion chamber; and a microblower mounted on the fuel supply platform, with the microblower having a tubular connection to the auxiliary air inlet and for providing auxiliary air to the catalytic combustion chamber.

10. The catalytic heating system of claim 9 which also comprises an altimeter in electronic connection with the microblower, with the altimeter for controlling the microblower as a function of the altitude of the catalytic heating system.

11. The catalytic heating system of claim 7 in which the heating plate has a flow conditioner integral with the bottom side of the heating plate, with the flow conditioner for providing a uniform radial flow pattern of the fuel gas and entrained air mixture within the catalytic combustion chamber.

12. The catalytic heating system of claim 11 in which the flow conditioner has a dome shape.

13. A catalytic heating system for heating a beverage or food, comprising:
  a catalytic combustion assembly, comprising:
    a catalytic combustion enclosure comprising: an enclosure platform; an enclosure sidewall having a plurality of exhaust outlets extending through the enclosure sidewall, with a bottom of the enclosure sidewall integral with the enclosure platform and a top of the enclosure sidewall integral with a heating plate, thereby defining a catalytic combustion chamber within the catalytic combustion enclosure;
    fuel gas inlet extending through the enclosure platform and having a flow-through access to the catalytic combustion chamber;
    a catalytic reaction media having a toroidal shape, with the catalytic reaction media disposed within the catalytic combustion chamber, and with a flat side of the catalytic reaction media in contact with a top side of the enclosure platform and an opposite flat side of the catalytic reaction media in contact with a bottom side of the heating plate;
    a combustion starting element disposed within the catalytic combustion chamber;
    a fuel and air mixing injector mounted on a fuel supply platform, with the fuel and air mixing injector fluidly connected to the fuel gas inlet extending through the enclosure platform, with the fuel and air mixing injector for injecting a fuel gas and entrained air mixture into the catalytic combustion chamber; and
    a fuel canister releasably connected to the fuel supply platform and fluidly connected to the fuel and air mixing injector, with the fuel canister for supplying fuel gas to the fuel and air mixing injector;
  a shell having an open end, with the shell containing the catalytic combustion assembly, with the heating plate of the catalytic combustion enclosure disposed within the open end of the shell, thereby forming the catalytic heating system for heating a container containing the beverage or food;
  whereby the fuel and air mixing injector within the catalytic combustion assembly entrains the fuel gas with air and injects a fuel gas and entrained air mixture into the catalytic combustion chamber where the combustion starting element ignites the fuel gas and entrained air mixture, with the catalytic reaction media maintaining a catalytic combustion process within the catalytic combustion chamber, and with the heat energy generated within the catalytic reaction media directly transferred the heating plate of the due to the contact of the heating plate with the catalytic reaction media.

14. A catalytic heating system for heating a beverage or food, comprising:
  a container for containing the beverage or food, with the container having a container bottom member;
  a catalytic combustion assembly, comprising:
    a catalytic combustion enclosure having an enclosure platform; an enclosure sidewall integral with the enclosure platform; a plurality of elongate channels integral with a top side of the enclosure platform, with each elongate channel having a radial orientation within the enclosure platform, and with each elongate channel having an exhaust outlet extending through the enclosure sidewall; and the container bottom member integral with the top side of the enclosure platform, thereby defining a plurality of catalytic combustion chambers corresponding to the plurality of elongate channels;
    fuel gas inlet extending through the center of the enclosure platform and having a flow-through access to the plurality of catalytic combustion chambers;
    a plurality of catalytic reaction media disposed within a corresponding plurality of catalytic combustion chambers and with a top flat side of each catalytic reaction media in contact with the container bottom member;
    a combustion starting element disposed within the fuel gas inlet;
    a fuel and air mixing injector mounted on a fuel supply platform, with the fuel and air mixing injector fluidly connected to the fuel gas inlet extending through the enclosure platform, with the fuel and air mixing injector for injecting a fuel gas and entrained air mixture into the plurality of catalytic combustion chambers; and
    a fuel canister releasably connected to the fuel supply platform and fluidly connected to the fuel and air mixing injector, with the fuel canister for supplying fuel gas to the fuel and air mixing injector;
  a shell containing the containing the container and catalytic combustion assembly; thereby forming the catalytic heating system for heating the beverage or food;
  whereby the fuel and air mixing injector within the catalytic combustion assembly entrains the fuel gas with air and injects an ignited fuel gas and entrained air mixture into the plurality of catalytic combustion chambers where a corresponding plurality of catalytic reaction media maintain a catalytic combustion process within the catalytic combustion chambers, and with the heat energy generated within the plurality of catalytic reaction media directly transferred the container bottom member due to the contact of the container bottom member with the plurality of catalytic reaction media.

15. A method of providing a catalytic combustion process to heat a heating plate, comprising:

providing a flow of a fuel gas;

increasing the velocity of the flow of the fuel gas;

entraining the flow of the fuel gas with air, thereby providing a flow of fuel gas and entrained air mixture;

injecting the flow of fuel gas and entrained air mixture through a fuel gas inlet in flow-through connection with a combustion chamber;

dispersing the fuel gas and entrained air mixture within the combustion chamber so as to form a radial flow pattern emanating from the fuel gas inlet;

contacting the flow of fuel gas and entrained air mixture having the radial flow pattern with a toroidally shaped catalytic reaction media;

passing the flow of fuel gas and entrained air mixture having the radial flow pattern through the toroidally shaped catalytic reaction media, with the catalytic reaction media contacting the heating plate; and igniting the flow of fuel gas and entrained air mixture, thereby generating the catalytic combustion process that heats the heating plate.

* * * * *